United States Patent

Natori et al.

[11] Patent Number: 5,808,464
[45] Date of Patent: Sep. 15, 1998

[54] OSCILLOSCOPE HAVING VIDEO SIGNAL INPUT

[75] Inventors: Kazuya Natori, Kodaira; Mitsunobu Iwabuchi, Musashino; Masatake Nakanishi, Higashiyamato; Shigeki Ozawa, Mitaka, all of Japan

[73] Assignee: Hitachi Denshi Kabushiki Kaisha, Tokyo, Japan

[21] Appl. No.: 628,852

[22] Filed: Apr. 5, 1996

Related U.S. Application Data

[63] Continuation-in-part of Ser. No. 266,694, Jun. 28, 1994, Pat. No. 5,668,469.

[30] Foreign Application Priority Data

Jun. 28, 1993 [JP] Japan ................................. 5-181948
Sep. 27, 1993 [JP] Japan ................................. 5-239622
Apr. 6, 1995 [JP] Japan ................................. 7-081572
Oct. 24, 1995 [JP] Japan ................................. 7-275537
Dec. 27, 1995 [JP] Japan ................................. 7-341658

[51] Int. Cl.$^6$ .......................... G01R 13/20; H04N 17/00
[52] U.S. Cl. ...................... 324/121 R; 348/185; 364/487
[58] Field of Search ....................... 324/121 R; 364/487; 348/180, 184, 185, 186

[56] References Cited

U.S. PATENT DOCUMENTS

| 4,364,080 | 12/1982 | Vidovic | 348/185 |
| 4,418,388 | 11/1983 | Allgor et al. | 364/487 |
| 4,953,017 | 8/1990 | Ivey et al. | 348/185 |
| 5,038,098 | 8/1991 | Birkel et al. | 324/121 R |
| 5,144,430 | 9/1992 | Boelart | 324/121 R |
| 5,519,440 | 5/1996 | Baker | 348/185 |

FOREIGN PATENT DOCUMENTS

| A-0336594 | 3/1989 | European Pat. Off. . |
| A-0631143 | 6/1994 | European Pat. Off. . |
| U-9214790 | 10/1992 | Germany . |
| A-53-84789 | 7/1978 | Japan . |
| A-54-8566 | 1/1979 | Japan . |
| A-58-14171 | 1/1983 | Japan . |
| A-4-143664 | 5/1992 | Japan . |
| A-2183420 | 11/1985 | United Kingdom . |
| A-2266636 | 4/1992 | United Kingdom . |

*Primary Examiner*—Ernest F. Karlsen
*Attorney, Agent, or Firm*—Antonelli, Terry, Stout & Kraus, LLP

[57] ABSTRACT

In an oscilloscope having a video signal input, a video signal and the like can be monitored in addition to the normal waveform monitoring operation as the oscilloscope. The oscilloscope having such a video signal input is arranged by a first input terminal for the oscilloscope, for entering therein a signal under monitor; an oscilloscope unit connected to the first input terminal, for processing the signal under monitor supplied from the first input terminal to output an oscilloscope signal; a second input terminal for entering therein a video signal; a picture monitor unit connected to the second input terminal, for processing therein the video signal supplied from the second input terminal to output a picture monitor signal; a display switching unit for selecting one of the oscilloscope signal derived from the oscilloscope unit and the picture monitor signal derived from the picture monitor unit; and a display device for displaying therein either the oscilloscope signal or the picture monitor signal derived from said display selecting unit.

15 Claims, 40 Drawing Sheets

⊠ : ACTUAL WAVEFORM DATA

▨ : INTERPOLATED DATA

⊠ : ACTUAL WAVEFORM DATA

▨ : INTERPOLATED DATA

| GRADA-TION | VALUE OF J | D₁ (X,Y) | D₀ (X,Y) |
|---|---|---|---|
| 1 | 0 | 0 | 0 |
| 2 | 1~J/3 | 0 | 1 |
| 3 | J/3+1~J2/3 | 1 | 0 |
| 4 | J2/3+1 OR MORE | 1 | 1 |

FIG.30

|     | X₀ | X₁ | X₂ | X₃ | X₄ | ---------- | X₂₃₉ |
|-----|----|----|----|----|----|------------|------|
| Y₀  | 1  | 0  | 0  | 0  | 0  |            | 0    |
| Y₁  | 0  | 1  | 0  | 0  | 0  |            | 0    |
| Y₂  | 0  | 0  | 0  | 0  | 0  |            | 0    |
| ⋮   |    |    |    |    |    |            |      |
| Y₂₁₉ | 0 | 0  | 0  | 0  | 0  |            | 0    |

$D_1$ BIT

FIG.31

|     | X₀ | X₁ | X₂ | X₃ | X₄ | ---------- | X₂₃₉ |
|-----|----|----|----|----|----|------------|------|
| Y₀  | 1  | 0  | 0  | 0  | 0  |            | 0    |
| Y₁  | 0  | 0  | 0  | 0  | 0  |            | 0    |
| Y₂  | 0  | 0  | 1  | 0  | 0  |            | 0    |
| ⋮   |    |    |    |    |    |            |      |
| Y₂₁₉ | 0 | 0  | 0  | 0  | 0  |            | 0    |

$D_0$ BIT

1 --- COLOR DOT MATRIX DISPLAY DEVICE

OSCILLOSCOPE HAVING VIDEO SIGNAL INPUT

This application is a continuation-in-part of U.S. patent application Ser. No. 08/266,694 field on Jun. 28, 1994, now U.S. Pat. No. 5,668,469, the contents of which are incorporated herein by reference.

BACKGROUND OF THE INVENTION

The present invention relates to a digital oscilloscope with a video monitor (picture monitor) function, a waveform monitor function, and a vector scope function, i.e., a display of a video signal.

In broadcasting stations and the like where video signals are processed, video monitors are apparently used. Also, oscilloscopes are employed for maintenance works at fields.

In such a case, conventionally, video monitors must be combined with oscilloscopes.

Although there are the waveform monitor appliances and the audio monitor appliances, equipped with the video monitor function, this function can merely and simply monitor the video and audio signals, but cannot sufficiently function as the adjusting/maintenance purposes of the video appliances. Furthermore, these conventional waveform/audio monitoring appliances are limited only to the specific usage of the video signal monitoring.

Furthermore, in broadcasting stations and the like which may handle video signals, various measurements are carried out by vector scopes.

It should be noted that one oscilloscope having the waveform monitor function and the vector scope function is commercially available as the Multi-Function Video Test Instrument from COMPUVIDEO corporation. However, this oscilloscope is equipped with no video monitor function, and this oscilloscope is an analog oscilloscope.

SUMMARY OF THE INVENTION

An object of the present invention is to provide an oscilloscope having a video monitor function, a vector scope function, and also a waveform monitor function.

Preferably, the present invention is to provide a digital oscilloscope having a video monitor function, with employment of a color dot matrix flat (plane) display device.

Also, the present invention is preferably to provide a digital oscilloscope with a video input, capable of displaying a waveform with high fidelity and high grade, while using a color dot matrix flat display device.

Further, the present invention is preferably to provide a digital oscilloscope with employment of a TFT (thin-film transistor) color LCD (liquid crystal display) for a color television.

Furthermore, the present invention is preferably to provide such a digital oscilloscope equipped with a waveform monitor function and a vector scope function as to a video input signal. Accordingly, it is possible to provide a compact/light-weight digital oscilloscope suitably used to measure the video signals and the related signals, although various types of measurement appliances are conventionally required to achieve the above-described functions.

In addition, the present invention is to provide a digital oscilloscope capable of displaying gradation of brightness in a vector scope and a waveform monitor, resulting in a natural representation closer to that of an analog oscilloscope.

According to an aspect of the present invention, such an oscilloscope having a video signal input is provided which is comprised of: a first input terminal for the oscilloscope, for entering therein a signal under monitor (a signal to be observed); an oscilloscope unit connected to the first input terminal, for processing the signal under monitor supplied from the first input terminal to output an oscilloscope signal; a second input terminal for entering therein a video signal; a picture monitor unit connected to the second input terminal, for processing therein the video signal supplied from the second input terminal to output a picture monitor signal; a display switching unit for selecting one of the oscilloscope signal derived from said oscilloscope unit and the picture monitor signal derived from said picture monitor unit; and a display device for displaying therein either said oscilloscope signal or said picture monitor signal derived from said display selecting unit.

According to another aspect of the present invention, such an oscilloscope having a video signal input is provided which is comprised of: a first input terminal for the oscilloscope, for entering therein a signal under monitor; an oscilloscope unit connected to the first input terminal, including an analog processing circuit for converting said signal under monitor derived from said first input terminal into a predetermined level, and an output unit for processing the signal derived from said analog processing circuit to thereby output an oscilloscope signal; a second input terminal for entering therein a video signal; a switch for selecting one of said signal derived from said analog processing circuit and said video signal derived from said second input terminal; a picture monitor unit connected to said switch, for processing the signal derived from said switch to thereby output a picture monitor signal; a display switching unit for selecting one of the oscilloscope signal derived from said oscilloscope unit and the picture monitor signal derived from said picture monitor unit; and a display device for displaying thereon either said oscilloscope signal or said picture monitor signal derived from said display selecting unit.

As described above, in the oscilloscope according to the present invention, at least the input terminal for inputting the signal under monitor used in the oscilloscope, and the video signal input terminal are provided. One of the signals derived from these input terminals is selected to be used, if required, and the selected signal can be displayed on the commonly used display device.

Furthermore, the oscilloscope according to the present invention owns the function to monitor the waveform of the specific video signal from the video signal inputted into this video signal input terminal, the function of the vector scope, and the function to monitor the picture (video monitor). Also, these function can be used in this oscilloscope. Furthermore, the selecting switch is provided in order that the video signal entered into the oscilloscope input terminal is penetrated through the video signal processing unit if necessary.

In accordance with one example of the present invention, the color dot matrix flat (plane) display device is employed as the flat display device for displaying the video signal and the waveform data under monitor.

In accordance with another example of the present invention, the oscilloscope includes a sync signal generating circuit for controlling a timing when display data is produced. The above-explained color dot matrix display device includes a dot scan circuit for producing a dot scan signal in response to the display data; and a PLL circuit for producing a scan clock signal of the dot scan signal generated from said dot scan means in synchronism with the sync signal derived from the sync signal generating circuit.

According to another example of the present invention, the oscilloscope unit of the oscilloscope may be arranged by including: an analog processing circuit for converting the signal under monitor into a predetermined level; an A/D converting circuit for converting the signal under monitor whose level has been converted into said predetermined level by said analog processing circuit into digital data; an acquisition memory for storing therein the digital data converted by said A/D converting circuit; a sampling control circuit for controlling said acquisition memory and a sampling operation of said A/D converting circuit; a microcomputer for converting said digital data stored in the acquisition memory into display data; a display memory for storing therein said display data converted by said microcomputer; and a display control unit for separating said display data of the display memory into R, G, B signals and a sync signal and for supplying said R, G, B signals and said sync signal to the display device provided at the post stage.

According to another example of the present invention, in the oscilloscope of the present invention, both the vector display of the video signal and the waveform monitor display may be performed in a gradation manner. Furthermore, this may be used in the normal oscilloscope waveform display.

In accordance with another example of the present invention, the color matrix display device includes a PLL circuit for producing a dot scan clock signal in response to a sync signal for controlling the timing when the display data is produced from the oscilloscope unit. In this color dot matrix display device, the display data are supplied in unit of the respective color dots for constituting the matrix.

With such an arrangement, similar to the normal oscilloscope, the signal under monitor is inputted to the input terminal for inputting therein the signal to be monitored by the oscilloscope. Also, the signals derived from the video camera and other video appliances can be entered from the video signal input terminal into the oscilloscope of the present invention. As a consequence, either the monitor screen or the oscilloscope screen may be immediately observed by operating the selecting switch, if required.

As a consequence, it is possible to realize the oscilloscope having the picture monitor function and the video monitor terminal, as well as the oscilloscope equipped with the video monitor terminal, having the picture monitor function, the vector scope function, and the waveform monitor function. Furthermore, according to the present invention, since the display device is commonly employed for the oscilloscope function and the video function, such a flat-shaped dot matrix color display device is provided which is suitable for both the picture monitor function and the oscilloscopic display.

BRIEF DESCRIPTION OF THE DRAWINGS

FIG. 30 is an explanatory diagram for explanating operations of the VRAM shown in FIG. 29;

FIG. 31 is an explanatory diagram for explanating operations of the VRAM shown in FIG. 29;

DESCRIPTION OF THE PREFERRED EMBODIMENTS

Figure 1:
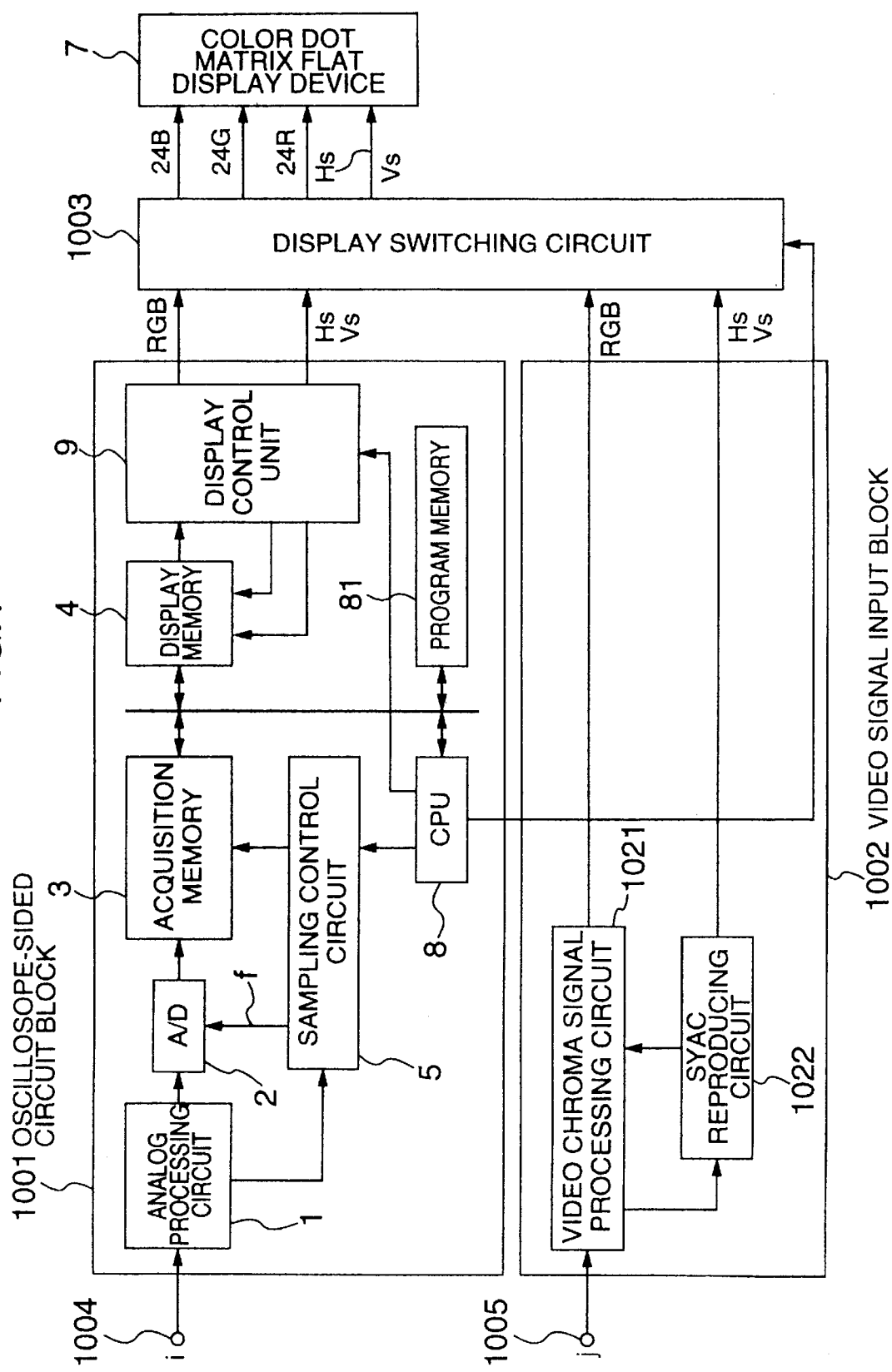
FIG. 1 is a schematic block diagram for representing an overall arrangement of an oscilloscope having a video signal input, according to an embodiment of the present invention.

Referring now to drawings, embodiments of the present invention will be described in detail. It should be noted that the same reference numerals will be employed as those for indicating the same or similar functional elements shown in the below-mentioned drawings, and explanations thereof are omitted.

The respective embodiments according to the present invention will now be explained in accordance with the following sequence:

First Embodiment: An oscilloscope having a picture monitor function and a video monitor terminal.

Second Embodiment: An oscilloscope equipped with a video monitor terminal, having a picture monitor function, a vector scope function, and a waveform monitor function.

Third Embodiment: A method for driving a flat-shaped dot matrix color display device suitable to any of a picture monitor function and an oscilloscopic representation.

Fourth Embodiment: An oscilloscope with employing a VRAM as a display memory by utilizing the method for driving the flat-shaped dot matrix color display device suitable to any of the picture monitor function and the oscilloscopic representation.

Fifth Embodiment: An oscilloscope equipped with a video monitor terminal, having the picture monitor function, the vector scope function, and the waveform monitor function with employment of the VRAM as the display memory, while using an LCD display device driven by a display method suitable for the picture monitor function and also the oscilloscopic display.

Sixth Embodiment: An oscilloscope equipped with a video monitor terminal, having the picture monitor function, the vector scope function, and the waveform monitor function with employment of a line memory as the display memory, while using an LCD display device driven by a display method suitable for the picture monitor function and also the oscilloscopic display.

First, a description will now be made of an oscilloscope having a video monitor terminal, corresponding to the first embodiment of the present invention.

Referring now to the accompanying drawings, a digital oscilloscope with a video signal input and a data display method employed in this digital oscilloscope, according to an embodiment of the present invention, will be described in detail.

At the beginning, a schematic arrangement and a schematic operation of the digital oscilloscope with the video signal input, according to the present invention, will now be explained. FIG. 1 is an overall structural diagram of a 1-input channel oscilloscope having a video signal input according to the present invention. The operations of this oscilloscope will be simply described.

Reference numeral 1001 indicates a circuit block provided at a side of the oscilloscope. A monitored input signal "i" is entered via a monitored input signal terminal 1004 to an analog processing circuit 1. This signal is processed by this analog processing circuit 1 to be an amplitude level within a constant range. Subsequently, the monitored signal (signal under monitor) entered from the analog processing circuit 1 to an A/D (analog-to-digital) converter 2 is digitalized in response to a sampling clock "f" corresponding t a display time width and a display data point per 1 division of the display screen, which is derived from a sampling control circuit 5, and then the digitalized signal under monitor is stored into an acquisition memory 3. Among the digitalized signal under monitor equal to the memory content of this acquisition memory 3, a necessary memory content corresponding to the display is written into a display memory 4. Thereafter, the digital signal under monitor is processed by a display control unit (containing a display data output unit and a polarity inverting circuit) 9 and then is displayed on a color dot matrix flat (plane) display device 7 by way of the line sequential scanning manner together with a character signal (a "character signal" implies a character of a setting value and a measurement value such as a time range and a volt range of an oscilloscope, and such a data signal for information displayed on a screen). A microcomputer 8 (will be simply expressed as a "CPU" hereinafter) controls overall operations.

It should be noted that the monitored signal is written into the acquisition memory 3 in response to a write control signal derived from the sample control circuit 5, and the monitored signal is read therefrom via the sampling control circuit 5 in response to a read control signal supplied from the CPU 8. Also, the writing operation of the monitored signal into a waveform display memory 4 is carried out in response to a write control signal issued from the CPU 8, whereas the reading operation of the monitored signal from the waveform display memory 4 is performed in response to a read control signal supplied from a display control unit 9 corresponding to a display data generating unit.

In the display memory 4, sampled waveform data equal to the signal under monitor is stored.

Reference numeral 1005 indicates a video signal input terminal, reference numeral 1002 denotes a video signal input block. A composite video input signal "j" is entered via the video signal input terminal 1005 to a video chroma (chrominance) signal processing circuit 1021. Then, this composite video signal is demodulated by the video chroma signal processing circuit 21 well known in the art to thereby be converted into R, G, B color signals. It is now assumed in the embodiment of FIG. 1 that the .- correction circuit is contained in this video chroma signal processing circuit 1021. On the other hand, a horizontal sync (synchronization) signal HS and a vertical sync (synchronization) signal VS are extracted to be reproduced from the input composite video signal "j" by a sync reproducing circuit 1022 well known in the art.

Reference numeral 1003 denotes a display switching circuit. The display switching circuit 1003 selects one of the signals supplied from the oscilloscope 1001 and the video signal input block 1002, and supplies the selected signal to the color dot matrix flat display device 7. That is, the R, G, B, HS and VS signals are selected from the oscilloscope 1001, whereas the R, G, B, HB and VS signals are selected from the video signal input block 1002. The selection of the signals is controlled from the port of the CPU 8, and the display switching circuit 1003 is constructed of an analog switch.

As a result, the oscilloscopic image and the video image can be displayed on a single color dot matrix flat display device 7. In other words, it is possible to provide the oscilloscope having the picture monitor function.

Now, a description will be made of an oscilloscope equipped with a video monitor terminal, having a picture monitor function, a vector scope function, and a waveform monitor function, which corresponds to the second embodiment.

In this case, for instance, a 2-channel input type oscilloscope equipped with a video monitor terminal, having a picture monitor function, a waveform monitor function, and a vector scope function will now be explained.

Figure 2:
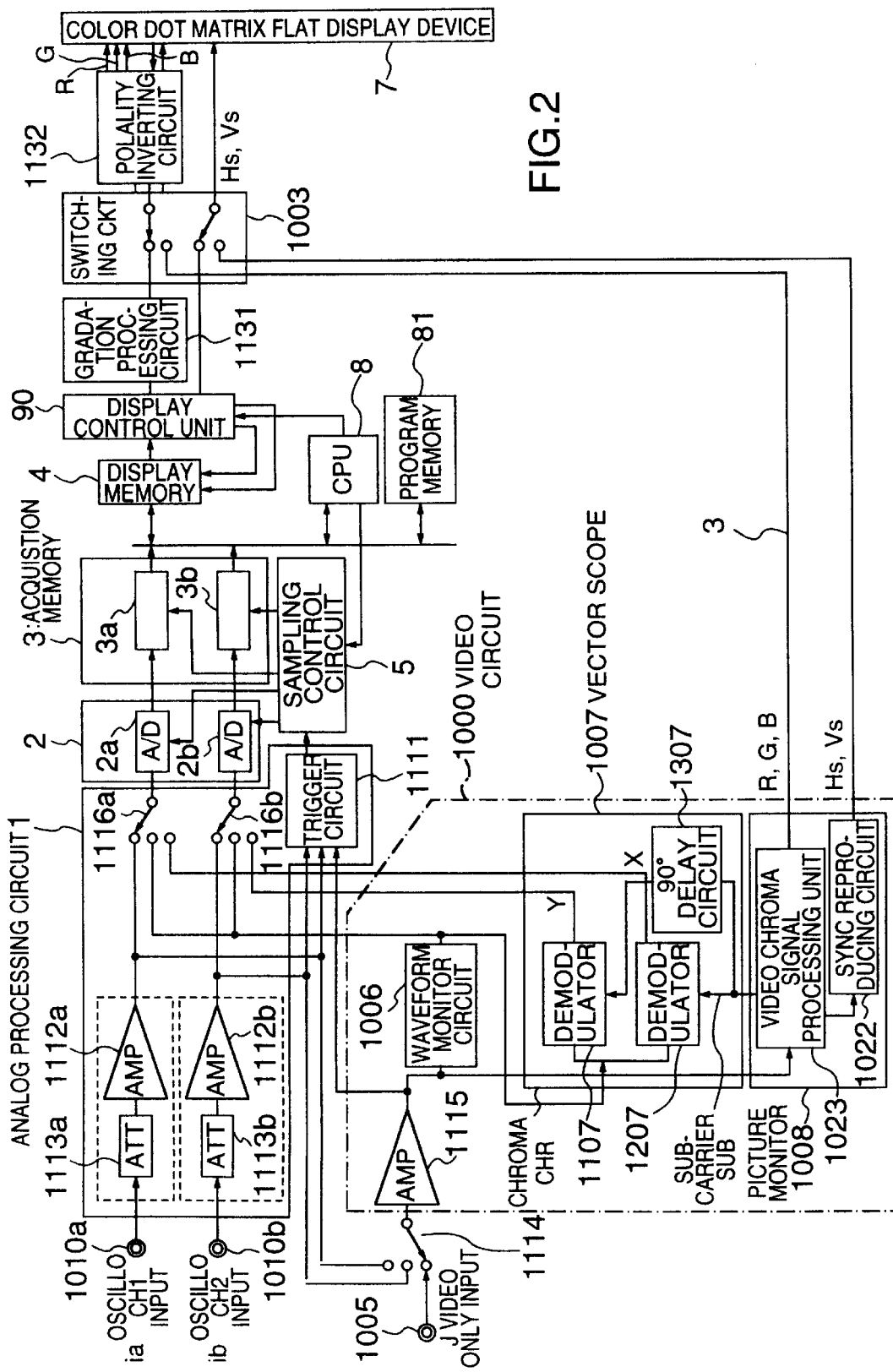
FIG. 2 is a schematic block diagram for showing an oscilloscope having a vector scope, a waveform monitor, and a video monitor function, according to an embodiment of the present invention.

Referring not to FIG. 2, such an LCD oscilloscope provided with a video circuit having a waveform monitor function and a vector scope function is described as the second embodiment in addition to the first embodiment of FIG. 1, namely the picture monitor. In FIG. 2, an example of an arrangement of the analog processing circuit in FIG. 1 is illustrated in detail.

The same reference numerals of FIG. 1 indicate the same circuit elements. Reference numeral 1000 indicates a video circuit, a waveform monitor circuit, and a vector scope circuit.

Reference numeral 1010a shows an input terminal of an oscilloscope channel 1 (OSC CH1), and reference numeral 1010b denotes an input terminal of an oscilloscope channel 2 (OSC CH1). Reference numeral 1114 represents a signal switching circuit for selecting one of a video signal from the video signal input terminal 1005, a signal "ia" from the oscilloscope CH1 input terminal, and a signal "ib" from the oscilloscope CH2 input terminal, which have passed through an analog processing circuit (attenuators 1113a, 1113b, and amplifiers 1112a, 1112b). Reference numeral 1115 shows a buffer amplifier of the video circuit 1000. This buffer amplifier 1115 amplifies the signal derived from the signal switching circuit 1114 to obtain a predetermined signal level. A gradation processing circuit 1131 arranged by a D/A converting circuit is provided between a display control unit 90 (including no polarity inverting circuit) and the display switching device 1003. It should be noted that the display control unit 90 and the color dot matrix flat display device 7 will be discussed later.

First, operations of the waveform monitor circuit will now be explained.

Figure 3:
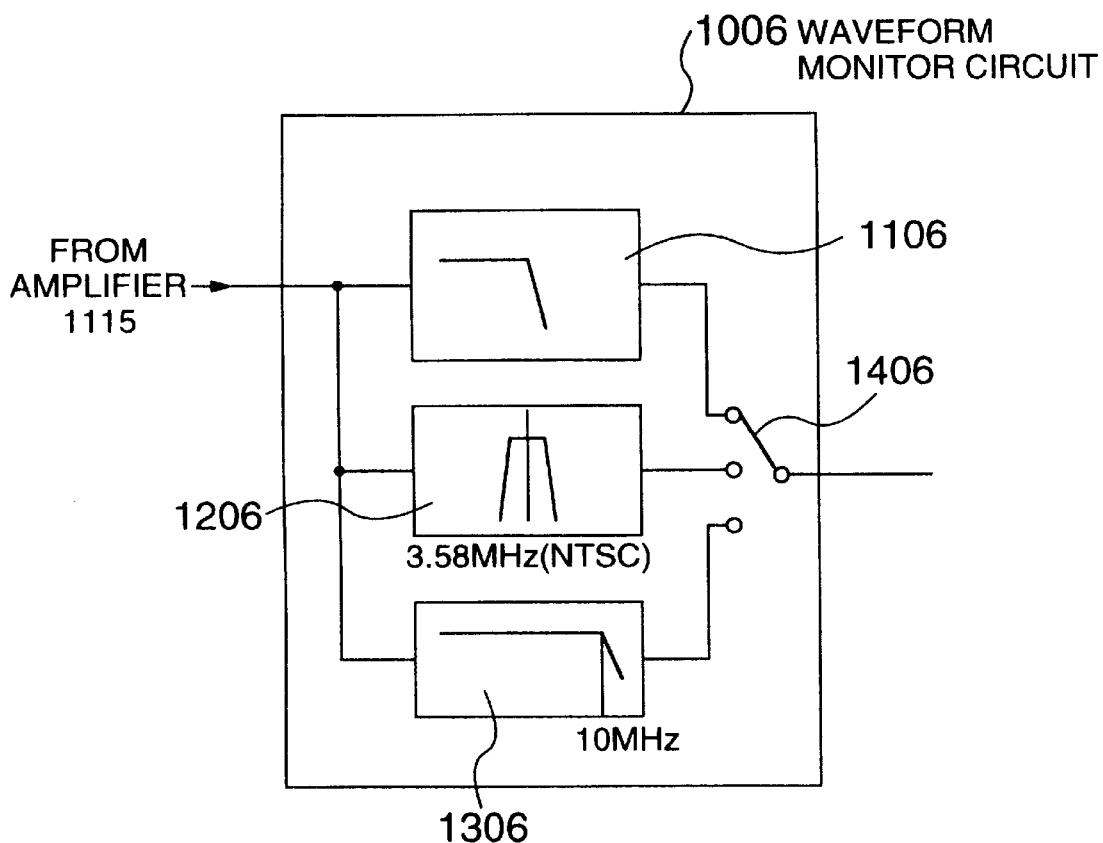
FIG. 3 is a schematic block diagram for showing an example of the waveform monitor circuit employed in the oscilloscope of the embodiment of the present invention.

Reference numeral 1006 is a waveform monitor circuit arranged by a band-pass filter, a low-pass filter, a flat filter, and a selection switch. This waveform monitor circuit 1006 outputs such a signal which has passed through any one of the above-described filters. A detailed circuit block of this waveform monitor circuit is represented in FIG. 3. In this drawing, a band-pass filter 1206 (bandwidth of 3.58 MHz in NTSC system) is such a filter for causing a chroma signal component of a video (picture) signal to pass therethrough. A low-pass filter 1106 corresponds to a filter for causing a luminance signal component to pass therethrough. A flat filter 1306 corresponds to such a filter through which both the chroma signal component and the luminance signal component can pass. If the high frequency signal component (for instance, higher than 10 MHz) has been removed at the prestage circuit, then no longer this flat filter is required. It should be noted that since such filter circuits per se are well known in this field, detailed descriptions are omitted. Furthermore, such filters are not limited to the above-described various types of filters, but many other circuits capable of extracting such a video-specialized signal suitable for waveform monitoring may be employed. Alternatively, these filters may be omitted if required. A switch 1406 is controlled by the CPU 8 through a control line (not shown in detail).

The signals outputted from the waveform monitor circuit 1006 constructed of this filter circuit are inputted via signal switching device 1116a and 1116b to an A/D converting circuit 2a and an A/D converting circuit 2b, and the A/D-converted signals are once stored in an acquisition memory 3a and an acquisition memory 3b. Next, a these signal data of the acquisition memories are converted into bit map data by the CPU 8, which will then be stored into a display memory 4. Furthermore, the bit map data are processed through a gradation processing circuit 1131, a switching circuit 1003, and a gamma correcting/polarity inverting circuit 1132 and then are displayed on the color dot matrix flat display device 7.

The bit map data converting processing operation and the gradation data processing operation will be discussed later in detail.

Now, for instance, in FIG. 1, the color dot matrix flat display device 7 is made of an analog RGB signal input type LCD model. That is, the gamma correction circuit, the polarity inverting/amplifying circuit, and the common signal generating circuit are contained in the TFT exclusively-used video signal input type module, and both the analog RGB signal and the sync signal are inputted to this LCD module. When the TFT exclusively-used video signal input type LCD module is employed, as shown in FIG. 2, for example, a gamma correction/polarity inverting circuit 1132 is additionally provided at the post stage of the video chroma signal processing circuit 1023.

Subsequently, operations of the vector scope circuit will now be described.

Reference numeral 1007 denotes a vector scope circuit constructed of demodulators 1107 and 1207, and a 90-degree phase delay circuit 1307. To this vector scope circuit 1007, a chroma signal component CHR of a video signal is inputted from the band-pass filter circuit 1206 of the waveform monitor circuit 1006 is inputted, and a sub-carrier signal "SUB" is inputted from the picture monitor circuit 1008. It should be understood that this picture monitor circuit 1008 is essentially identical to the video signal input block 1002 as previously explained in FIG. 1, and is commercially available as the IC product model of TA 8695 AF manufactured by TOSHIBA.

The vector scope circuit 1007 is such a well known circuit for producing/displaying a vector by an X-axis signal and Y-axis signal. The chroma signal CHR derived from the waveform monitor circuit 1006 is demodulated in response to the sub-carrier signal SUB outputted from the picture monitor circuit 1008. The Y-axis signal Y is obtained by demodulating the chroma signal CHR by the demodulator 1107 based upon such a signal obtained from a delay circuit 1307 by delaying the subcarrier signal SUB outputted from the picture monitor circuit 1008 by 90 degrees. The X-axis signal "X" is obtained by demodulating the chroma signal by the demodulator 1207 based upon the subcarrier signal SUB. It should be noted that since the vector scope per se is well known, a detailed description thereof is omitted.

These X-axis signal and Y-axis signal are inputted via the signal switching circuits 1116a and 1116b to the A/D converting circuit 2a and the A/D converting circuit 2b, respectively, and then are stored into the acquisition memories 3a and 3b in a similar manner to the monitored signals for the oscilloscope. The data stored in the acquisition memories are read by the CPU 8, and then are processed by way of the X-Y data converting process, and the bit map data converting process in the software process, and thereafter are processed by way of the gradation data process in the gradation processing unit 1131. The resulting data-processed data are transferred so as to be stored into the display memory 4.

The data stored in the display memory 4 is read therefrom in response to a read clock issued from the display control unit 9, and is converted into dot display data for the color dot matrix flat display device 7. This operation will be described in detail later on. The dot-display-converted data for the display device 7 is further converted into a gradation signal by the gradation processing circuit 1131, and this gradation signal is entered via the display switching device 1003 to the gamma correction/polarity inverting circuit 1132. In the gamma correction unit of this gamma correction/polarity inverting circuit 1132, the data is level-converted in such a manner that the input signal level and the emission brightness of the display device are changed in a preselected exponential relationship. In the polarity inverting unit of this gamma correction/polarity inverting circuit 1132, the polarity of the signal is inverted in every line period, and in every field period of the display device. The signal outputted from the polarity inverting circuit is inputted into the display device 7 and thus the vector is displayed. It should be noted that as this gamma correction/polarity inverting circuit 1132, such an IC product of model ICTA 8696 manufactured by TOSHIBA is commercially available.

As described above, in the embodiment of FIG. 2, no gamma correction circuit is included in the video chroma signal processing circuit 1023 of the picture monitor circuit 1008, which is different from the embodiment of FIG. 1.

Next, an explanation will be made of the bit map data converting process and the gradation data process.

It should be noted that these bit map data converting process and gradation data process operations may also be utilized in the previously described waveform monitor, vector scope display, and oscilloscope display.

The waveform data stored in the acquisition memories 3a, 3b can not be displayed on the color dot matrix flat display device 7 as it is. In other word, the waveform data is required to be converted into bit map data corresponding to the display screen at the time of being displayed on the display device 7. In this embodiment, at the time of the conversion, an overwriting operation of data for the gradation representation is performed so as to display the display such as a video waveform, vector data etc. in a natural representation.

Referring now to FIG. 4 to FIG. 7, the gradation representation will be described.

Figure 4:
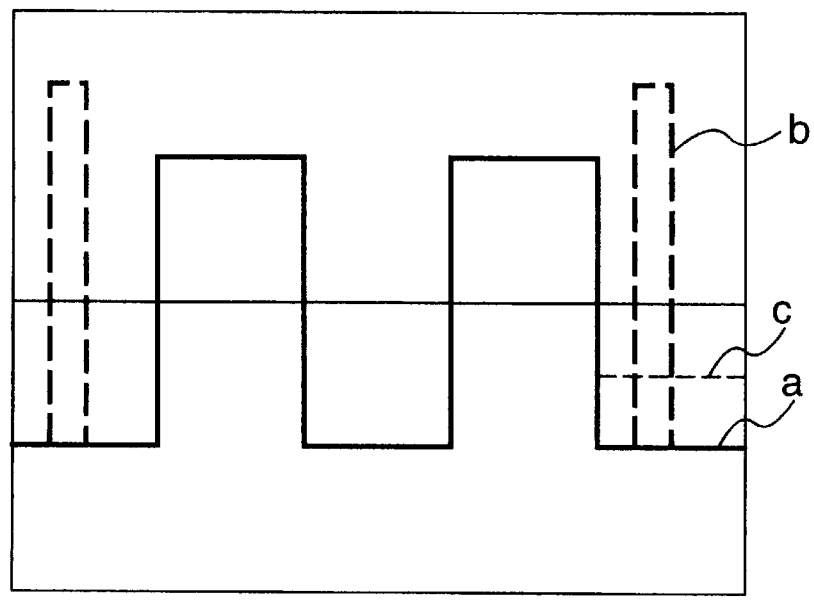
FIG. 4 represents a display example of a gradation representation according to the embodiment of the present invention.
Figure 5:
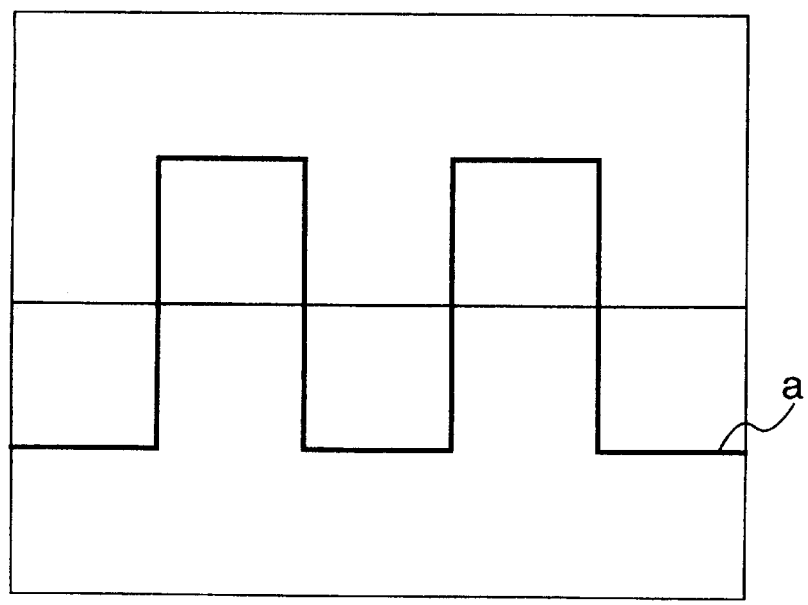
FIG. 5 shows such a display example that none of the overwriting operation and the gradation display operation is carried out according to the embodiment of the present invention.
Figure 6:
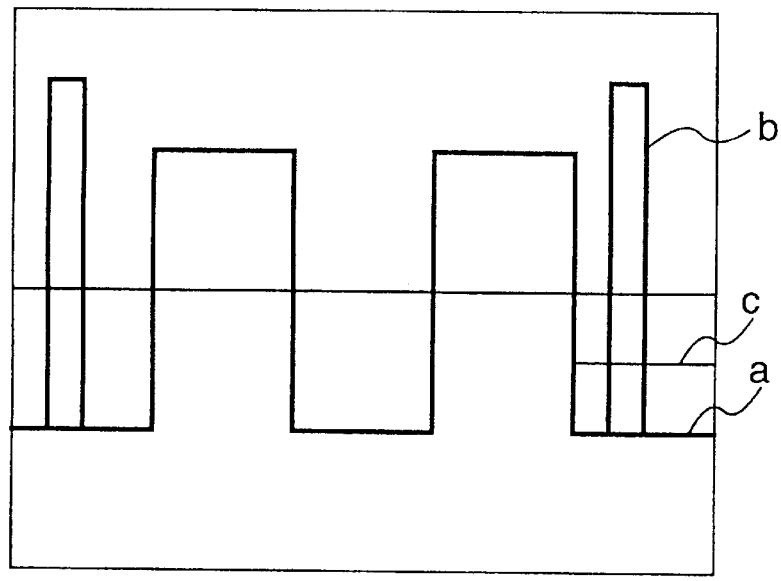
FIG. 6 represents a display example made when only the overwriting operation is performed in the embodiment of the present invention.

FIG. 4, FIG. 5 and FIG. 6 are explanatory diagrams for explaining differences appearing in display screens of the display device when the gradation representation is performed and is not performed. FIG. 4 is an explanatory diagram for explaining a display screen when the gradation representation is carried out. FIG. 5 is an explanatory diagram for explanating a display screen when the overwriting gradation representation is not performed. FIG. 6 is an explanatory diagram for explaining a display screen when only the overwriting operation is carried out.

Figure 7:
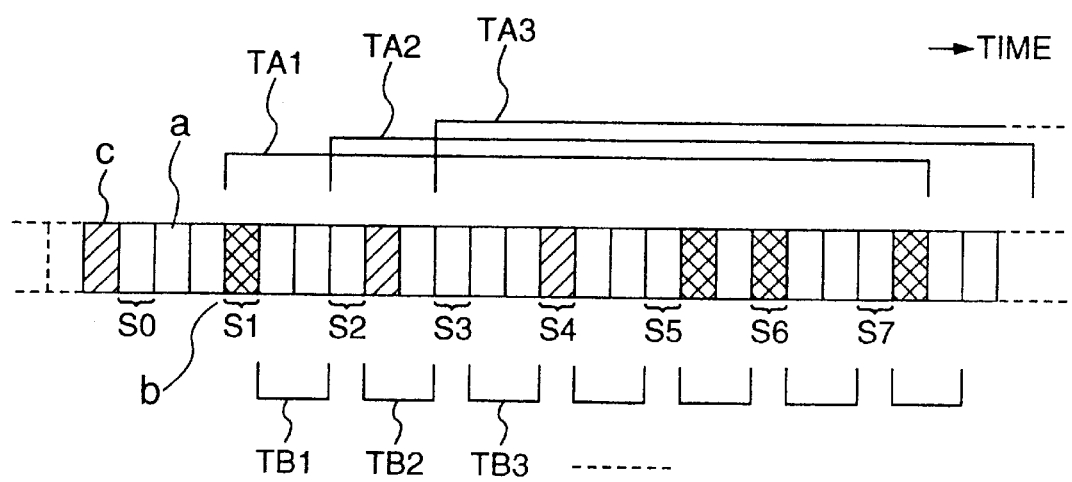
FIG. 7 is a timing chart for explaining the sampling operations executed during the overwriting operation and the gradation representation in the embodiment of the present invention.

Such a difference in the display screen will now be explained with reference to FIG. 7. In FIGS. 4 to 7, "a" represents a signal (phenomenon) appearing with a highest frequency, "b" a signal (phenomenon) appearing with a middle frequency and "c" a signal (phenomenon) appearing with a lowest frequency.

FIG. 7 represents the operations from the sampling operation of the input signal to the display of the waveform. In the normal digital oscilloscope, the sampling operation is carried out during time periods indicated by S1, S2, S3, - - - . During a time period of TB1, the data sampled in the time period S1 is bit-map-processed. During a time period of TB2, the data sampled in the time period S2 is bit-map-processed. During a time period of TB3, the data sampled in the time period S3 is bit-map-processed. The bit-map-processed data are written into the display memory and thereafter displayed. At this time, when such a signal as shown in "b" and "c" is sometimes superimposed on a waveform as indicated by "a" in FIG. 4 in the normal condition, as apparent from FIG. 7, such a signal (phenomenon) b is grasped by sampling of S1 during the time period TB1 in the normal digital oscilloscope. However, since the data sampled at the timing of the sampling period S2 during the next period TB2 is displayed, such a signal "b" displayed during the time period TB1 would disappear in an instant. As a result, such a signal whose occurrence frequency is low would be observed as the screen flicker by the observer. In other words, the waveform observer can merely recognize such as signal as the waveform "a" as shown in FIG. 5, although this signal actually contains the waveform "b" and the waveform "c".

In such a case, the overwriting representation is conventionally performed. This overwriting representation implies that as indicated in FIG. 7, the sampling data are overwritten on the memory for a preselected time period, and then these sampling data overwritten into the memory are displayed. In the example of FIG. 7, the sampling data (S1, S2, - - - , S7 in time period TA1) in the respective time periods TA1, TA2, - - - , are overwritten on the display memory, and these sampling data are successively rewritten from the old data, so that the display time periods of the sampling data are prolonged as TA1, TA2, TA3, - - - . With such a process operation, it may avoid such a risk that such signals as indicated by "b" and "c" of FIG. 4, whose occurrence frequencies are low would disappear.

However, as represented in FIG. 6, since the representation brightness of the conventional digital oscilloscope is constant, the waveforms "all", "b" and "c" are displayed in the same brightness irrespective of the generation frequency thereof. On the other hand, as indicated in FIG. 4, when the same waveforms are displayed in the analog oscilloscope, the waveform "a" is displayed in bright, the waveform "b" is displayed in dark, and the waveform "c" is displayed in further dark on the basis of the principle idea. In other words, the observer can immediately read differences in the occurrence frequencies of the waveforms at a glance.

According to the present invention, such a waveform representation as in the analog oscilloscope can be realized in the digital oscilloscope. That is, in accordance with the present invention, the waveform data stored at the same addresses in the display memory are summed with each other, and when the summation number is large, the waveform of this data is displayed in bright, whereas when the summation number is small, the waveform of this data is displayed in dark. In other words, when the occurrence frequency of the waveform is high, this waveform is displayed in bright, whereas when the waveform is low, this waveform is displayed in dark.

Namely, when the waveform data read from the acquisition memories 3a and 3b are converted into the bit map data based upon the software process operation, with respect to the respective bits corresponding to the display screen, the preceding bit map data are added to each other in the respective positions corresponding to this bit. That is, the waveform data located at the position corresponding to the bits added several times is displayed in bright, whereas the waveform data located at the position corresponding to the bits added few time.

For example, in the case that the waveform is displayed in 2-bit gradation, bright namely brightness is varied at four stages. In other words, the bit map data read from the display memory 4 is D/A-converted by the gradation processing circuit 1131 shown in FIG. 8 to be converted into display data in the four gradation. Apparently, according to the present invention, the bit map data may be displayed in more than 3-bit gradation. In this case, the waveform can be displayed in more natural.

Figure 8:
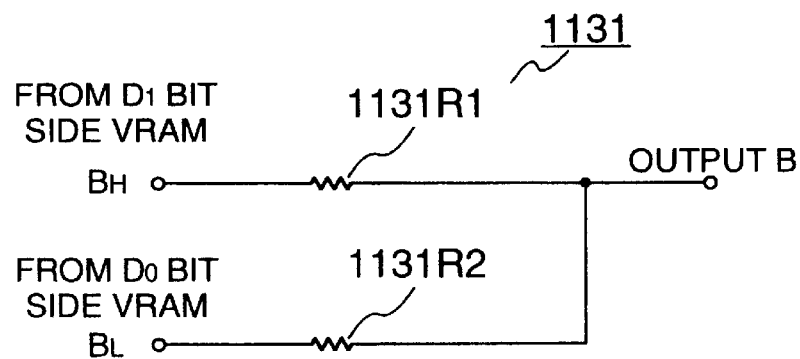
FIG. 8 schematically shows a circuit diagram of one example of the gradation processing circuit according to an embodiment of the present invention.
Figure 24:
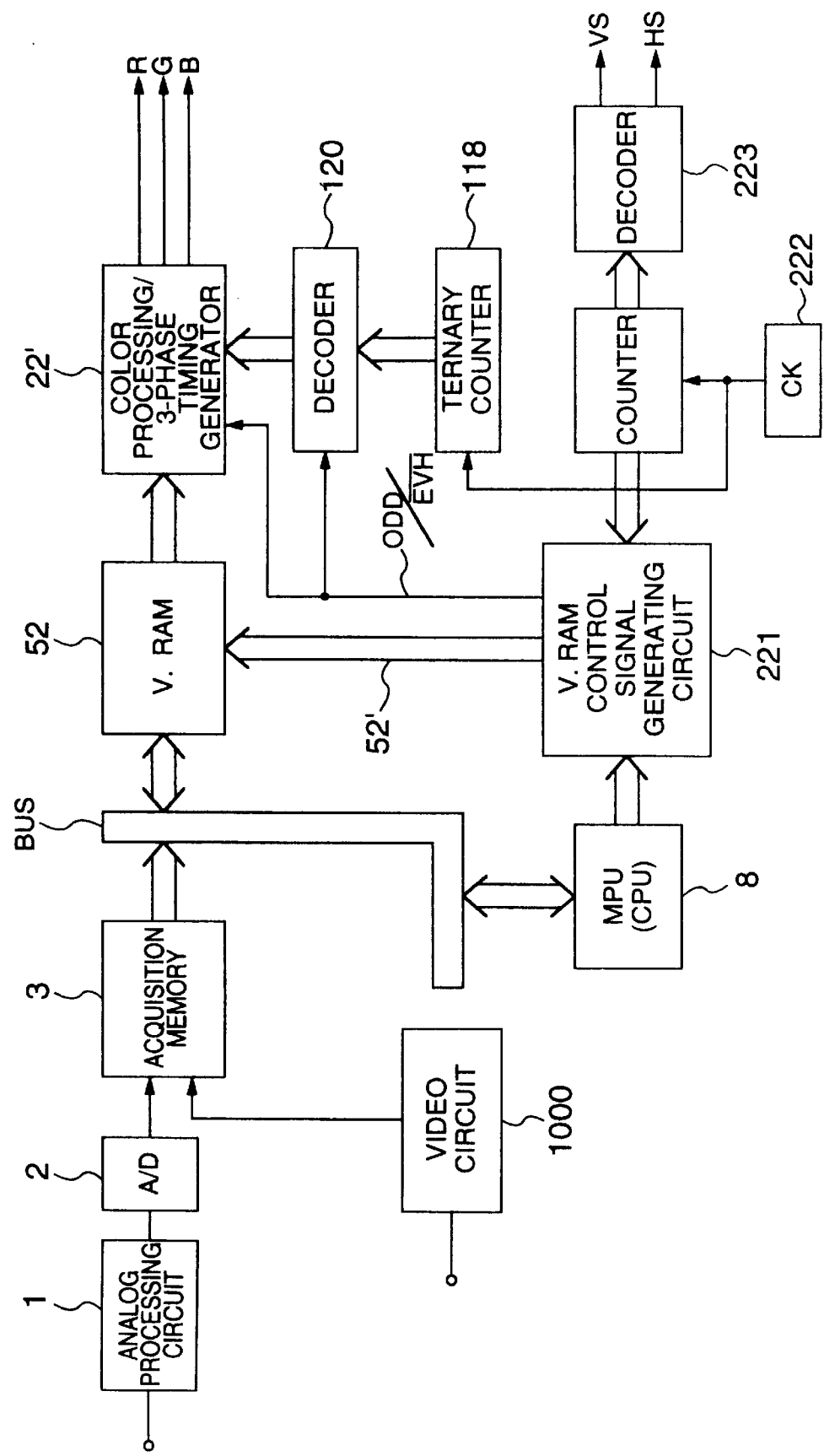
FIG. 24 is a schematic block diagram for representing a partial arrangement of an oscilloscope having a video signal input, according to an embodiment of the present invention.
Figure 25:
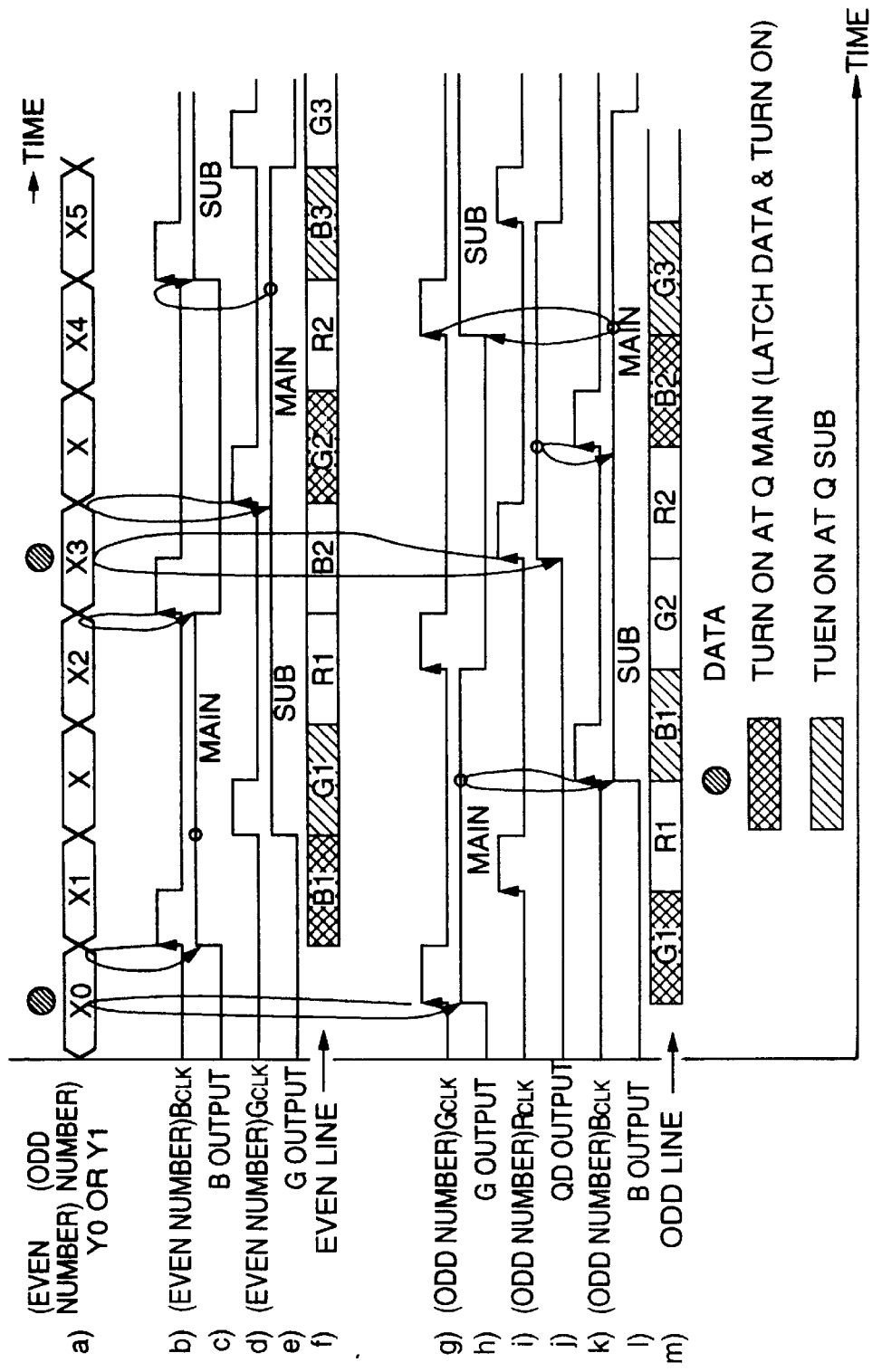
FIG. 25 is a timing chart for explaining operations of the oscilloscope shown in FIG. 24.

FIG. 8 represents an arrangement of a blue-color gradation circuit 1131B corresponding to a gradation circuit (D/A converting circuit) 1131 for the 2-bit gradation representation, which is applied to embodiments of FIG. 24 and FIG. 25. In FIG. 8, reference numerals 1131R1 and 1131R2 are resistors, and a resistance value of the resistor 1131R2 is two times higher than that of the resistor 1131RI. Although only the blue (B) color signal of the display device 7 is shown in FIG. 8, gradation circuits 1131R and 1131G for other color signals, i.e., R(red) and G(green) have the similar circuit arrangements.

As to the gradation data, if the gradation data is merely added to each other, then all of these bits will become a maximum value, so that the finite overwriting display is used in combination therewith. This finite overwriting display is defined as follows. Assuming now that the adding number of the bit map data is "t", when this adding number "t" exceeds the finite overwriting number (namely, the number of bit map data displayed within one time), the obtest bit map data is discarded and the new bit map data is added to the remaining bit map data this operation is repeated.

For example, when a video (picture) signal waveform during 1 horizontal scanning period is overlapped with each other for 1 field to be displayed, information contained in the respective waveforms during the respective 1 horizontal scanning periods is represented with having brightness differences in accordance with occurrence frequencies thereof. In other words, this waveform representation is resembled to the analog waveform display. A video signal is such a signal having different information during all of a display period and a no display period (blanking period). As a consequence, this video signal can be met with such a requirement for monitoring all of the information. Such a representation cannot be realized in the normal digital oscilloscope, because the display brightness of this digital oscilloscope is constant.

Next, a description is made of operations when such a signal is displayed in the waveform monitor function, the vector scope function, and the picture display function of the embodiment shown in FIG. 2. This signal is processed not by the video signal exclusive input 1005, but from the oscilloscope input terminals 1010a and 1010b to the analog processing circuit 1 of the oscilloscope. As one of the features according to this embodiment, a signal switching circuit 1114 is employed which can select the signal passing through the analog processing circuit for the oscilloscope.

As a result, when the waveform monitor, vector scope, picture display functions are available, it is possible to input the signal outputted from the analog processing circuit 1 of the oscilloscope. For instance, even when the video signal is monitored as the normal oscilloscope, if the video function is used, then the connection of the input terminal need not be changed by merely changing the signal switching circuit 1114. In other words, the waveform monitor, the vector scope, and the picture display are simply available from the waveform representation as the oscilloscope.

Furthermore, normally, the waveform monitor, the vector scope, and the picture monitor are exclusively used to monitor a signal of a video appliance under signal interface with 1 V peak-to-peak and 75 ohms. However, although the internal circuits of the video appliances must be monitored during the maintenance service of this video appliance, these internal circuits are not always designed as 1 V peak-to-peak and the impedance of 75 ohms, but may be designed with various signal levels and various impedances. As a consequence, the waveforms of the internal circuits cannot be monitored via the normal video signal exclusive input terminal with 1 V peak-to-peak and the impedance of 75 ohms. However, since the input connection means for causing the signal to pas through the analog processing circuit 1 of the oscilloscope is employed, it is possible to perform the waveform monitor, the vector scope, and the picture display irrelevant to the signal levels and the impedances.

Next, the method for driving the flat dot matrix color display device suitable for both the picture monitor function and the oscilloscope display, according to the third embodiment, will now be explained.

Subsequently, a description will now be made of such a technique for using a so-called "AV (audio/video)-purpose LCD" (namely, LCD for television receiver) for such an embodiment.

When an LCD for a television receiver is employed as a display screen for a picture monitor, since such an employment is suitable to the original use purpose, there is no specific problem. As a result, in the oscilloscope according to the optimum embodiment of the present invention, the LCD for the television receiver, a so-termed "LCD for AV purpose" is employed. On the other hands, since an LCD for an OA (office automation) purpose used in a computer monitor display device is directed to display digital data, there is no problem when a waveform of an oscilloscope is displayed thereon. However, when a television picture is displayed on the AV-purpose LCD, the signal converting process and the like are required. Also, this AV-purpose LCD owns another problem of resolution when the waveform of the oscilloscope is displayed, and therefore cannot be used.

The below-mentioned embodiment can solve such a problem, and can achieve that an AV-purpose LCD suitable for the picture monitor can be sufficiently used as a display device of an oscilloscope, which will be described in detail.

As is well known, a cathode-ray tube (CRT) is conventionally used as a display device of an oscilloscope.

For instance, the oscilloscope with employment of the color CRT, and the oscilloscope in which the color liquid crystal display shutter is provided in front of the CRT have been proposed, as disclosed in, for instance, JP-A-53-84789, JP-A-54-8566, and JP-U-58-14171. When such oscilloscopes are used, the waveforms can be displayed in the different colors with respect to the respective display channels, so that these waveforms can be very easily observed.

However, a CRT requires a very long length from a tube screen to an electronic gun, in proportional to a size of this tube screen, which may impede a compactness of an oscilloscope.

On the other hand, as a compact oscilloscope with light weight, the digital oscilloscopes with employment of the liquid crystal displays (will be an "LCD" hereinafter) have been proposed. These digital oscilloscopes employ monochromatic LCDs. For example, JP-A-4-143664 describes such a digital oscilloscope with using the active matrix type LCD as the display apparatus. This invention has proposed that the switch elements for driving the pixel electrode groups are fabricated within noncrystal thin-film layer, and the LCD usable to the oscilloscope is available. However, these LCDs are the monochromatic LCDs exclusively used for the oscilloscopes, by which the waveforms cannot be displayed in color.

When a color display is made, an LCD for a computer display (so-called an "OA-purpose LCD") is employed, or a color dot matrix flat display device referred to as a so-called "audio/vidual-purpose display device" is used on which such data as a monitoring waveform is displayed.

In the OA-purpose LCD, the display colors corresponding to the display positions of the waveforms can be designated. Since 1 pixel is constituted by 3 dots (RGB), when the display screen becomes small, the required resolution along the horizontal direction is lowered. Also, when 1 dot is made small, there are manu problems in the manufacturing precision. Furthermore, the cost of the OA-purpose LCD is very high, and since the size thereof is large, the oscilloscope cannot be made compact.

As previously explained, a video signal cannot be directly inputted to an OA-purpose LCD. That is, this video signal should be subjected to an analog-to-digital conversion, a serial parallel conversion or the like.

On the other hand, when an active matrix type LCD called as an AV-purpose television receiver is employed in an oscilloscope, since the video monitor operation, namely the picture monitor display operation is fitted to the original purpose, there is no problem. However, in such a case that this active matrix type LCD is employed so as to display the waveform of the oscilloscope or as the waveform monitor under the same conventional control system (namely, similar control to a CRT display), since the display control is carried out every 1 line, namely the display control is carried out based upon the horizontal sync signal, such a phenomenon that 1 pixel of the LCD is illuminated at a certain position and 2 pixels of this LCD are illuminated at another position happens to occur, resulting in deterioration of the display grade in the horizontal direction.

In particular, when a compact color dot matrix flat display device is used in an oscilloscope, since the total number of pixels along the horizontal direction is fewer, the display grade such as smoothness of the display waveform would be deteriorated.

It should be understood that a color dot matrix flat display device used in an OA (office automation) purpose implies such a display device in which upon receipt of a clock (i.e., external clock) from a display control unit for controlling this display device, and image data in synchronism with this clock, and pixels are driven and scanned in response to this clock.

On the other hand, a color dot matrix flat display device for an AV (audio/visual) purpose implies such a display device that a sampling operation and a scanning operation are carried out in response to an externally applied video signal (VIDEO). This color dot matrix flat display device includes a frequency synthesizer (e.g., a PLL), and displays a picture in response to the clock signal supplied from this synthesizer.

Considering the actual using conditions, the oscilloscope having the video input, according to the embodiment of the present invention, is preferably made compact and in light weight. As a consequence, a flat display device such as an LCD is suitable as the display device. The following descriptions of this embodiment are featured that the color dot matrix flat display device is employed as the display device, and the above-described AV-purpose color dot matrix flat display device is employed in optimum condition.

In an oscilloscope having a video input according to this embodiment, during the operations of the oscilloscope, the waveform monitor, and the vector scope, the frequency dividing value (the frequency division of the horizontal sync signal is produced from the clock frequency of the display signal produced from the display signal generating unit) used to produce the horizontal sync signal supplied to the waveform displaying color dot matrix display device is selected to be higher than the frequency dividing value (the frequency division of the internal horizontal sync signal is made from the scanning lock frequency) used to the internal horizontal sync signal of the waveform displaying color dot matrix display device.

As a result, even during the operations of the waveform monitor, the vector scope and the oscilloscope, the coordinate points to be displayed (display data points) can be controlled in unit of at least 2 dots, so that high precision display can be made.

During the operations as the waveform monitor, the vector scope, and the oscilloscope, according to the present invention, a single coordinate value is given to the respective two dots of the R pixels, G pixels, or B pixels, otherwise the two dots of these pixel combinations, or the dots of the adjoining dots, which are controlled in dot unit. Conventionally, a single coordinate value is given to three dots of R, G, B functioning as 1 pixel, and these dots are controlled in unit of 1 pixel.

Figure 48:
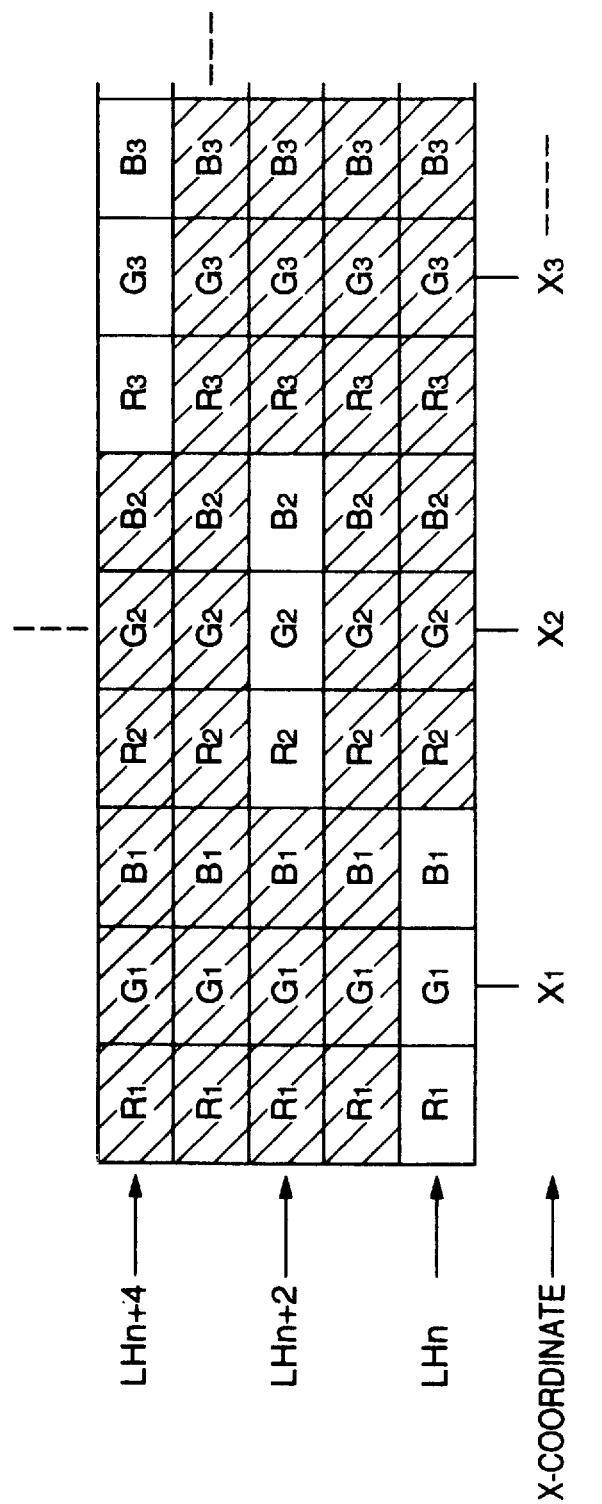
FIG. 48 is an explanatory diagram for explaining an enlarged screen of a color LCD display unit employed in the prior art.
Figure 49:
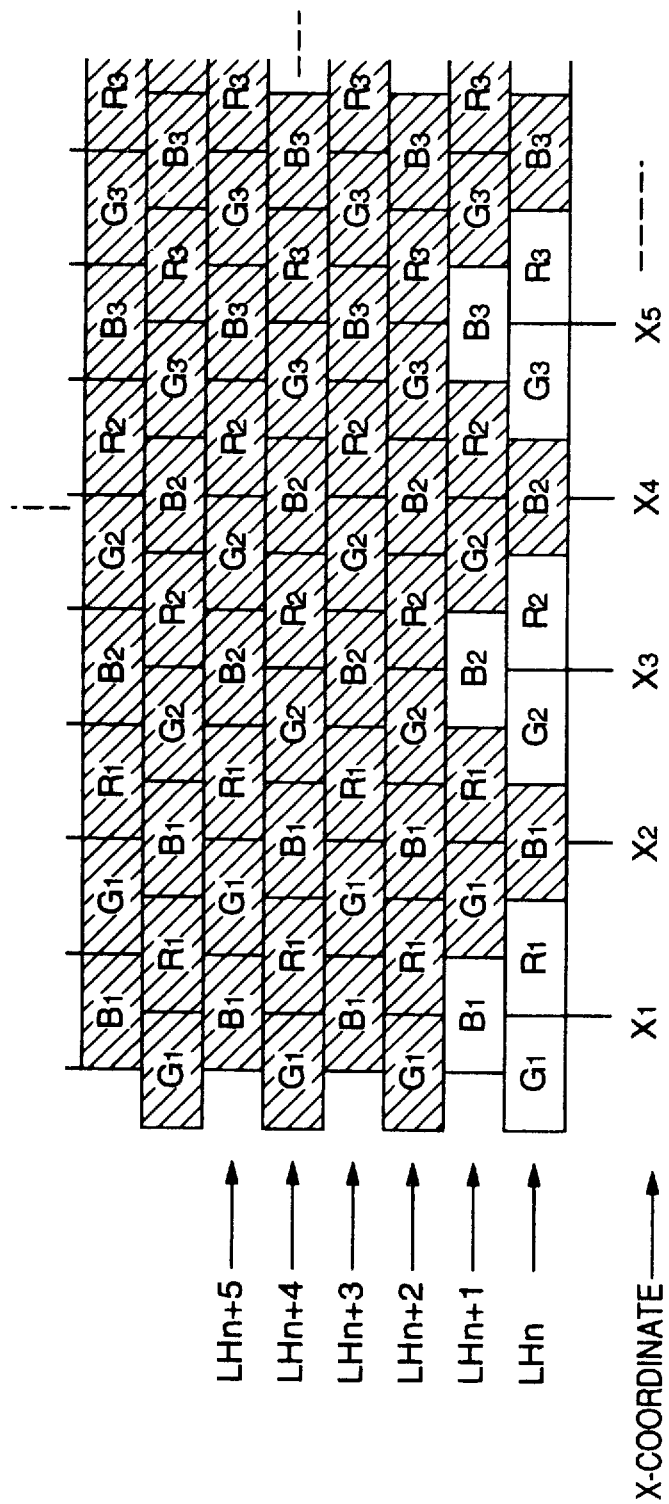
FIG. 49 is an explanatory diagram for explaining an enlarged screen of a color LCD display unit employed in the prior art.

It should be noted that FIG. 48 and FIG. 49 are explanatory diagrams for explaining the conventional normal LCD display method as reference purposes. Both drawings show a portion of the LCD display screen in an enlarged manner. In the conventional example of FIG. 48, the dots of the R, G, B pixels are arranged along the transverse direction. In this conventional case, the dot control is carried out in such a manner that three dots constitute 1 pixel as R1, G1, B1; R2, G2, B2; - - - . When an inclined straight line is displayed under such a condition, this straight line is represented as in this drawing. In FIG. 49, the dots of R, G, B pixels are arranged in a delta shape. Similar to the example of FIG. 48, FIG. 49 represents a straight line along the horizontal direction based upon the control for 1 pixel constructed of 3 dots of R, G, B pixels.

A first description will now be made of a color LCD control performed in this embodiment with reference to FIG. 9.

In this drawing, the color dot matrix flat display device is a color liquid crystal display device (LCD) 70. This color LCD 70 includes a color LCD dot scanning circuit 10, a frequency synthesizer circuit 25 (for example, a phase-locked loop), an inverter 29, and a color LCD display unit 60. The PLL circuit 25 is comprised of a voltage controlled oscillator (VCO) 11 for producing a color dot scan clock 14 having a frequency $f_s$, a frequency divider 12 for frequency-dividing the frequency $f_s$ of this clock 14 by a frequency dividing ratio Ns (Ns: for example, 645), and a phase comparator 13 for comparing a phase of an output signal 15 (SH: time period tHS) of the frequency divider 12 with a phase of a horizontal sync signal 20 (SH) having a time period $t_H$ derived from a display control unit 900, and thereby for outputting deviation between these phases to the VOC 11. The LCD dot scanning circuit 10 applies the display data 24B, 24G, 24G derived from the display control unit 900 to the pixels of the color LCD display unit 60 in response to the scan clock 14 and another scan clock 14' given from this scan clock 14 via the inverter 29. The output signal 15 from the frequency divider 12 is supplied as the horizontal sync signal SH to the dot scanning circuit 10, and is used together with a vertical sync signal 70 (will be discussed later) in this dot scanning circuit 10 so as to sequentially scan the waveform data. It should be noted that this horizontal sync signal SH is synchronized with the scan clocks 14 and 14', and may be produced by way of another method. The vertical sync signal SV is produced by a frequency divider 17 and then is supplied via the display switching circuit 1003 to the LCD dot scanning circuit 10 of the color LCD 70.

Then, the display control unit 900 will now be described.

The display control unit 900 of the oscilloscope having the video input includes a sync signal generating circuit 16 and a three-phase timing generating circuit 22 for performing a color control. The sync signal generating circuit 16 contains a clock generating circuit 51 for generating a clock signal having a frequency of 2fd (for example, 20 MHz) and another clock signal 19 having a frequency fd; a frequency divider 17 for frequency-dividing the clock signal 19 by a frequency dividing ratio of Nd (e.g., 645) to output a clock signal (horizontal sync signal SH') 20; a ternary counter 18 for generating 3-phase clock signals $B_{CLK}$, $G_{CLK}$, $R_{CLK}$ based on the clock signal 26; and a 3-phase timing generating circuit 22 for sequentially outputting red, green, blue display data 24R, 24G, 24B in response to the 3-phase clock signal derived from this ternary counter 18. Based upon this vertical sync signal SV and the horizontal sync signal SH' supplied via the display switching circuit 1003 to the color LCD 70, the display data output timing in the display control unit 900 is synchronized with the vector and waveform display timings in the color LCD 70. The detailed content of the 3-phase timing circuit 22 will be discussed later.

It should be noted that since the data supplied to the display memory 4 are identical to the display data used in the conventional oscilloscope, detailed explanations thereof are omitted.

Then, operations of the color LCD 70 and the display control unit 900 will now be explained.

In accordance with the present invention, the horizontal sync signal SH' 20 which is generated from the display control unit 900 and determines (synchronized) the output timings of the display data 24B, 24G, 24R is supplied via the display switching circuit 1003 to the color LCD 70. In the PLL circuit 25 of the color LCD 70, scanning clock signals 14 and 14' for the display data 24B, 24G, 24R synchronized with this horizontal sync signal SH' 20 are produced.

Furthermore, in accordance with this embodiment, the time period tH of the horizontal sync signal SH' 20 derived from the display control unit 900 is equal to a time period (tHs) of an output signal 15 (horizontal sync signal SH) of the frequency divider 12 employed in the PLL circuit of the color LCD 70. In other words, while giving an attention to a relationship among the frequency $f_s$ of the color LCD dot scanning clocks 14, 14' of the PLL circuit 25 of the color LCD 70 shown in FIG. 9, the time period tHS of the signal (horizontal sync signal) within the color LCD, and the frequency dividing ratio Ns of the frequency divider 12 for producing this signal being equal to tHS=1/$f_s$×Ns, a relationship among the time period tH of the horizontal sync signal SH' produced from the sync signal generating circuit 16 of the display control unit 900 for the oscilloscope having the video input, the frequency dividing ratio Nd of the frequency dividing device 17 for producing this signal, and the frequency fd of the clock signal 19 is set to 1/fd×Nd=tH =tHS.

In other words, the clock frequency of the display data 24G, 24B, 24R supplied to the waveform displaying color LCD 70 is higher than the frequency of the scanning clocks 14, 14' of the waveform displaying color LCD 70 by an integer. That is, a ratio of the frequency dividing ratio "Nd" to the frequency dividing ratio "Ns" is equal to a multiplication by an integer. The frequency dividing ratio Nd is of the frequency divider 17 for producing the horizontal sync signal SH' supplied to the waveform displaying color LCD 70. The frequency dividing ratio Ns is of the frequency dividing device 12 for producing the internal horizontal sync signal SH of this color LCD.

In this case, preferably, these time periods tHS and tH are selected to be 63.5 $\mu$s.

Figure 9:
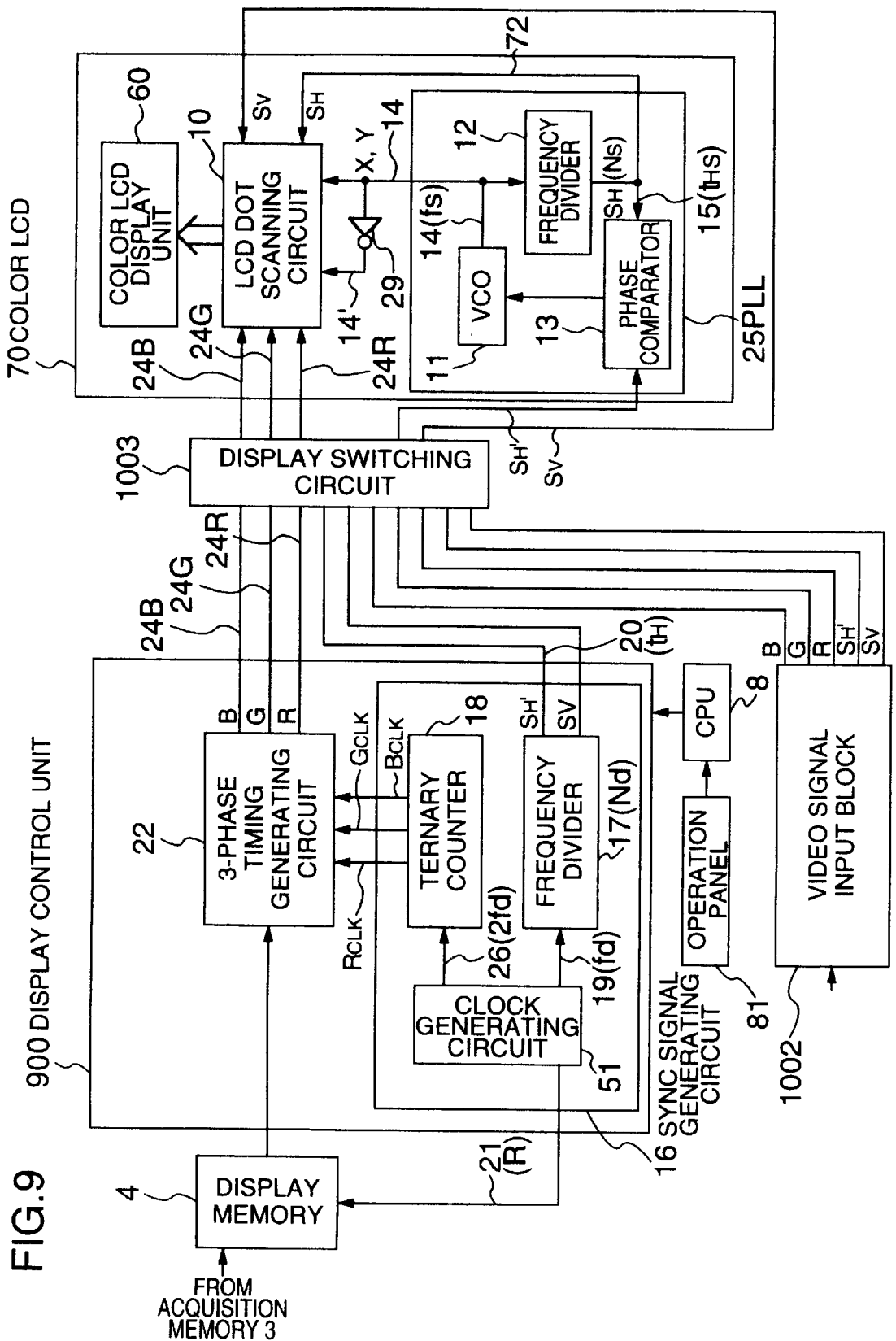
FIG. 9 is a schematic block diagram for representing a partial arrangement of an oscilloscope having a video signal input, according to an embodiment of the present invention.

With the above-described process operation, since the time period tH of the horizontal sync signal 20 of the display control unit 900 is substantially equal to the time period tHS of the internal horizontal sync signal of the PLL circuit 25 by way of the PLL circuit 25 of the color LCD 70 shown in FIG. 9, assuming now that the frequency dividing ratios of the frequency divider 12 to the frequency divider 17 are, for example, Ns=Nd, the frequency $f_d$ of the output clock 19 of the clock generating circuit 51 is equal to the frequency $f_s$ of the VCO 11 (namely $f_d=f_s$) As a consequence, the display data is produced in synchronism with the dot scanning operation of the color LCD 70. Furthermore, the color LCD 70 is operated in response to the R, G, B display signals of the 3-phase timings corresponding to the dot arrangement of the display dot by the ternary counter 18 and the three-phase timing generating circuit of the display control unit 900.

Next, the featured operations when the display data is operated in response to the R, G, B display signals corresponding to the pixel arrangements will now be explained more is detail.

Figure 10:
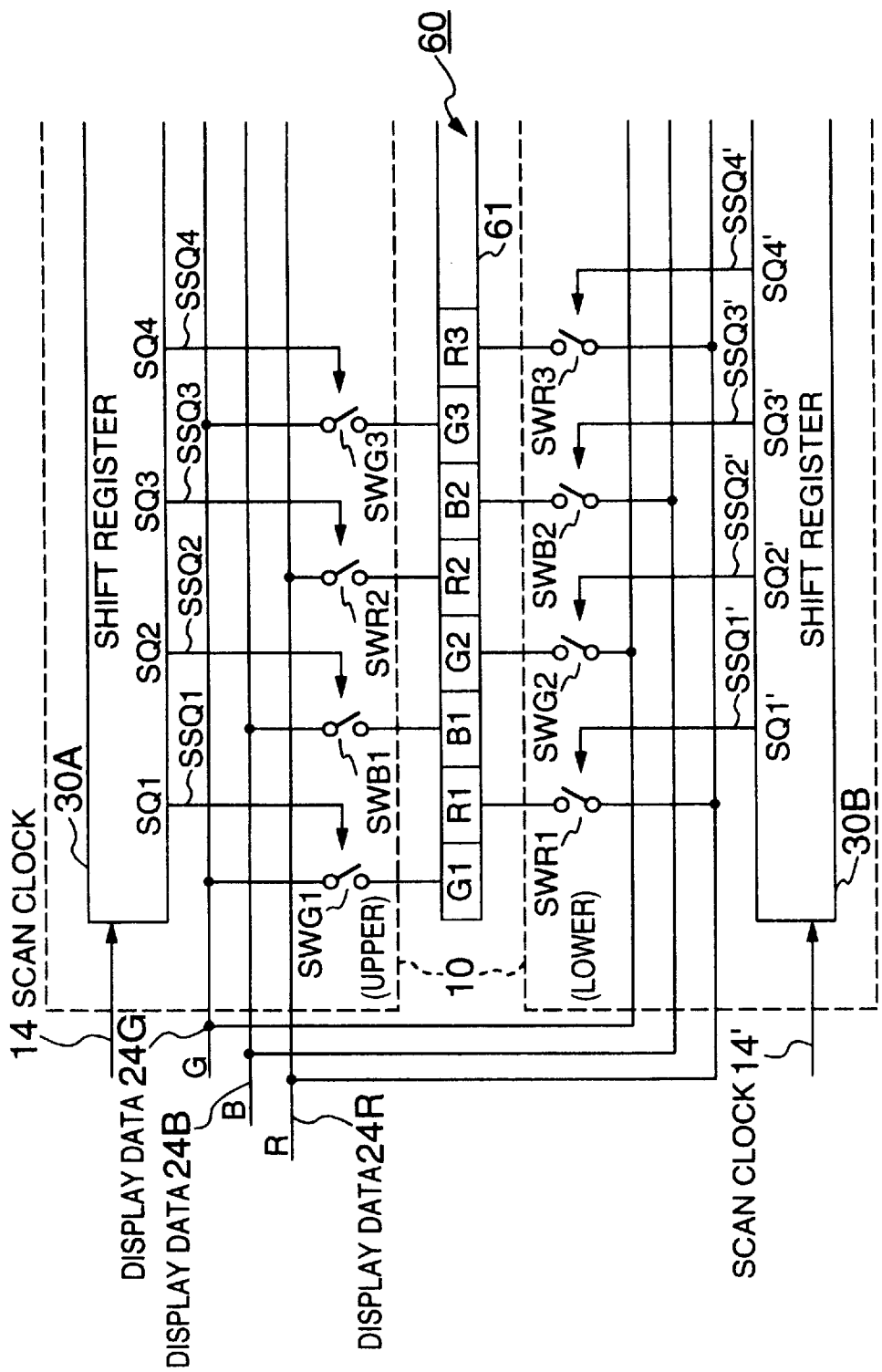
FIG. 10 is a schematic structural diagram of the LCD for explaining the present invention.

A detailed circuit arrangement of the dot scanning circuit 10 of the color LCD 70 is represented in FIG. 10. In FIG. 10, the dot scanning circuit 10 includes shift registers 30A, 30B for sequentially turning ON/OFF switch groups SWG1, SWB1, SWR2, - - -, and switch groups SWR1, SWG2, SWB2, - - -, in response to the scan clock signals 14 and 14'; and one pair of switch group for selectively supplying the display data 24R, 24B, 24G to the pixel 61 of the color LCD display unit 60 so as to emit the light therefrom. In FIG. 10, for the sake of convenience, only a portion of a one line present in the color LCD display unit 60 is shown. Actually speaking, as one example, the color LCD display unit 60 contains, for instance, 480 dots along the horizontal scanning direction, and 256 dots (256 lines) along the vertical scanning direction. As a result, one pair of shift registers and also one pair of switch groups are provided in corresponding to each of these lines. The shift registers are switched every line in response to the horizontal sync signal 72 ($S_H$) and the shift registers are switched every 1 screen in response to the vertical sync signal 70 ($S_v$).

Figure 11:
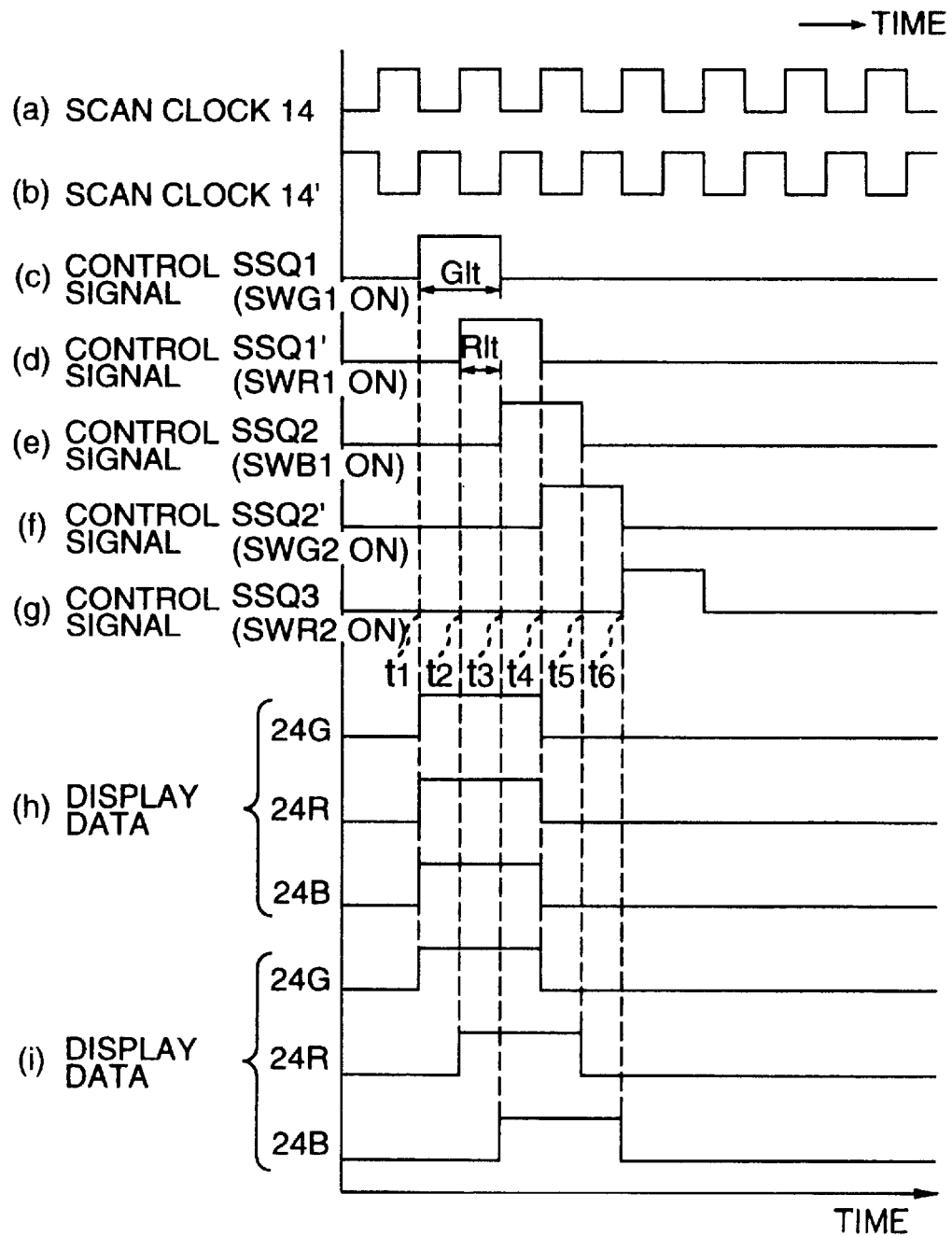
FIG. 11 is a timing chart for showing a signal waveform used to explain a three-phase timing for explaining the embodiment of the present invention.

Referring now to FIG. 10 and FIG. 11, operations of this dot scanning circuit 10 will be described.

In synchronism with the scan clock 14 and the scan clock 14' having the opposite phase to that of the first-mentioned scan clock 14, switch control signals SSQ1, SSQ1', SSQ2, SSQ2' and SSQ3 are produced from output terminals SQ1, SQ1', SQ2, SQ2', and SQ3 of the shift registers 30A and 30B at timings as indicated in FIG. 11(c) to FIG. 11(g). In response to the switch control signals, the switches SWG1, SWR1, SWB1, SWG2, SWR2 are sequentially turned ON. Then, while the respective switches are turned ON, when a voltage corresponding to the relevant display data is applied to this switch, this signal is charged into the respective dots. In other words, the switch SWG1 is turned ON in response to a high level portion of the control signal SSQ1, and thus the voltage corresponding to the display data 24G at this time is charged to the green pixel G1. Next, the switch SWR1 is turned ON in response to a high level portion of the control signal SSQ1', and thus the voltage corresponding to the display data 24R at this time is charged to the red pixel R1. Furthermore, the switch SWB1 is turned ON in response to a high level portion of the control signal SSQ2, and therefore the voltage corresponding to the display data 24B at this time is charged into the blue dot B1.

Subsequently, voltages corresponding to the display data are charged into the green dots G2, the red dots R2, the blue dot B2, the green dot G3, and the red dot R3.

It should be understood that the dot 61 of each line is normally operated by one pair of shift registers 30A and 30B in the color LCD, and this is one of the desirable structures in view of the matrix wirings of the elements, and the display speeds.

According to the present invention, the green (G), red (R) and blue (B) display data 24G, 24R, 24B are generated from the 3-phase timing generating circuit 22 of FIG. 9 at different timings. This different generation timing is caused by the following reason.

For example, when the adjoining pixels R, G, B are emitted to display the display data point in a white color, as in the prior art shown in FIG. 11(h), if the display data 24G, 24R, 24B are produced at the same time, then the display data 24G is charged into the dot G1 during a time instant $t_1$ to a time instant $t_3$ (time G1t), and the display data 24R is charged into the pixel R1 during a time instant $t_2$ to a time instant $t_4$. However, since the display data 24B is ended at the time instant $t_4$ while the switch SWB1-of the pixel B1 is turned ON, the light emission time of the pixel B1 would becomes a half of the light emission time about the pixel G1, or R1. As a result, the finally displayed color is not equal to white.

Therefore, according to this embodiment, as represented in FIG. 11(i), the display data 24G, 24R, 24B for the pixels G, R, B are produced by way of the ternary counter 18 and the 3-phase timing generating circuit 22 at different timings of the 3 phases. If the display data 24G, 24R, 24B are generated at such different timings, then these display data are made coincident with the ON-timings of the switches SWG1, SWR1, SWB1. That is, when the switch SWG1 is turned ON, the display data 24G is produced; when the switch SWR1 is turned ON, the display data 24R is generated; and when the switch SWB1 is turned ON, the display data 24B is produced. As a consequence, the displays of the display data can be controlled in unit of one dot, and the displayed color can be produced in a stable condition. For instance, a series of waveforms can be displayed in the same color without any blurring phenomenon.

Figure 12:
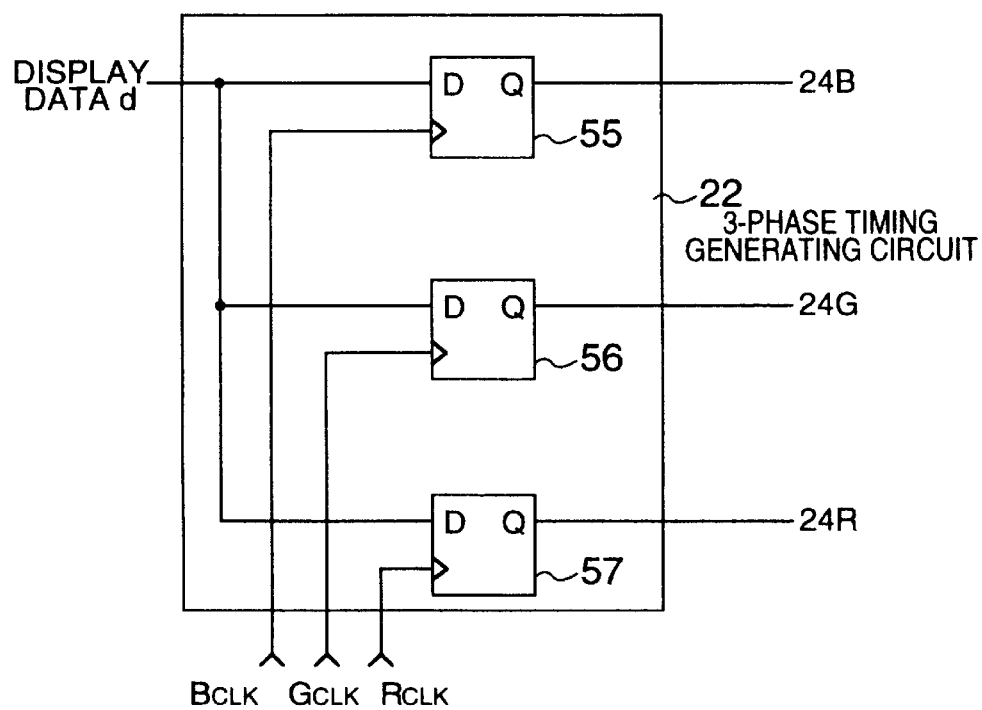
FIG. 12 is a circuit diagram for indicating one three-phase timing circuit according to the embodiment of the present invention.
Figure 13:
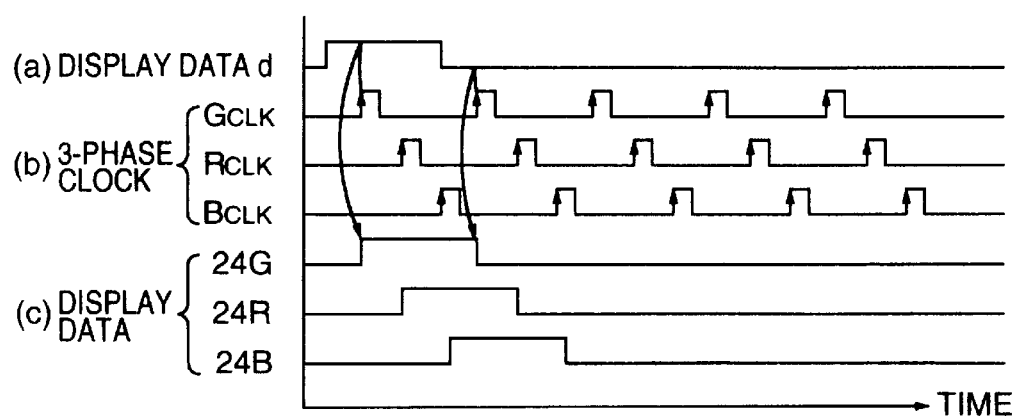
FIG. 13 is a timing chart for describing operations of the three-phase timing circuit of FIG. 12.

An example of a circuit arrangement of the 3-phase timing generating circuit 22 will be described with reference to FIG. 12 and FIG. 13. That is, FIG. 12 represents one example of the 3-phase timing generating circuit 22. FIG. 13 is a timing chart for explaining operations when a white color is displayed as the display color. The 3-phase timing generating circuit 22 includes, for instance, three sets of D type flip-flops 55, 56, 57 having latch inputs into which the 3-phase clock signals $R_{clk}$, $G_{clk}$, $B_{clk}$ (see FIG. 13b) derived from the ternary counter 18 (see FIG. 9). Accordingly, the respective flip-flops 55, 56, 57 latch the display data "d" in response to the corresponding clock signals and then output this display data. Thus, the flip-flops 55, 56, 57 output the display data 24G, 24R, 24B at such timings shifted by 1 time period from the 3-phase clock signals, as represented in FIG. 13(c).

Figure 14:
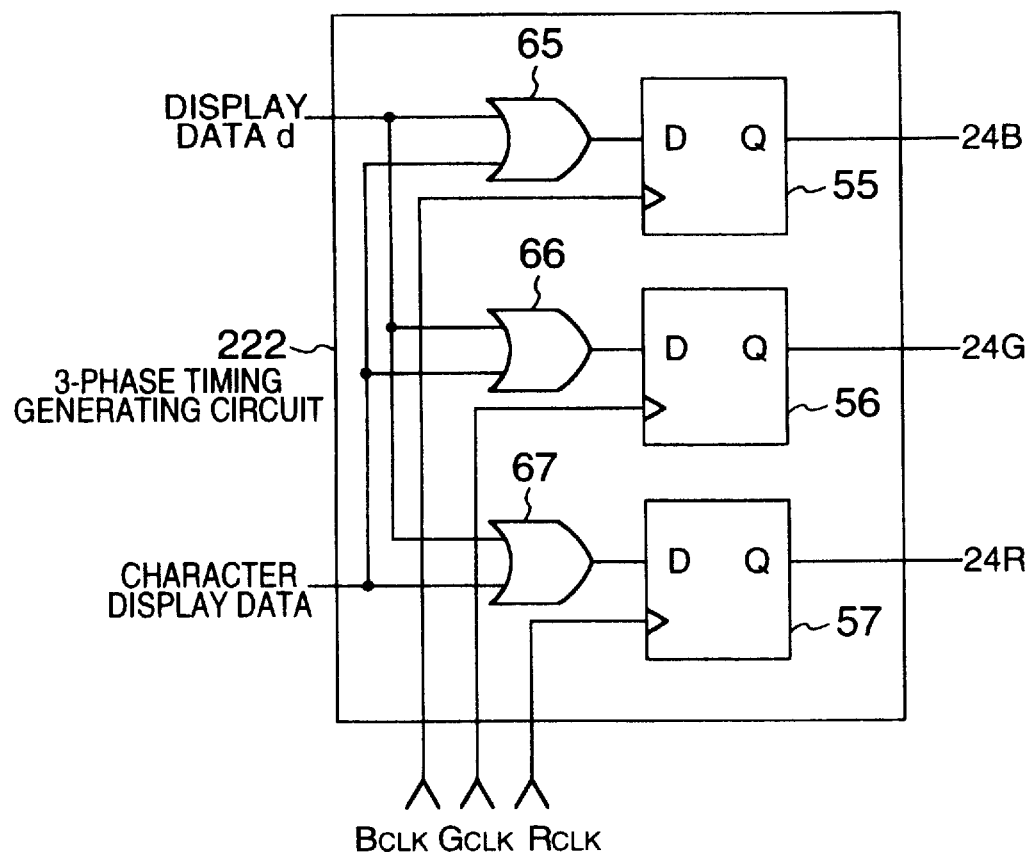
FIG. 14 is a circuit diagram for indicating another three-phase timing circuit according to the embodiment of the present invention.

In such a case that character data derived from a character display memory (not shown) is displayed in addition to the waveform data derived from the waveform display memory 4, the 3-phase timing generating circuit 22 is constituted by such a 3-phase timing generating circuit 222 as shown in FIG. 14. That is, OR gates 65, 66, 67 are provided on the data input sides D of the respective D type flip-flops 55, 56, 57. The display data "d" and also the character data read from the character display memory (not shown) are entered into the inputs of the respective OR gates, and then the outputs of the respective OR gates are entered into the data inputs of the corresponding flip-flops.

The character data is read out in response to the clock signal $f_d$ produced from the clock generating circuit 51.

As previously explained in FIG. 49, in the normal color LCD for displaying the television picture, the respective pixels R, G, B are usually arranged in the delta form.

On the other hand, in the oscilloscope having the video input, capable of observing the picture image (namely, picture monitor function), according to the present invention, it is preferable to obtain such an LCD capable of simply displaying the video image thereon.

In the below-mentioned embodiment, even when such a color LCD that the light emitting dots are arranged in the delta form suitable to the television receiver is commonly used as the waveform display of the oscilloscope, the waveform can be displayed-in high resolution.

Then, this feature will now be explained with reference to FIG. 15 through FIG. 19. these figures show a portion of a color LCD screen in an enlarge form, and symbols R, G, B indicate red, green, blue dots 61, and symbol LO denotes an odd line, symbol LE shows an even line.

Figure 15:
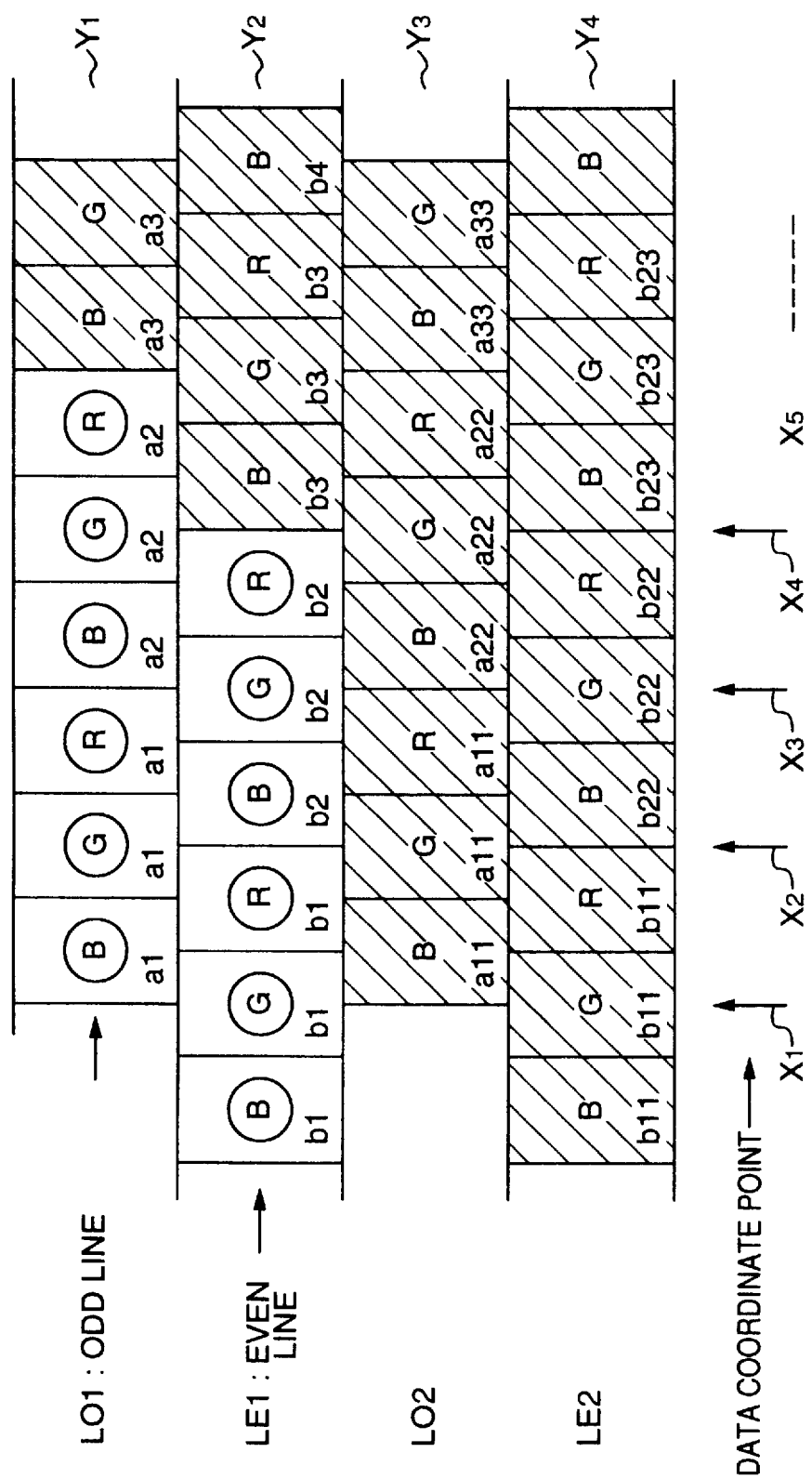
FIG. 15 is an explanatory diagram for schematically showing the enlarged screen of the color LCD display unit so as to explain the prior art.

As represented in FIG. 15, when a white color is emitted by employing the conventional display data displaying method, for instance, in the odd line LO1, three dots Ba1, Ga1, Ra1 are emitted at the same time as one display unit. Next, three adjacent dots Ba2, Ga2, Ra2 are emitted at the same time as one display unit. Similarly, in the even line LE1, three dots Bb1, Gb1, Rb1 are emitted at the same time as one display unit. Next, three adjacent dots Bb2, Gb2, Rb2 are emitted at the same time as one display unit. Accordingly, the coordinate points of the data are dots Ga1, Ga2, - - - , in the line LO1.

In other words, one pixel is controlled as three dots (R, G, B) in prior art.

Figure 16:
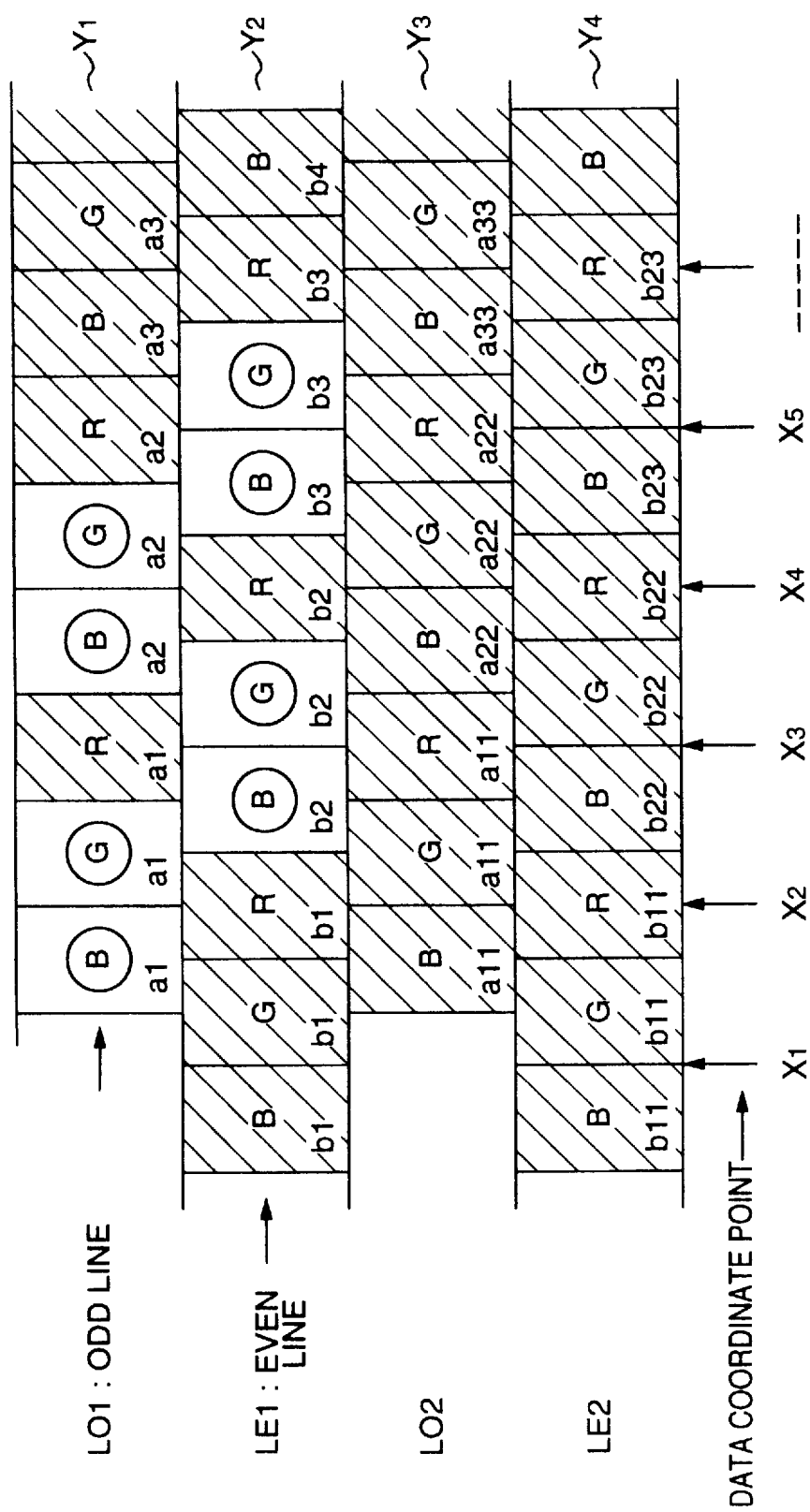
FIG. 16 is an explanatory diagram for schematically showing the enlarged screen of the color LCD display unit so as to explain the prior art.

As a consequence, when the dot G and the dot B are emitted to display a cyan color in accordance with the conventional method, as indicated in FIG. 16, the dots Ba1 and Ga1 constitute one display unit in the line LO1. The next display unit becomes the dots Ba2 and Ga2. In the line LE1, the dots Bb2 and Gb2 constitute one display unit, and the next display unit becomes the dots Bb3 and Gb3.

As an example, such a display operation will now be explained in which the dots G and B are emitted, and the respective points of the coordinates X2-Y1, X2-Y2, X2-Y3, and X2-Y4 are displayed as longitudinal line data in a cyan color.

Figure 17:
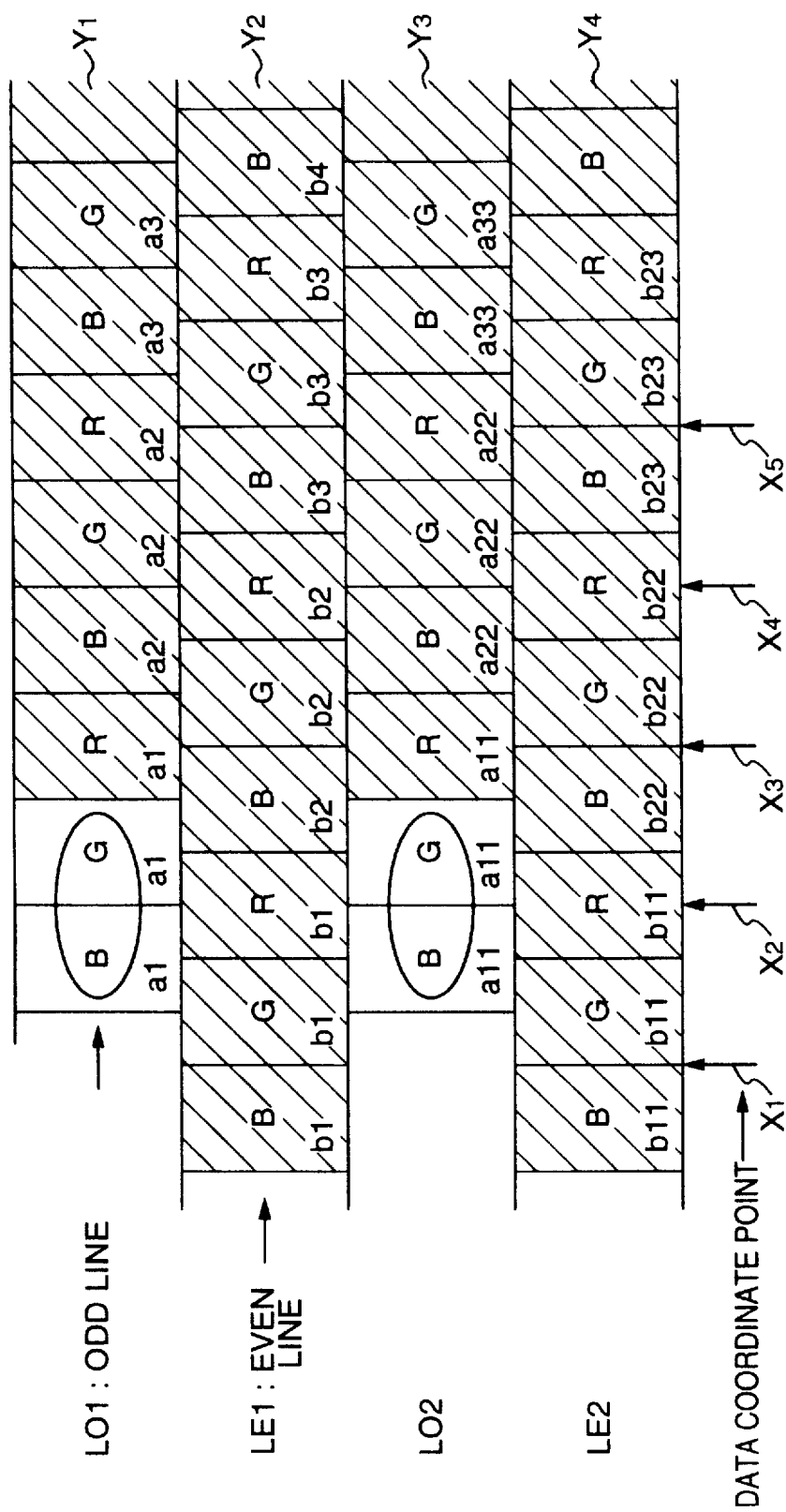
FIG. 17 is an explanatory diagram for schematically showing the enlarged screen of the color LCD display unit so as to explain the prior art.

When the display data are controlled by the conventional display method, as illustrated in FIG. 17, after the display of the coordinate X2-Y1 (dots Ba1, Ga1) of the odd line LO1, there is only the pixel R in the coordinate X2-Y2 of the even line LE1, but there is no display unit of the pixels B and G, so that no dot display is made. Since the dots Ba11 and Ga11 are present as one display unit in the coordinate X2-Y3 of the next odd line LO2, the dot display is made. Furthermore, since only the dot R is present in the coordinate X2-Y4 and there is no display unit of the dots B and G, no dot display is made. As described above, when the longitudinal line data is displayed, if there is no pixel at the position corresponding to the coordinate, which is desired to be displayed, this data cannot be displayed.

To the contrary, according to this embodiment, one dot (each of R, G, B dots) is controlled as one pixel.

As a consequence, as explained above, the display data 24G, 24B, 24R for the respective dots are employed whose timings are synchronized with the turning ON/OFF operations of the switches SWG, SWB, SWR. As a result, when a white color is displayed, if the read clock produced from the clock generating circuit 51 is set as shown in FIG. 13 by the microcomputer 8, then the white colors can be displayed on a data coordinate point unit basis.

Figure 18:
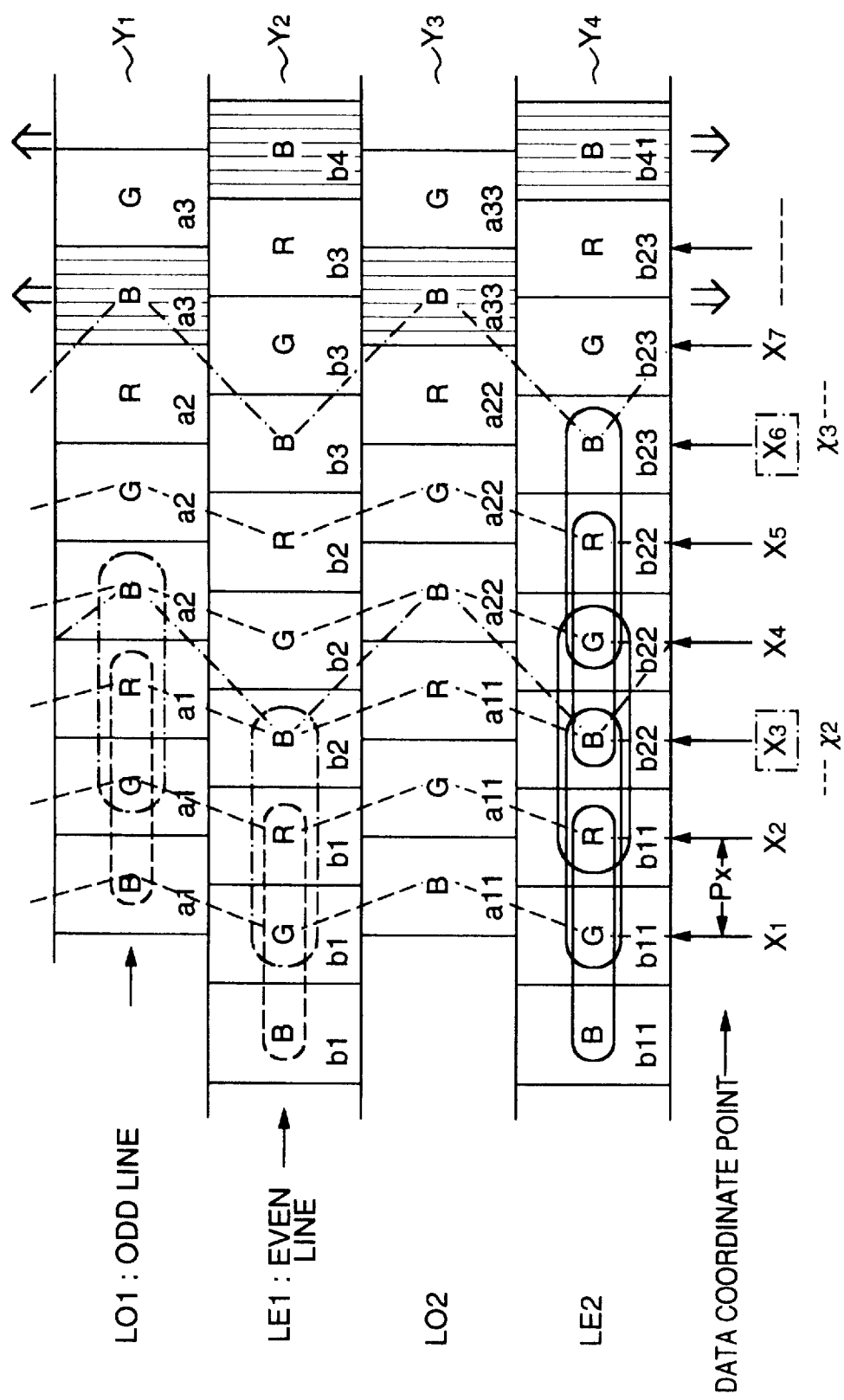
FIG. 18 is an explanatory diagram for schematically indicating an enlarged screen of a color LCD display unit in order to explain the embodiment of the present invention.

That is, for example, as indicated in FIG. 18, the three dots Ba1, Ga1, Ra1 are emitted in one display unit in the odd line LO1, and subsequently, three dots Ga1, Ra1, Ba2 which are partially overlapped with each other are emitted in the next display unit. Similarly, the three dots Bb1, Gb1, Rb1 are emitted in one display unit in the even line LE1, and subsequently, three dots Gb1, Rb1, Bb2 which are partially overlapped (Gb1, Rb1) with each other are emitted in the next display unit. As a result, the coordinate points of the data become pixels X1, X2, X3, - - - , in the respective lines LO1, LE1. A broken line for connecting the respective R, G, B in FIG. 18 indicates a coordinate axis. As described above, in the delta-arranged matrix, there is deviation of 0.5 dot between the adjacent lines along the vertical direction. The coordinate points of the data along the vertical direction are present in Y1, Y2, Y3, - - - , in the respective lines.

Figure 19:
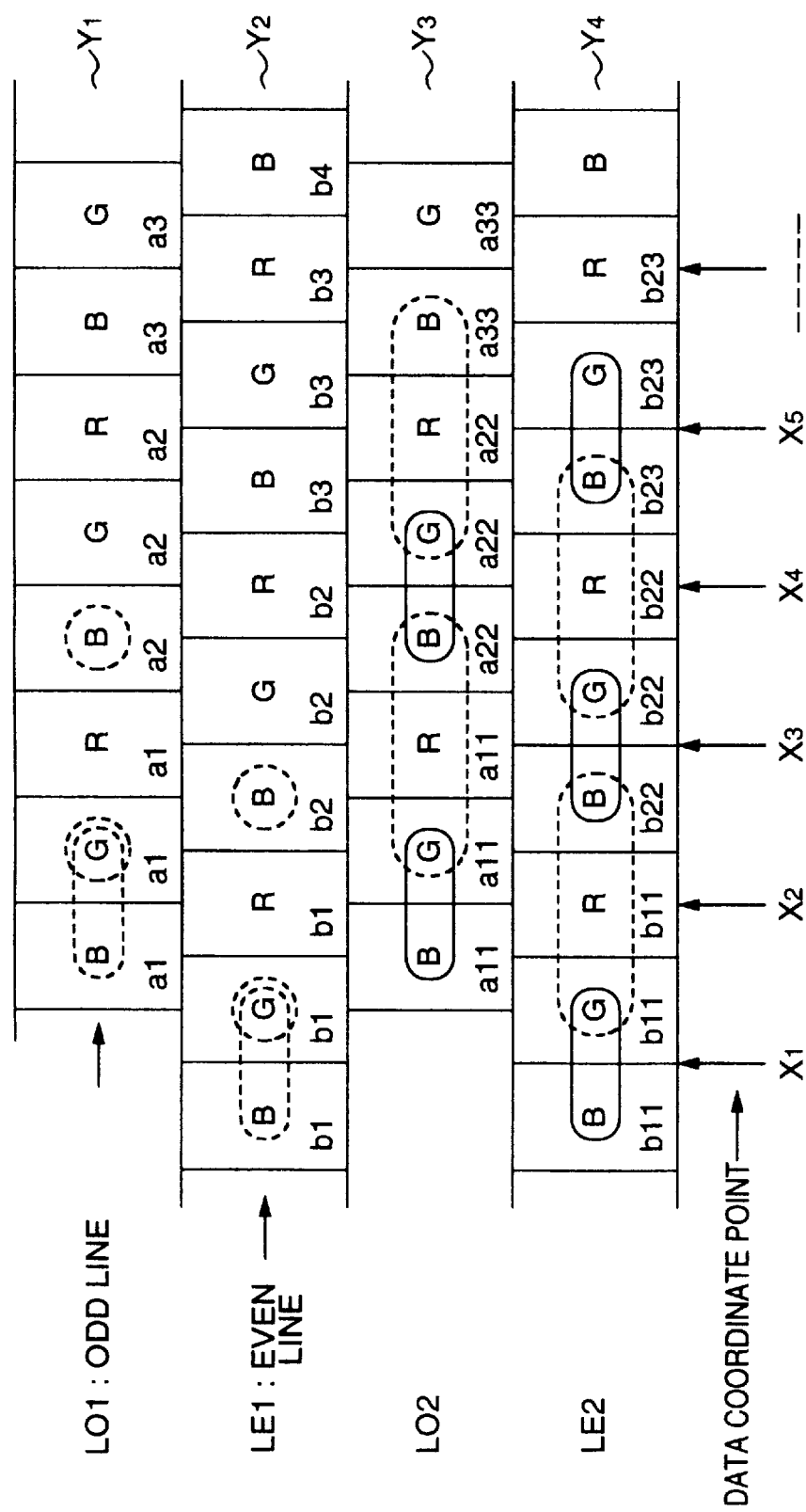
FIG. 19 is an explanatory diagram for schematically indicating an enlarged screen of a color LCD display unit in order to explain the embodiment of the present invention.

As a consequence, in the case of displaying a cyan color by emitting dots B and G, as surrounded by a dotted line of FIG. 19, the two pixels Ba1 and Ga1 are emitted as one display unit in the odd line LO1, and thereafter, the two dots Ga1 and Ba2 which are partially overlapped with each other are emitted as the next display unit. Similarly, the two pixels Bb1 and Gb1 are emitted as one display unit in the even line Lb1, and thereafter, the two dots Gb1 and Bb2 which are partially overlapped with each other are emitted as the next display unit. It should be understood that an embodiment explained after the present embodiment is defined as follows: In using a line memory as the display memory 4, when a cyan color is displayed, the frequency of the read clock signal 21 derived from the clock generating circuit 51 is selected to be, for instance 2 fd/3 by the microcomputer CPU 8 (will be explained later).

As described above, as shown in FIG. 19, when the data coordinate points are set on the same colors in both the odd line and the even line, in such a case that the display data is emitted by way of a pair of the dots B and G, the numbers of these dots B and G, e.g., only n pieces are displayed, as viewed on one line, for example, only the odd line. However, in this embodiment, the pixels are overlapped with the preceding display unit, which is used as the next display unit, in such a manner that the display unit of Ba1 and Ga1 are overlapped with the next display unit of Ga1 and Ba2.

Therefore, this can be emitted. As a result, it is possible to display the data points twice as the pixel numbers of the respective colors at maximum. This may be similarly applied to the dot display along the transverse (horizontal) direction.

In other words, in the case of one primary color representation (one display unit by 1 primary color), when this primary color is displayed by, for instance, the dot B, the display points are so arranged as indicated by a dot and dash line of FIG. 18. In response to this arrangement, the X coordinate system may be determined by x2, x3, - - - , of FIG. 18. The display resolution (displayable color number is 3 colors) is 3×Px (Px: dot pitch along x direction) when three colors are used. In a case of 2-primary color representation (1 display unit by 2 primary colors), when the 2 primary colors are displayed by the dots B and G, as indicated in lines y3 and Y of FIG. 19, the X coordinate system may be arranged by 1.5×Px, namely twice density than that of the 1-primary color representation. Furthermore, since two dots per 1 display point can be used in the display brightness, the brightness of the waveform display can be greatly increased. As indicated in the line Y4 of FIG. 18, in the case of 3-primary color representation (white color representation by simultaneously emitting pixels R, G, B), there primary color dots are combined with each other, and the display coordinate system can be related every 1×Px. At this time, it can achieve the maximum coordinate density. The matrix of the 1-primary color representation is combined with the Y coordinate system, and the dots on the odd line and the even line are separately used (namely, by separate coordinate systems), so that the matrix longitudinal line with the internal of 1.5×Px can be displayed. This is shown in FIG. 18. In this drawing, there is shown such a case that 2 longitudinal lines are displayed by the dots Ba3, Ba33, - - - , and the dots Bb4, Bb41, - - - .

Assuming now that the frequency of the read clock signal produced from the clock generating circuit 51 is selected to be "fd" by way of the CPU 8, as explained above, the pixel (dot) can be emitted/controlled as one display unit.

In this embodiment, the display data are processed at the 3-phase timings as explained before, the number of pixels capable displaying the data is increased and the display resolution can be improved.

Figure 20:
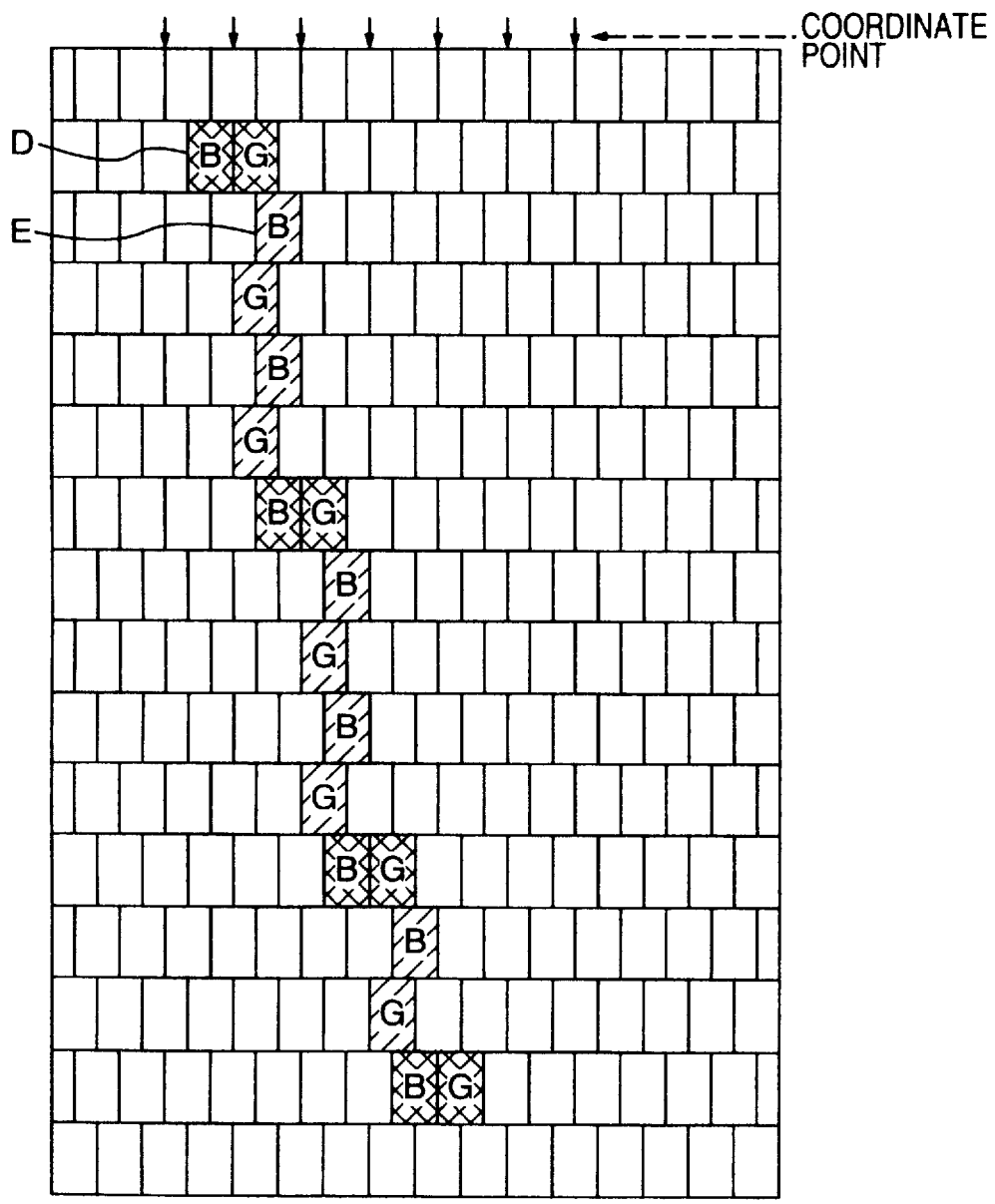
FIG. 20 is an explanatory diagram for displaying interpolation data of the enlarged screen of the color LCD display unit so as to explain the embodiment of the present invention.

Another feature of a further embodiment according to the present invention is an interpolating method. That is to say, in the present invention, as illustrated in FIG. 20, when data of 1 channel is displayed, a data interpolation of this display data along the longitudinal direction (vertical scanning direction) is carried out as follows:

In the case that at least one pixel is present along the horizontal direction between two sets of adjoining coordinate points in the vertical direction among the continuous coordinate points on which the waveform data are displayed, in at least one pixel along the horizontal direction, one (only one) display unit containing one dot located at the same position along the horizontal direction as one of these two adjoining coordinate points is displayed as the display unit for constituting the waveform.

In other words, the number of dot to be interpolated is equal to the number of such a line for connecting the line with the display data, which intersects in the respective lines where the data should be interpolated. As a consequence, the interpolation of the display pixel of the waveform display is realized by a sharp narrow line. A display example where the display data are interpolated in this manner is shown in FIG. 20.

Figure 21:
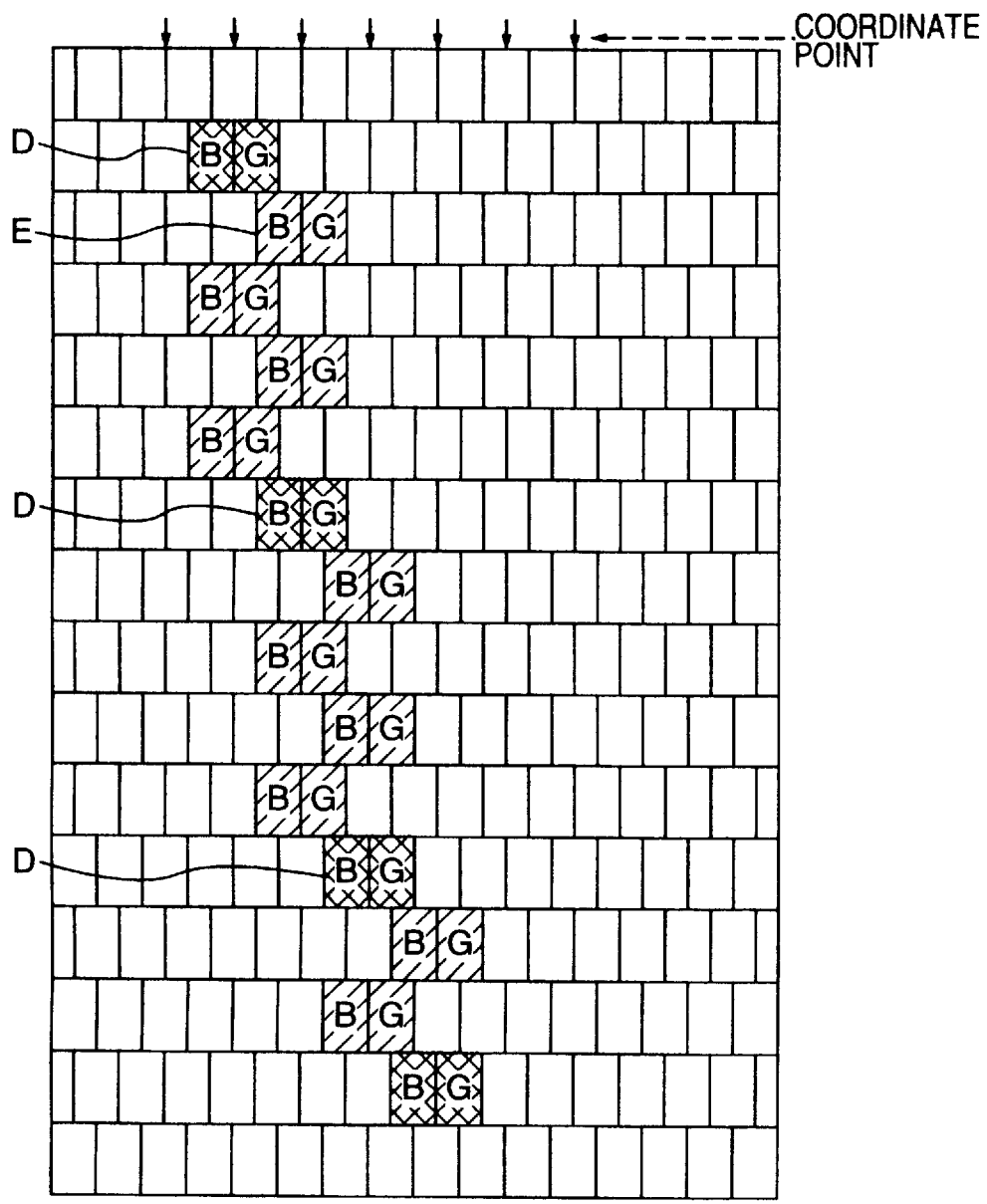
FIG. 21 is an explanatory diagram for displaying interpolation data of the enlarged screen of the conventional color LCD display unit.

In the case that the display waveform is interpolated by the conventional method, when a cyan color point is emitted by one pair of dots B and G, for instance, as shown in FIG. 21, the interpolated data would become one pair of dots B and G, namely a wide line. Here, in FIG. 20 and FIG. 21, symbol "D" indicates actual waveform data (namely, actually sampled waveform data), and symbol "E" represents interpolated data. As apparent from FIG. 20, in this embodiment, the dots B and G constitute one pair to be used as one interpolated data along the longitudinal direction, so that the waveform data can be displayed as a sharp and narrow line.

As previously described with using FIG. 9, FIG. 10, and FIG. 11, even when such a color LCD in which the pixels are arranged in the delta form is employed, the data interpolation can be performed with the sharp line by utilizing the dot unit control by the 3-phase timing.

A description will now be made of an oscilloscope according to the fourth embodiment, using a VRAM (video random access memory) as a display memory, while employing a method for driving a flat dot matrix color display device suitable to both the picture monitor function and the oscilloscope representation.

Figure 22:
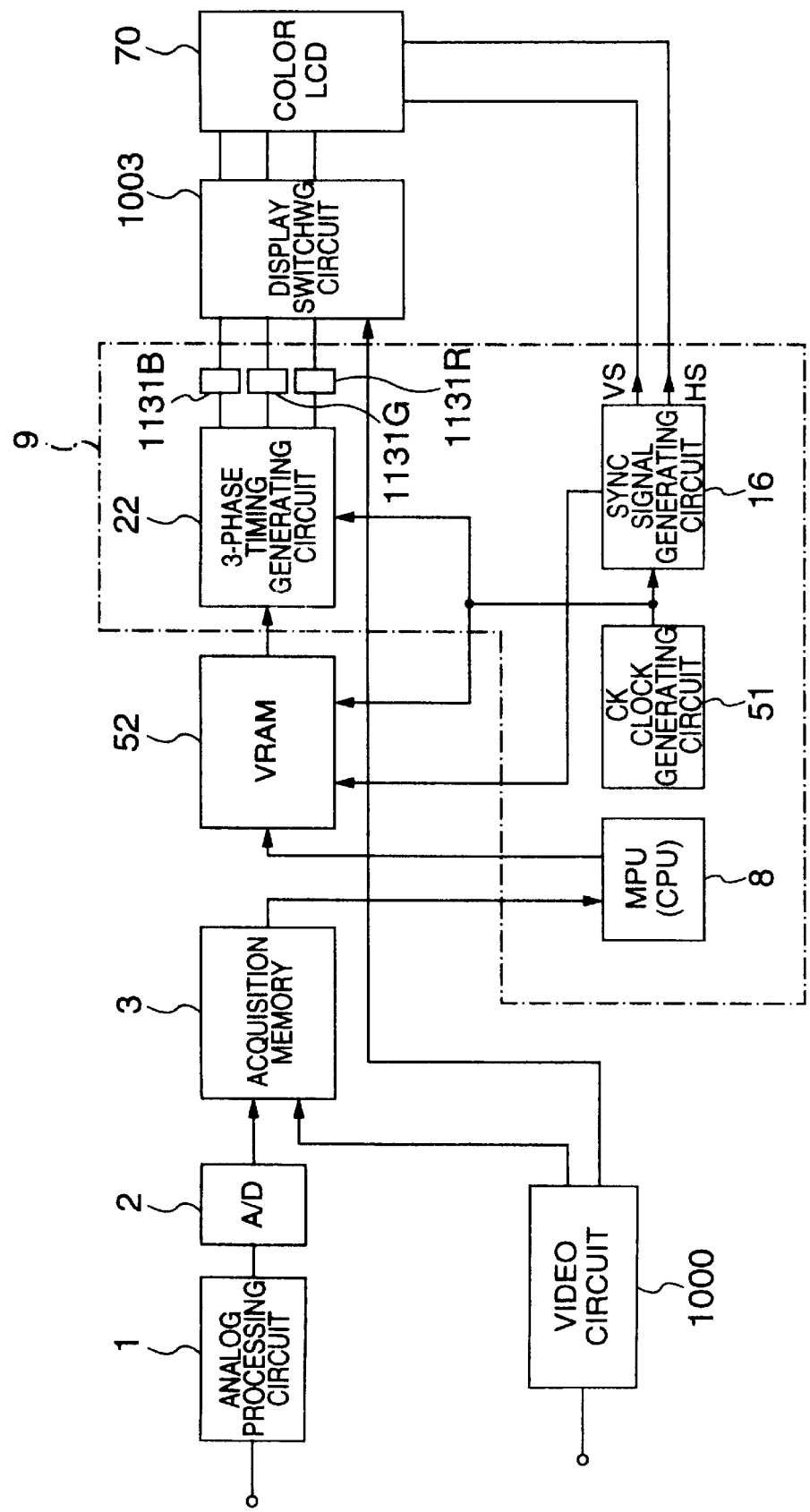
FIG. 22 is a schematic block diagram for indicating an overall arrangement of an oscilloscope having a video signal input, according to an embodiment of the present invention.

That is, a digital oscilloscope display method and a digital oscilloscope display apparatus, according to the fourth embodiment of the present invention, when a VRAM is employed as a display memory, will now be explained. As one embodiment capable of realizing the previously explained method, such an example that a VRAM is used as a display memory will now be described. An arrangement of such an embodiment is indicated in FIG. 22.

If the VRAM is employed as the display memory, then the above-described interpolation operation can be performed by way of a software process operation by a microcomputer.

Figure 23:
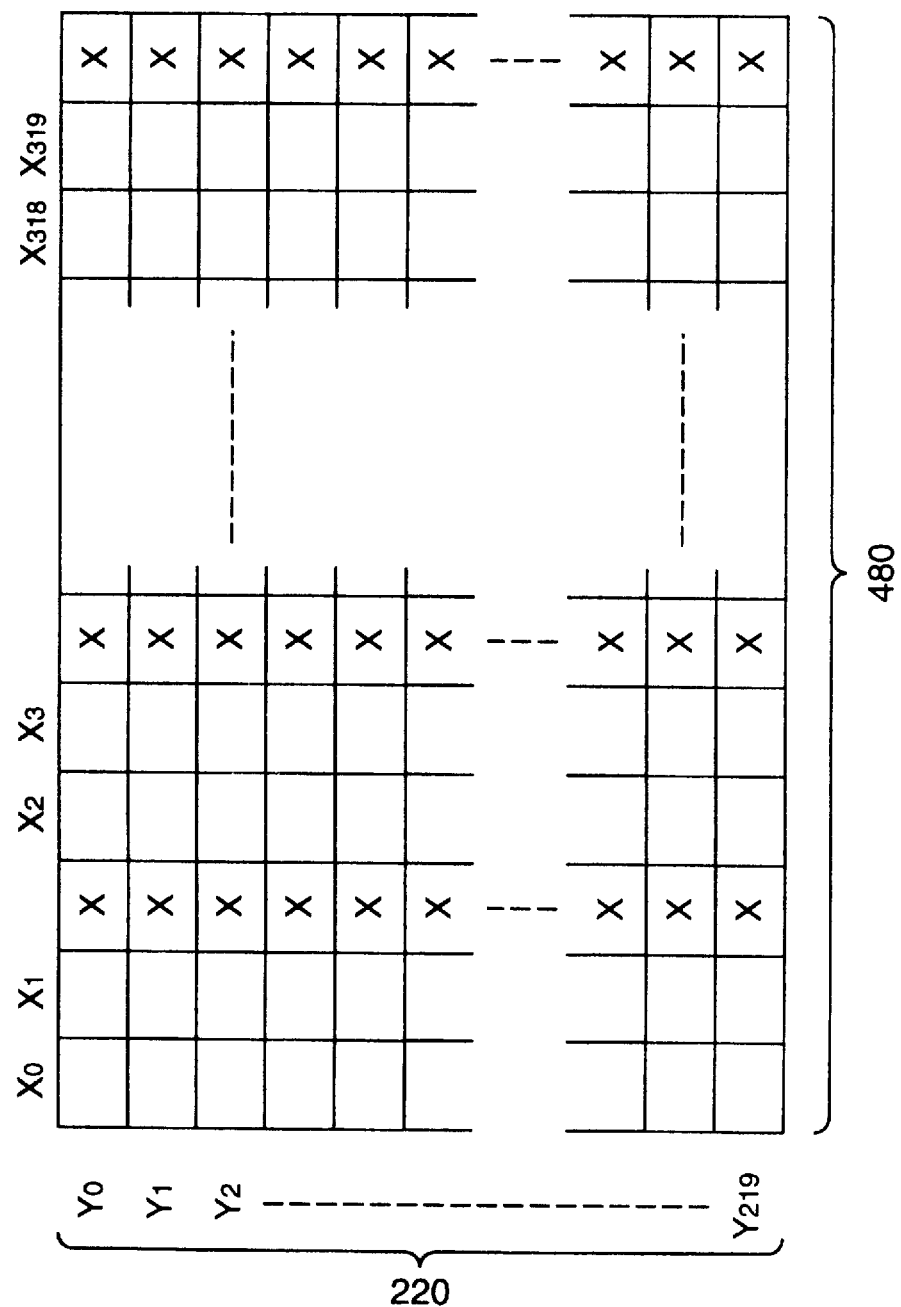
FIG. 23 is an explanatory diagram for showing an enlarged screen of a color LCD unit in order to explain the embodiment of the present invention.

With reference to FIG. 23, FIG. 24 and FIG. 25, the digital oscilloscope display apparatus/method with using the VRAM will now be explained in detail.

FIG. 24 is a schematic block diagram for representing such an example in which a display pattern is formed by way of a microcomputer process, and a color processing circuit is provided with a 3-phase timing circuit. It should be noted that an LCD display device is omitted from this drawing. A microcomputer CPU 8 reads such data as a vector and a waveform from an acquisition memory 3 via a bus line, executes such a process operation of the previously explained interpolation to the read data, and then converts the interpolated data into bit map data which will then be written into a VRAM 52. In this case, a memory capacity of the VRAM 52 may be defined by addresses more than, or equal to 220×480 when the number of emission dots of the LCD display device (not shown) is 220 dots (vertical direction)×480 dots (horizontal direction) (when one set of 3 dots R, G, B is used as 1 pixel, H=160 pixels). In the case of 2-dot representation (1 data is emitted by two dots B and G), for example, the bit map data are written at 2 addresses among 3 addresses along the lateral direction, as indicated in FIG. 23, in the VRAM 52. This implies that when the waveform display RAM and the character display RAM are commonly used, namely when both the character information and the waveform information are written into the VRAM 52 and are used, since the transverse direction of the LCD is constructed of 480 dots, 480 dots (horizontal direction) are used for the characters (the maximum dots are used in order that even small characters can be displayed). Since as to the waveforms data, one pixel is displayed by 2 dots, the waveform is displayed by 320 dots (coordinate)

along the transverse (horizontal) direction. As a consequence, the data are written at two addresses with respect to three addresses (as a consequence, no 1 dot is written). Namely, symbol "X" denotes an address at which no data is written.

Figure 47:
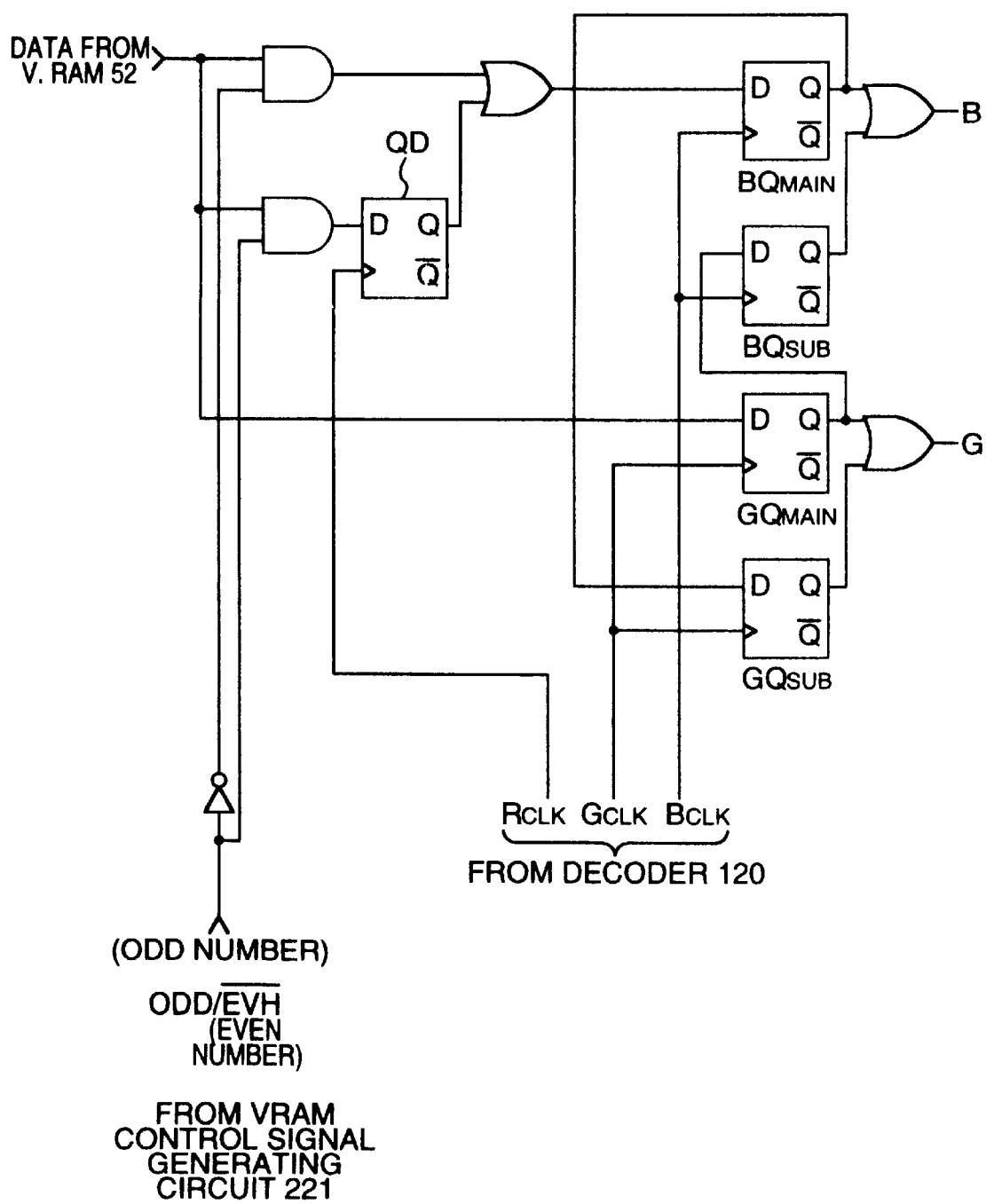
FIG. 47 is a circuit diagram for showing another example of a 3-phase timing circuit employed in an embodiment of the present invention.

Next, the data reading from this VRAM 25 will now be mentioned. The frequency of the read clock is "fD", (e.g., 10 MHz). Apart from the character display RAM, 320 addresses are sufficient along the horizontal direction (namely, it only the waveform is displayed). The read data is entered into a color process 3-phase timing circuit 22' at the frequency of fD. One example of B, G lightening circuits of this color process 3-phase timing circuit is shown in FIG. 47. A timing chart of the B, G lightening circuits is illustrated in FIG. 25. Signals ODD/EVH of FIG. 24 and FIG. 47 correspond to LSB (least significant bit) of a line address designating signal, from a VRAM control signal generating circuit 221 to a VRAM 52, and indicate whether or not the line address corresponds to the odd number or the even number.

Considering now such the VRAM 52 are produced as x0, x1, X, x2, x3, X, x4, - - - , and there are data (data to be lightened) in x0 and x3, for the even line, the data x0 is latched by a flip-flop BQ main in response to the clock $B_{clk}$ (see (b) of FIG. 25) derived from the decoder 120, so that the dot B1 is turned ON ((f) of FIG. 25). When the dot B1 is turned ON, since the output from the flip-flop BQ main is entered into the D-input of the flip-flop GQsub, the output signal from the flip-flop BQ main is latched at the flip-flop BQsub in response to the clock Gcl ((d) of FIG. 25) from the decoder 120, so that the dot G1 is turned ON (see (f) of FIG. 25). Next, when the data is present at x3, the data x3 is latched by the flip-flop GQ main in response to the clock $G_{clk}$, so that the dot G2 is turned ON. Since the output of the flip-flop GQ main is entered into the D-input of the flip-flop BQsub, the output signal of the flip-flop GQmain is latched in response to the clock $B_{clk}$ so that the dot B3 is turned ON.

In the case of the odd line, the data x0 is latched by a flip-flop GQmain in response to the clock $G_{clk}$ (see (g) of FIG. 25) derived from the decoder 120, so that the dot G1 is turned ON ((m) of FIG. 25). When the dot G1 is turned ON, since the output from the flip-flop GQmain is entered into the D-input of the flip-flop BQsub, the output signal from the flip-flop GQmain is latched in response to the clock Bcl ((k) of FIG. 25) from the decoder 120, so that the dot B1 is turned ON. Next, when the data is present at x3, the data x3 is once latched by the flip-flop QD in response to the clock $R_{clk}$ ((i) of FIG. 25). Subsequently, the output of the flip-flop QD is entered into the D-input of the flip-flop BQmain, the output signal of the flip-flop BQmain is latched in response to the clock $B_{clk}$, so that the dot B2 is turned ON. When the dot B2 is turned ON, since the output from the flip-flop BQmain is entered into the D-input of the flip-flop GQsub, the output from the flip-flop BQmain is latched by the flip-flop BQsub in response to the clock $G_{clk}$, so that the dot G3 is turned ON.

The above-described operations are described in the case that the VRAM is employed as the display memory.

A description will now be made of an oscilloscope equipped with a video monitor terminal, according to the fifth embodiment of the present invention, and having a picture monitor function, a vector scope function, and a waveform monitor function, in which an LCD display device is employed which is driven by a display method suitable to the picture monitor function and the oscilloscope display, and a VRAM is employed as a display memory.

That is, as previously explained in the second embodiment, in such a digital oscilloscope equipped with a video monitor terminal and having the picture monitor function, the waveform monitor function, and the vector scope function, the LCD driven by the specific display method (previously explained) is utilized and furthermore another example with employment of the VRAM as the display memory will be described more in detail. This embodiment will now be explained with reference to FIG. 2, FIG. 22, FIG. 27, FIG. 28, FIG. 29, FIG. 30, FIG. 31 and FIG. 32.

It should be understood that since an overall operation of this embodiment is the same as the second embodiment, no further explanation is made in the following description.

In this embodiment, a bit map data converting process operation and a gradation data process operation while employing a VRAM 52 (see FIG. 22) as the display memory of FIG. 2 will now be explained more in detail.

The bit map data process operation and the gradation data process operation may also be utilized in the previously described waveform monitor function, vector scope display, and further the oscilloscope display.

The below-mentioned vector scope display will now be explained as one of explanations.

Figure 26:
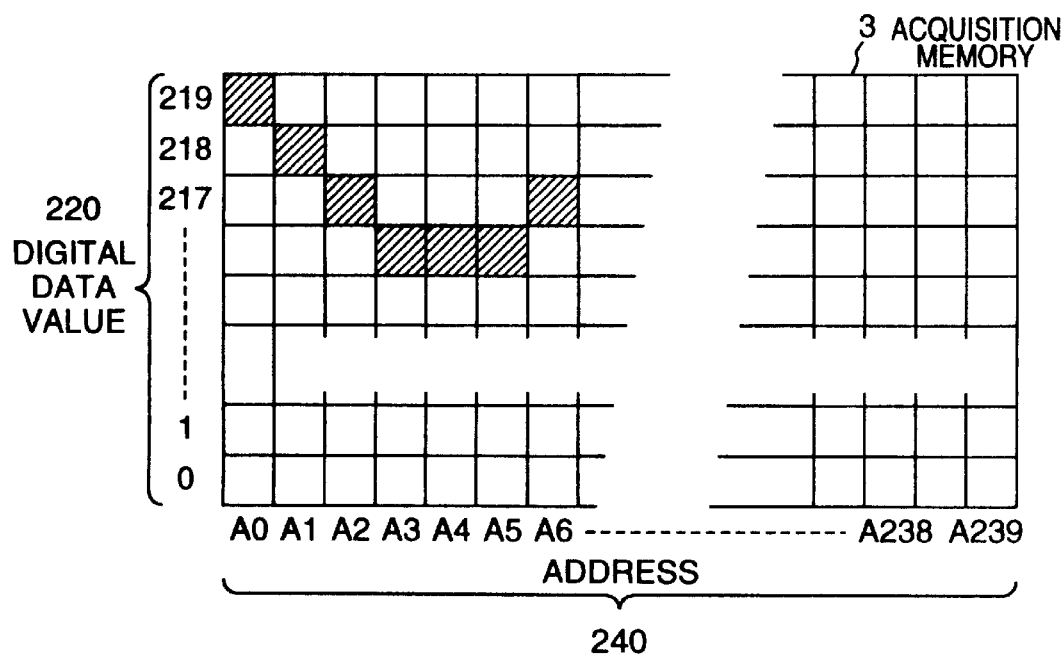
FIG. 26 is an explanatory diagram for indicating an acquisition memory according to the embodiment of the present invention.

As illustrated in FIG. 26 (in this drawing, only one of acquisition memories 3a and 3b is illustrated), the data which has been sampled and A/D-converted is stored in the acquisition memories 3a and 3b. In this drawing, for instance, the A/D-converted value of the digital data value 219 is stored at an address A0, and a digital data value 218 is stored at an address A1. The microcomputer CPU8 reads the digital data stored in the acquisition memories 3a, or 3b from the address A0 to the address 239.

Figure 27:
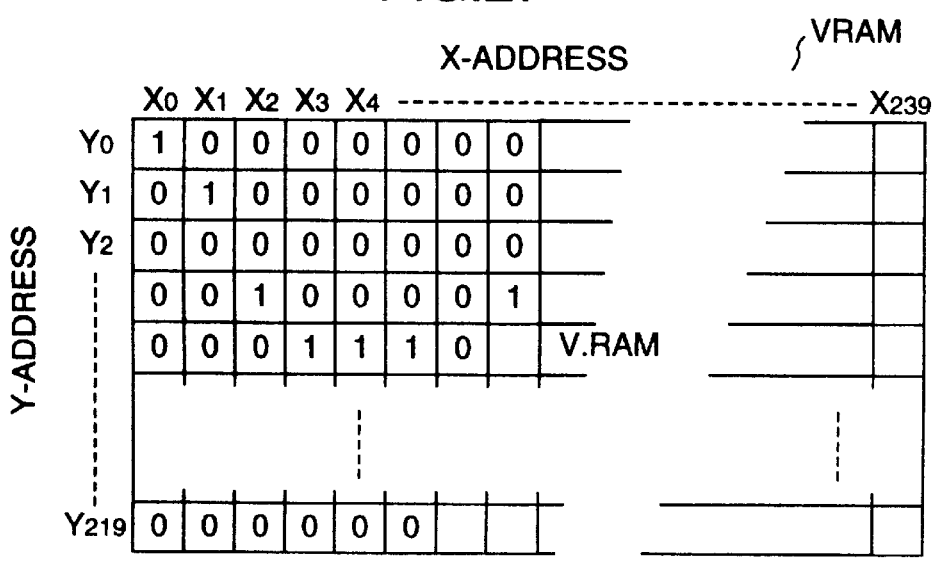
FIG. 27 is an explanatory diagram for explaining a VRAM according to the embodiment of the present invention.

Thereafter, this data is converted into bit map data which will then be written into the VRAM 52, as shown in FIG. 27. This process operation can be realized by performing such a process operation that the address values A0 to A239 of the acquisition memory 3a, 3b are replaced by the X address values of the VRAM corresponding to the display memory, the data values are replaced by the Y address values of the VRAM, and the data ("1") is written at the relevant address (x, y).

At this time, the data are overwritten so as to perform the above-described gradation display in such a manner that the video waveform and the display data such as the vector data can be observed as more natural waveforms.

That is to say, when the waveform data read from the acquisition memories 3a, 3b is converted in the bit map data by the software process, the CPU 8 adds the data to each other with respect to the respective positions corresponding to the address (x, y) in relation to the display screen in the internal memory. In other words, such a position of the LCD 7 is represented in bright, which corresponds to the address where the adding result becomes a large value, whereas such a position of the LCD 7 is displayed in dark, which corresponds to the address where the adding result becomes a small value.

Figures 28, 29:
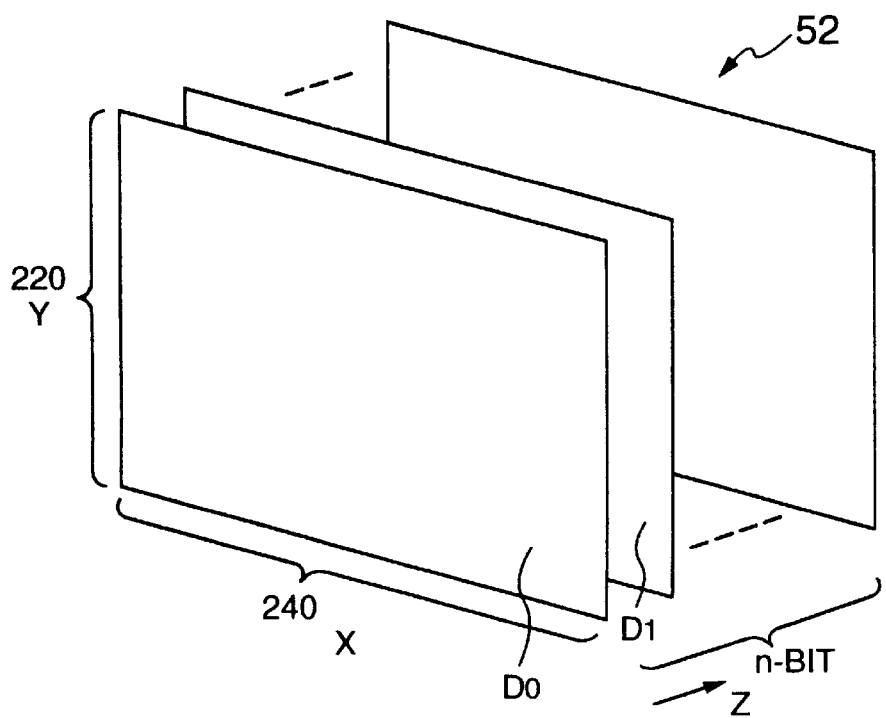
FIG. 28 is an explanatory diagram for describing a gradation processing operation of the embodiment of the present invention.
FIG. 29 is a diagram for representing an arrangement of the VRAM according to the embodiment of the present invention.

For an easy understanding of the embodiment, the acquisition memories 3a and 3b have been employed with such specifications that the digital data value is 220 levels and the address (memory capacity) are 240. In a practical case, for instance, the digital data value is 8 bits (256 levels), and the memory capacity is 2,000. The structure of this VRAM 52 is shown in FIG. 29. In other words, this VRAM 52 is arranged by the X-axis addresses of 240, the Y-axis addresses of 220, and n bits in the Z-axis direction. It should be noted that for the sake of easy explanations, "n" pieces of VRAMs in total are used every 1 bit along the Z-axis direction, and D0 bit and D1 bit are employed among the n bits. The VRAM for the D0 bit will be called as a first VRAM, and the VRAM for the D1 bit will be called as a second VRAM.

To execute the gradation display, for instance, "m" gradation displays, as shown in FIG. 29, the VRAM 52 of the display memory must be used as such a memory structure that log 2 m (1 bit/sheet) sheets of VRAMs are present.

In the below-mentioned description, two sheets of VRAMs are used in four gradation displays.

When the adding result processed inside the CPU 8 becomes 0, "1" is not written into both the VRAM for the D0 bit and the VRAM for the D1 bit. In other words, when the adding result becomes 0, namely the maximum value, "1" is written into both the VRAM for the D0 bit and the VRAM for the D1 bit. That is to say, assuming now that the maximum occurrence frequency is equal to "J", when the occurrence frequency is 0, D0:0 and D1=0. When the occurrence frequency is 1 to ⅓, D0=1 and D1=0. When the occurrence frequency is J/3+1 to J⅔, D0:0 and D1:1. When the occurrence frequency is larger than, or equal to J⅔+1, D0:1 and D1:1. FIG. 28 represents this condition. Namely, with such a process operation, four sorts of gradation from 1 to 4 are represented in the VRAM. It should be noted that the maximum occurrence frequency implies such a maximum value of occurrence numbers (number of VRAMs) about the same data per all data acquired during a single sampling operation.

FIG. 30 and FIG. 31 indicate the data written into two sheets of VRAMs. Based upon the data stored in two sheets of VRAMs 52 for the D1 bit and the D0 bit, such a position defined by an address X0 and Y0 is the gradation 4 and is displayed in the highest bright; another position defined by an address X1 and Y1 is the gradation 3 and is displayed in the second highest bright; and another position defined by an address X2 and Y2 is the gradation 2 and is displayed in the darkmost level. Other positions become the gradation 1, and are not completely displayed.

Figure 32:
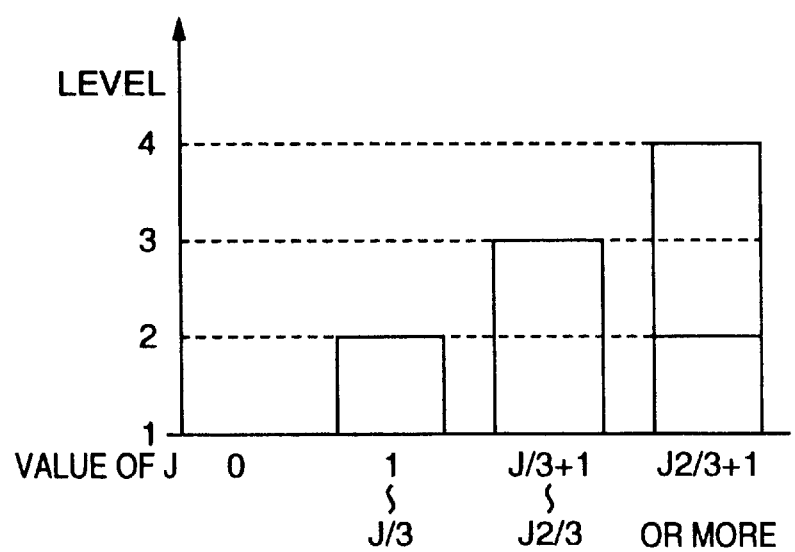
FIG. 32 is an explanatory diagram for describing a gradation processing operation according to the embodiment of the present invention.

The gradation display digital data stored in the VRAM 25 in this manner are sequentially read at the previously explained timings, and then are supplied via a gradation processing circuit 1131 (see FIG. 2) to the LCD. FIG. 8 indicates a circuit arrangement of this gradation processing circuit 1131. A gradation processing circuit is essentially equal to a D/A converting circuit. FIG. 32 represents a relationship between the above-described input value (maximum value J) and output level, namely the gradation.

Next, this operation will now be explained more in detail.

Figure 50:
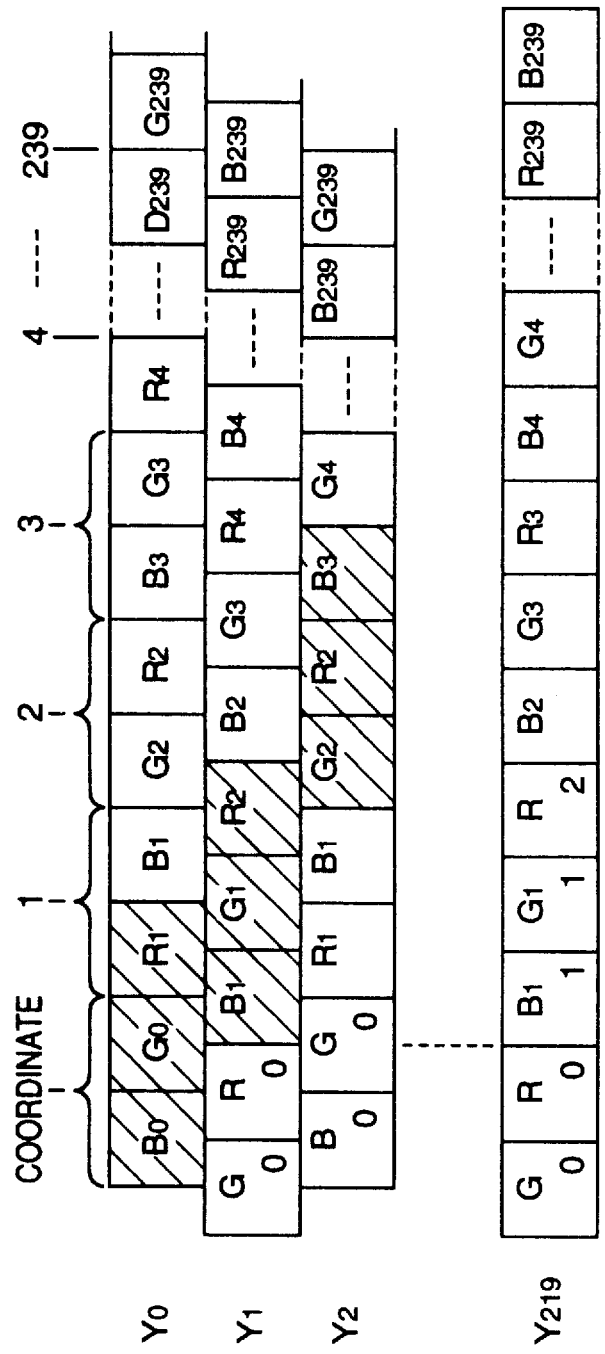
FIG. 50 is an explanatory diagram for explaining an enlarged screen of a color LCD display unit employed in the embodiment of the present invention.

It is assumed that the outputs from the VRAM on the D1 bit side are Bh, Gh, Rh, and the outputs from the VRAm on the D0 bit side are B1, G1, R1, respectively, among the signals read out from the VRAM. Next, such an example will be explained as to the display on the LCD 70, a white color is displayed by turning ON the transverse 3 dots (B, G, R, or G, R, B, or R, G, B), and 246 data are displayed along the horizontal direction. In FIG. 30 and FIG. 31, the descriptions are made of two cases such that there are data written at the addresses (X0, Y0) and (X1, Y1) of the VRAm on the D1 bit side, and data written at the addresses (X0, Y0) and (X2, Y2) of the VRAM on the D0 bit side. Here, the Y address of the VRAM corresponds to the line address of the LCD 70 along the Y direction, whereas the X address of the VRAM corresponds to the X-axis coordinates "0" to "239" of the LCD. This is shown in FIG. 50.

Since there are data in the VRAMs on the D1 bit side and the D0 bit side at the address (X0, Y0) of the VRAM, the values of gradation 4 are allocated to the dots B0, G0, R1 of the LCD 70. As a result, the dots B0, G0, R1 pass through the previously explained gamma correction circuit 1132 and are lightened in the brightness corresponding to the gradation 4. Similarly, since there are data in only the VRAm on the D1 bit side at the address (X1, Y1) of the VRAM, the values of gradation 3 are allocated to the dots B1, G1, R2 of the LCD 70. As a result, the dots B1, G1, R2 are lightened in the brightness corresponding to the gradation 3. Similarly, since there are data in only the VRAM on the D0 bit side at the address (X2, Y2) of the VRAM, the values of gradation 2 are allocated to the dots G2, R2, B3 of the LCD 70. As a result, the dots G2, R2, B3 are lightened in the brightness corresponding to the gradation 2.

It should be noted that since the bits are merely added to each other in the VRAM so that all of these bits become maximum values in a certain time, the overwriting display is carried out in a finite time in combination therewith, as previously explained.

A description will now be made of an oscilloscope equipped with a video monitor terminal, according to the sixth embodiment of the present invention, and having a picture monitor function, in which an LCD display device is employed which is driven by a display method suitable to the picture monitor function and the oscilloscope display, and a line memory is employed as a display memory.

That is, in such a digital oscilloscope equipped with a video monitor terminal and having the picture monitor function, the waveform monitor function, and the vector scope function, a line memory is employed as the display memory will be described more in detail.

Figure 33:
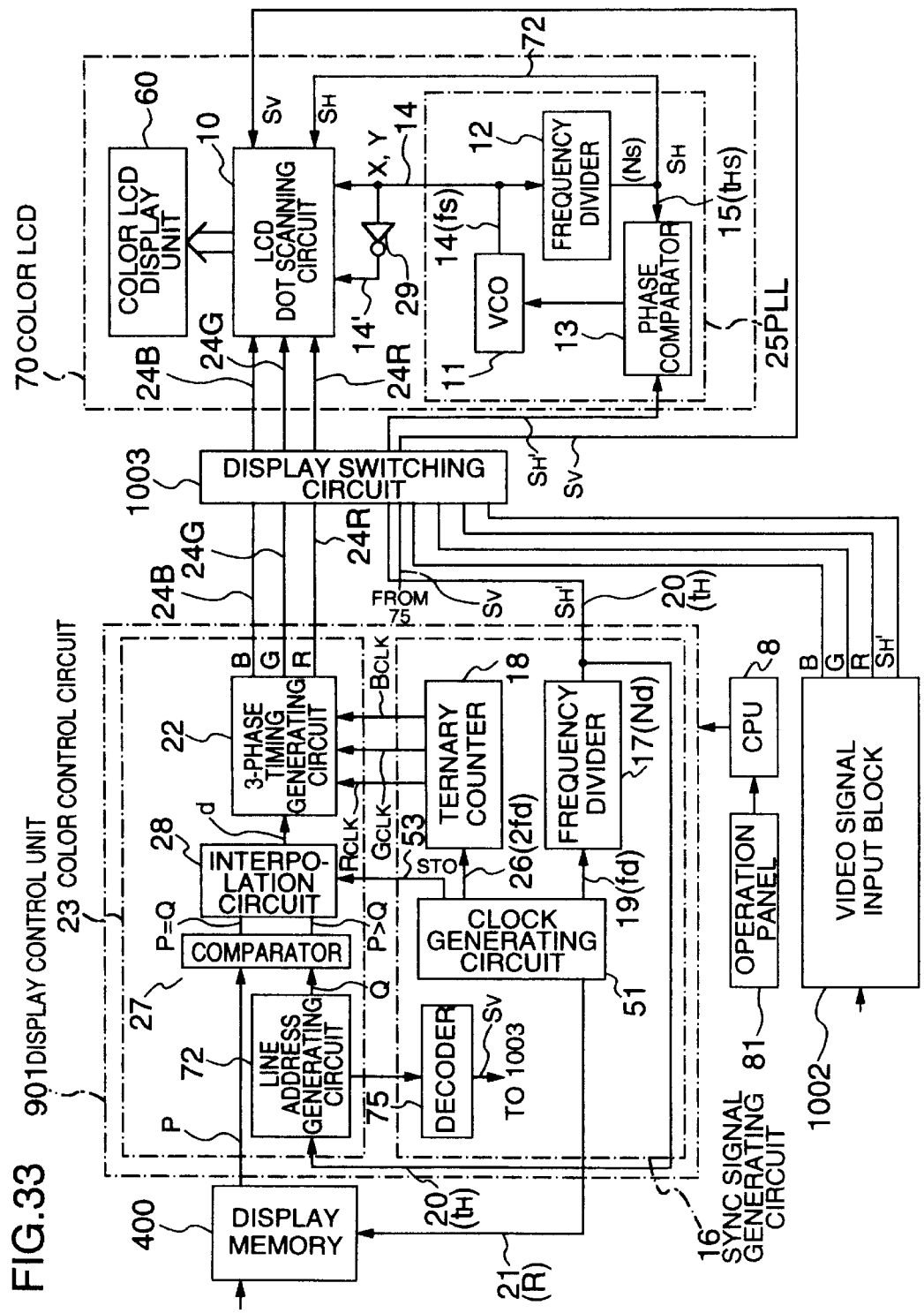
FIG. 33 is a schematic block diagram for representing a partial arrangement of an oscilloscope having a video signal input according to an embodiment of the present invention.

In FIG. 33, there is a block diagram for showing a circuit arrangement of a major portion of the digital oscilloscope equipped with the video input, according to the sixth embodiment. In this embodiment, three colors of red (R), green (G), and blue (B) are employed to display a color picture in the oscilloscope having the video input. That is, in the digital oscilloscopes of FIG. 1 and FIG. 2, a line memory is used as the display memory. In particular, FIG. 33 represents an arrangement of the display control unit 901 in detail.

In this drawing, since the color LCD 70 is basically identical to one as previously explained in FIG. 9, a further explanation thereof is omitted.

The display control unit 901 includes a sync signal generating circuit 16 and a color control circuit 23. The sync signal generating circuit 16 contains a clock generating circuit 51 for generating a clock signal having a frequency of 2fd (for example, 20 MHz) and another clock signal 19 having a frequency fd; a frequency divider 17 for frequency-dividing the clock signal 19 by a frequency dividing ratio of Nd (e.g., 645) to output a clock signal (horizontal sync signal SH') 20; a ternary counter 18 for generating 3-phase clock signals $B_{CLK}$, $G_{CLK}$, $R_{CLK}$ based on the clock signal 26. The clock signal SH' 20 is supplied via the display switching circuit 1003 to the color LCD 70. The clock generating circuit 51 further generates a read clock signal 21(R) for the waveform display memory 400 having a frequency of fd or fd/3, and also furnishes another clock signal 53 (STO) having a frequency of fd or fd/3 to an interpolation circuit 28 of a color control circuit 23. The color control circuit 23 includes a 3-phase timing generating circuit 22 for sequentially outputting read, green, blue display data 24R, 24G, 24B in response to the 3-phase clock signal; a line address generating circuit 72; a comparator 27, and the interpolation circuit 28. The line address generating circuit 72 generates a line address Q in response to the clock signal (horizontal sync signal) 20 from the frequency divider 17. The display memory 400 is, for instance, an 8-bit line memory having 2 k words from which the data at all of the horizontal addresses are read every time the color LCD 70 performs one horizontal scanning operation. A line address generating circuit 72 sequentially updates the address Q (corresponding to scanning address of LCD display unit 60, namely line No along vertical direction) in response to the reading operation of the waveform data during 1 horizontal scanning time, and then sequentially outputs the updated addresses Q. This line address generating circuit 72 supplies the address Q to the decoder 75 so as to produce the vertical sync signal SV in synchronism with this address Q, and supplies the vertical sync signal SV via the display switching circuit 1003 to the dot scanning circuit 10 of the color LCD 70. In response to this vertical sync signal SV and the above-described horizontal sync signal SH, which are supplied from the display control circuit 901 to the color LCD 70, the output timing of the display data in the display control unit 901 may be synchronized with the display timing of the waveform data in the color LCD 70. The comparator 27 compares the waveform data "p" derived from the waveform display memory 4 with the address Q generated from the line address generating circuit 72 every data (256 bits data) along the respective horizontal directions. When the waveform data "p" is coincident with the address Q (namely, indicating that there is data p to be displayed at address Q generated at line address), a signal is outputted from the P=Q terminal of this comparator. When the address of the data P is larger than the address Q, a signal is outputted from the P>Q terminal of the comparator. These signals are given to the interpolation circuit 28.

In this manner, the waveform data read from the waveform display line memory 400 is converted into the raster scanning format. As a result, the output from the interpolation circuit 28 becomes the interpolated waveform data (display data) "d". The detailed operations of the comparator 27 and the interpolation circuit 28 will be explained later. The detailed operation of the 3-phase timing generating circuit 22 has been previously explained with reference to the fifth embodiment. It should be noted that the operation of the color control circuit 23 may be replaced by the software process executed by the microcomputer CPU 8.

Since the data supplied to the display line memory 400 are identical to the display data used in the conventional oscilloscope, detailed explanations thereof are omitted.

Next, the color LCD 70 and the display control unit 901 will now be described. Although this operation is similar to those described in the third embodiment, and therefore a partially overlapped description will be made, a simple explanation will be again made.

In accordance with this embodiment, the horizontal sync signal SH' 20 which is generated from the display control unit 901 and determines (synchronized) the output timings of the display data 24B, 24G, 24R, is supplied to the color LCD 70. In the PLL circuit 25 of the color LCD 70, scanning clock signals 14 and 14' for the display data 24B, 24G, 24R synchronized with this horizontal sync signal SH' 20 are produced.

Furthermore, in accordance with this embodiment, the time period tH of the horizontal sync signal SH' 20 derived from the display control unit 901 is equal to a time period (tHs) of an output signal 15 (horizontal sync signal SH) of the frequency divider 12 employed in the PLL circuit of the color LCD 70. In other words, while giving an attention to a relationship among the frequency $f_s$ of the color LCD dot scanning clocks 14, 14' of the PLL circuit 25 of the color LCD 70 shown in FIG. 33, the time period tHS of the signal (horizontal sync signal) within the color LCD, and the frequency dividing ratio Ns of the frequency divider 12 for producing this signal being equal to $tHS=1/f_s \times Ns$, a relationship among the time period tH of the horizontal sync signal SH' produced from the sync signal generating circuit 16 of the display control unit 901 for the oscilloscope having the video input, the frequency dividing ratio Nd of the frequency dividing device 17 for producing this signal, and the frequency fd of the clock signal 19 is set to $1/fd \times Nd = tH=tHS$.

In other words, the clock frequency of the display data 24G, 24B, 24R supplied to the waveform displaying color LCD 70 is higher than the frequency of the scanning clocks 14, 14' of the waveform displaying color LCD 70 by an integer. That is, a ratio of the frequency dividing ratio "Nd" to the frequency dividing ratio "Ns" is equal to a multiplication by an integer. The frequency dividing ratio Nd is of the frequency divider 17 for producing the horizontal sync signal SH' supplied to the waveform displaying color LCD 70. The frequency dividing ratio Ns is of the frequency dividing device 12 for producing the internal horizontal sync signal SH of this color LCD.

Next, an explanation will now be made of an interpolation display when the line memory is employed as the display memory.

As previously described, in accordance with the present invention, the dots B and G are employed so as to constitute one pair along the longitudinal direction, which may constitute one piece of interpolated data, so that the waveform data may be expressed by a sharp narrow line, as shown in FIG. 20.

Then, another description will now be made of such a case that a color LCD with delta-arranged pixels (see FIG. 49) is employed, the above-described data interpolation is carried out, and the line memory is used.

Figure 34:
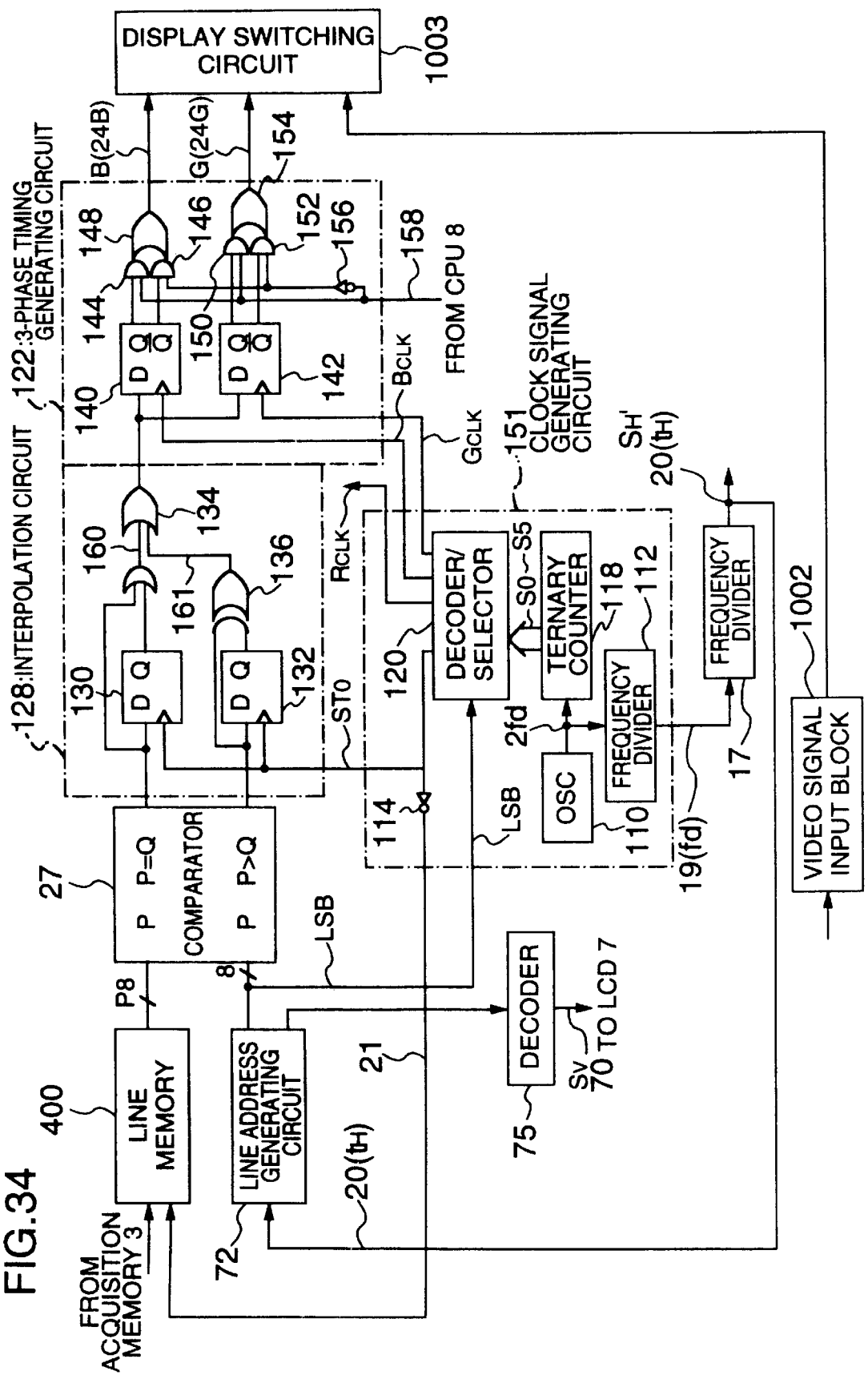
FIG. 34 is a schematic block diagram for representing a partial arrangement of an oscilloscope having a video signal input according to an embodiment of the present invention.

FIG. 34 is a schematic block diagram for showing an arrangement of a display control unit according to another embodiment. It should be noted that the same reference numerals shown in FIG. 29 are employed as those for denoting the same or similar constructive elements indicated in FIG. 34, and therefore the descriptions thereof are omitted. Since the structure of the color LCD 70 and other circuit arrangements are similar to those of the previously explained embodiment, explanations thereof are omitted.

Furthermore, although the circuit blocks related to the video waveform monitor and the picture monitor are similar to those of FIG. 1, FIG. 2, or FIG. 9, such a circuit block having the picture monitor function is represented in this embodiment.

In this embodiment, as one example, a green dot (G) and a blue dot (B) are emitted as one display unit (display data point, or display coordinate point), so that waveform data is displayed in a cyan color.

In FIG. 34, a clock signal generating circuit 151 owns the both functions of the clock generating circuit 51 and the ternary counter 18. Reference numeral 128 indicates an interpolation circuit, and reference numeral 122 shows a 3-phase timing generating circuit, which own similar functions to the interpolation circuit 28 and the 3-phase timing generating circuit 22 of FIG. 33.

First, the arrangement and operation of the clock signal generating circuit 151 are explained. The clock signal generating circuit 151 is arranged by an oscillator (OSC) 110 for oscillating a clock signal having a frequency of, e.g., 20 MHz (2fd); a frequency divider 112 for frequency-dividing this clock signal by the ratio of 1/2 to output another clock signal having a frequency of 10 MHz (fd); a ternary counter 118 for entering therein the clock signal from the oscillator 110 to thereby output 6-phase clock signals S0 to S5 shown in FIG. 35(b); and a decoder/selector 120. The clock signals S0 to S5 correspond to dots in an odd dot line (LO) and dots in an even dot line (LE) related to the delta-arranged dots of the color LCD display unit 60, respectively. The clock signals S0 to S5 are supplied to the decoder/selector 120.

Into the decoder/selector 120, the least significant bit (LSB) in the 8-bit address outputted from the line address generating circuit 72. This LSB indicates the odd line and the even line of the delta-arranged dots of the color LCD display unit 60 along the horizontal scanning direction, and this LSB becomes a high level (H) in the case of the odd line, whereas this LSB becomes a low level (L) in the case of the even line.

Figure 35:
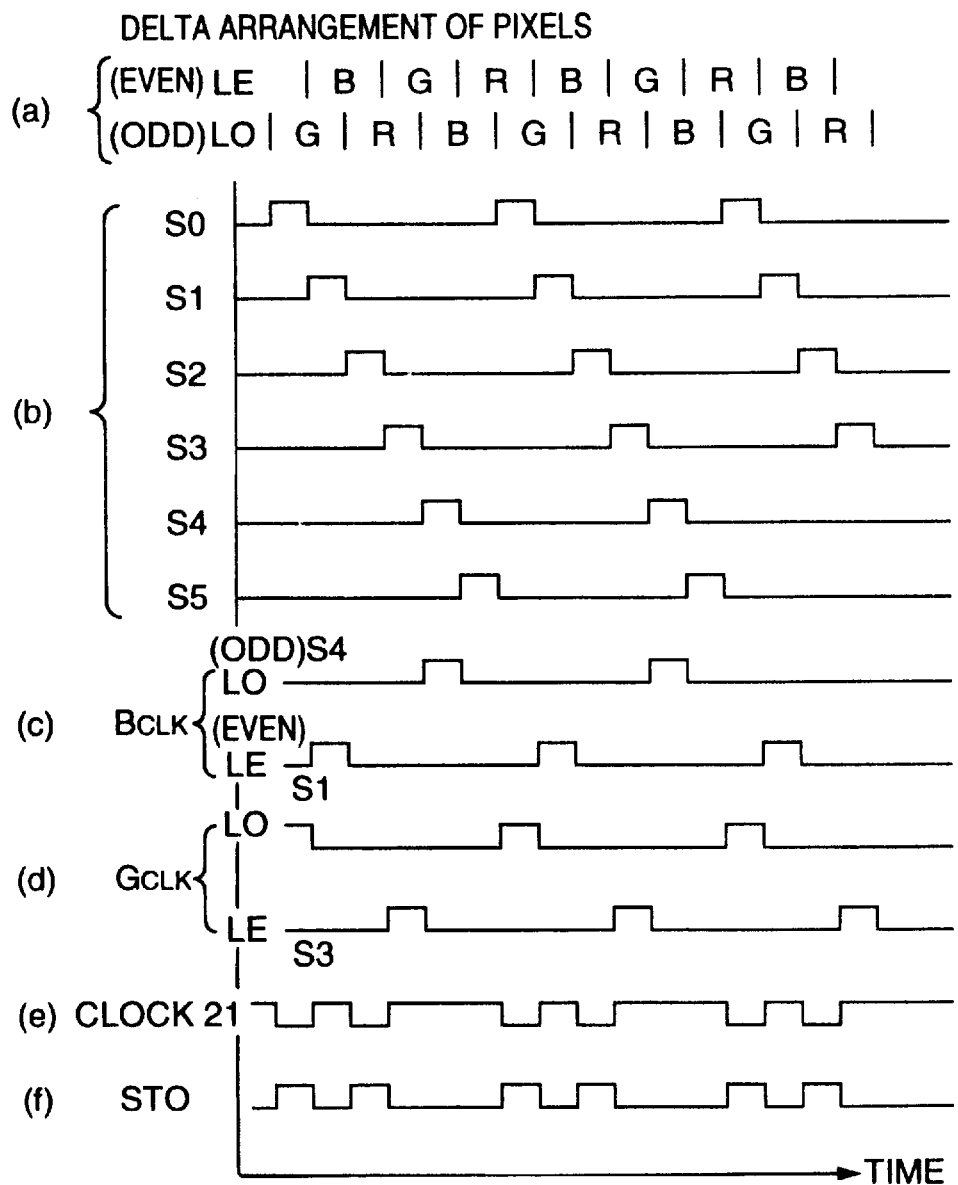
FIG. 35 is a timing chart used to explain operations of the oscilloscope according to the embodiment of FIG. 34.
Figure 36:
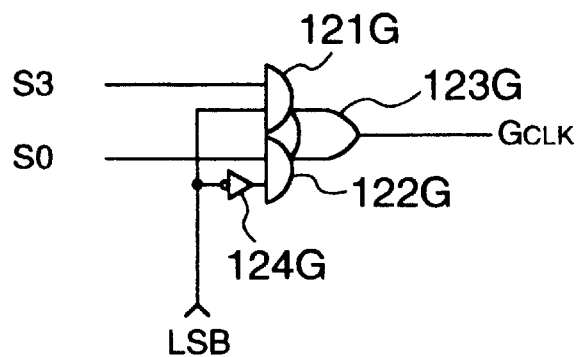
FIG. 36 is a circuit diagram for representing an example of a clock signal generating circuit employed in the oscilloscope of the embodiment indicated in FIG. 34.

The clock signals $G_{clk}$ and $B_{clk}$ supplied to the 3-phase timing generating circuit 122 are produced based upon the clock signals S0 to S5 and this LSB. FIG. 36 shows an example of a circuit for generating this clock signal. In this drawing, there is shown a circuit for generating the clock signal $G_{clk}$. This clock signal generating circuit includes two AND gates 121G, 122G; an OR gate 123G for inputting therein the outputs from the two AND gates; and an inverter 124G for inverting the LSB to supply the inverted LSB to the AND gate 122G. Both the clock signal S0 and the signal LSB are inputted to the AND gate 121G, and both the clock signal S3 and the inverted LSB signal are inputted to the AND gate 122G. The clock signal $G_{clk}$ outputted from this clock generating circuit becomes such a clock signal having different timings for the display data in the odd line, or the display data in the even line, as shown in FIG. 35(d), in response to the levels "H" and "L" of the LSB. In FIG. 35(a) and FIG. 35(d), symbols "LO" and "LE" represent clock signals for the display data in the odd line and the display data in the even line.

Another clock signal $B_{clk}$ (see FIG. 35c) is produced by using the clock signals S4 and S1 and the LSB signal in a similar circuit arrangement. It should be noted that although the clock signal $R_{clk}$ is not employed in this embodiment, this clock signal may be generated by using the clock signals S2 and S3, and the LSB signal in a similar circuit arrangement.

Figure 37:
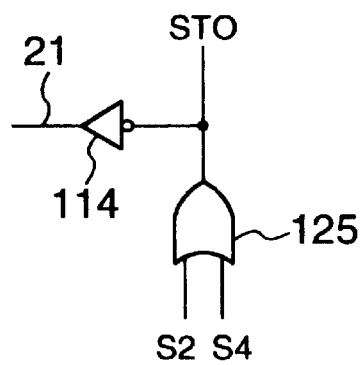
FIG. 37 is a circuit diagram for representing an example of a clock signal generating circuit employed in the oscilloscope of the embodiment indicated in FIG. 34.

As indicated in FIG. 37, a clock signal STO supplied to the interpolation circuit 128 is obtained from, for example, an output of the AND gate 125 for inputting therein the clock signals S2, S4. A clock signal 21 obtained by inverting this clock signal STO via the inverter 114 is supplied as a read clock signal to the display memory 4. Since no red dot R is emitted in this embodiment, this clock signal 21 does not provide a clock pulse corresponding to the red clock $R_{clk}$ (namely, red-display data 24R) among the 3-phase clocks. For the sake of convenience, the frequency of such a clock signal 21 is defined as 2fd/3.

The arrangement and operations of the display control unit 9 according to this embodiment will now be explained in such a case that two colors are displayed.

Figure 38:
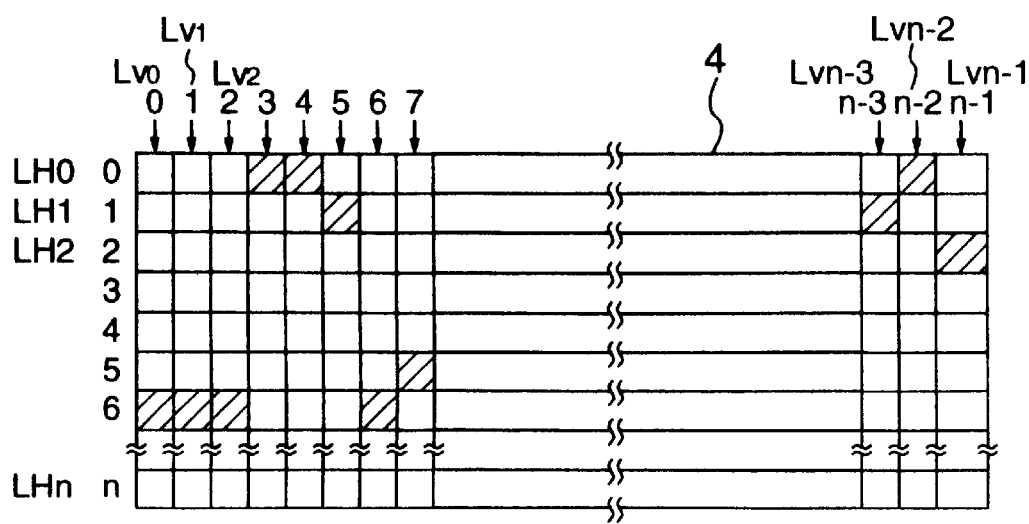
FIG. 38 is an explanatory diagram for explaining an enlarged screen of a color LCD display unit so as to explain the embodiment of FIG. 34.

FIG. 38 represents one example of waveform data of a display line memory 400. In this example, this line memory 400 owns n data, e.g., 320 data with respect to the color LCD display unit 60 along the horizontal scanning direction, and each of the data has 8 bits. Namely, in this case, the LCD display unit 60 has 480 dots along the horizontal scanning direction and 256 dots (256 lines) along the vertical scanning direction. In this drawing, a hatched portion indicates a place where waveform data to be displayed (display waveform data) is present. The waveform display data is written into the display memory 400 from the acquisition memory 3. In response to the clock signal 21 (see FIG. 35e), the display line memory 400 sequentially reads out the display waveform data in unit of 8 bits along the vertical scanning direction (as 8-bit parallel data). That is, in response to the clock signal 21, the display line memory 400 reads out the waveform data every addresses LV0, LV1, - - -, along the horizontal scanning direction shown in FIG. 38. As a result, all of the display data stored in the display line memory 400 are read during 1 horizontal scanning period shown in FIG. 39(c), and are supplied as waveform data "P" (see FIG. 39b) to the comparator 27. This reading operation for all the waveform data during 1 horizontal scanning period tH is repeatedly performed in the line memory 400 by such times equal to the line numbers of the LCD display unit 60 along the vertical direction, namely 256 times. In other words, the reading operation for all the waveform data is repeatedly executed by 256 times within 1 vertical scanning period tV. When this reading operation is accomplished, the subsequent display waveform data is entered from the acquisition memory 3 to the display line memory 400.

Next, a detailed description will now be made of the reading operation for the content of the display line memory 400, namely for reading the waveform data in a raster scanning manner.

Figure 39:
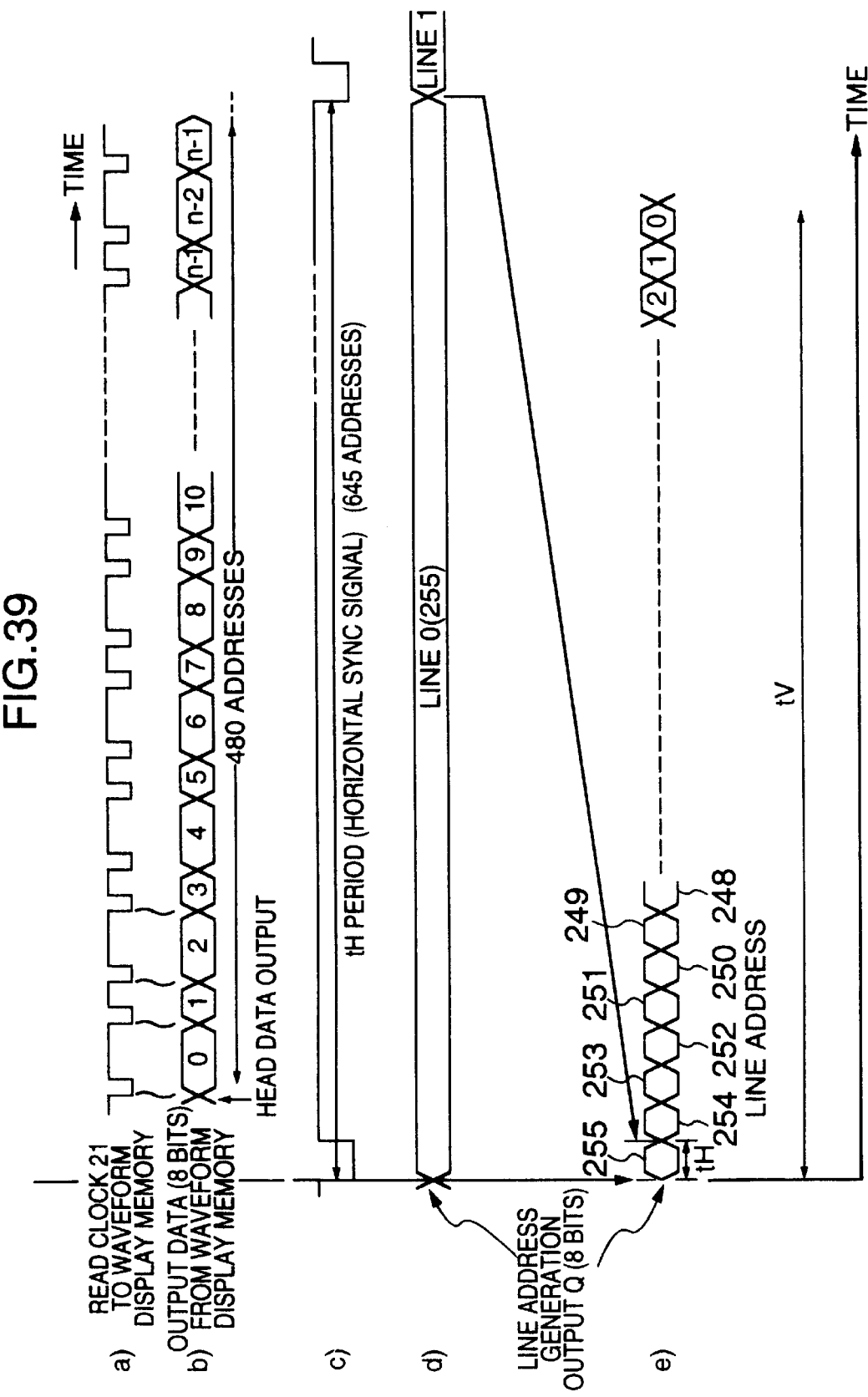
FIG. 39 is a timing chart for explaining reading operations from a display memory employed in the embodiment of FIG. 34.

A line address generating circuit 72 corresponds to, for example, an 8-bit binary down-counter for counting the clock signal 20 (see FIG. 39c) functioning as the horizontal sync signal. Accordingly, this line address generating circuit 72 counts the counting values from 255 to 0 during 1 vertical scanning period tV as shown in FIG. 39d and FIG. 39e. When this binary down-counter is reset in response to the next horizontal sync signal, the count value becomes 255 and the vertical sync signal SV is produced. As a result, the line address generating circuit 72 outputs addresses indicative of lines (LH0 to LHn of FIG. 38) under scanning operation in the LCD display unit 60.

Figure 40:
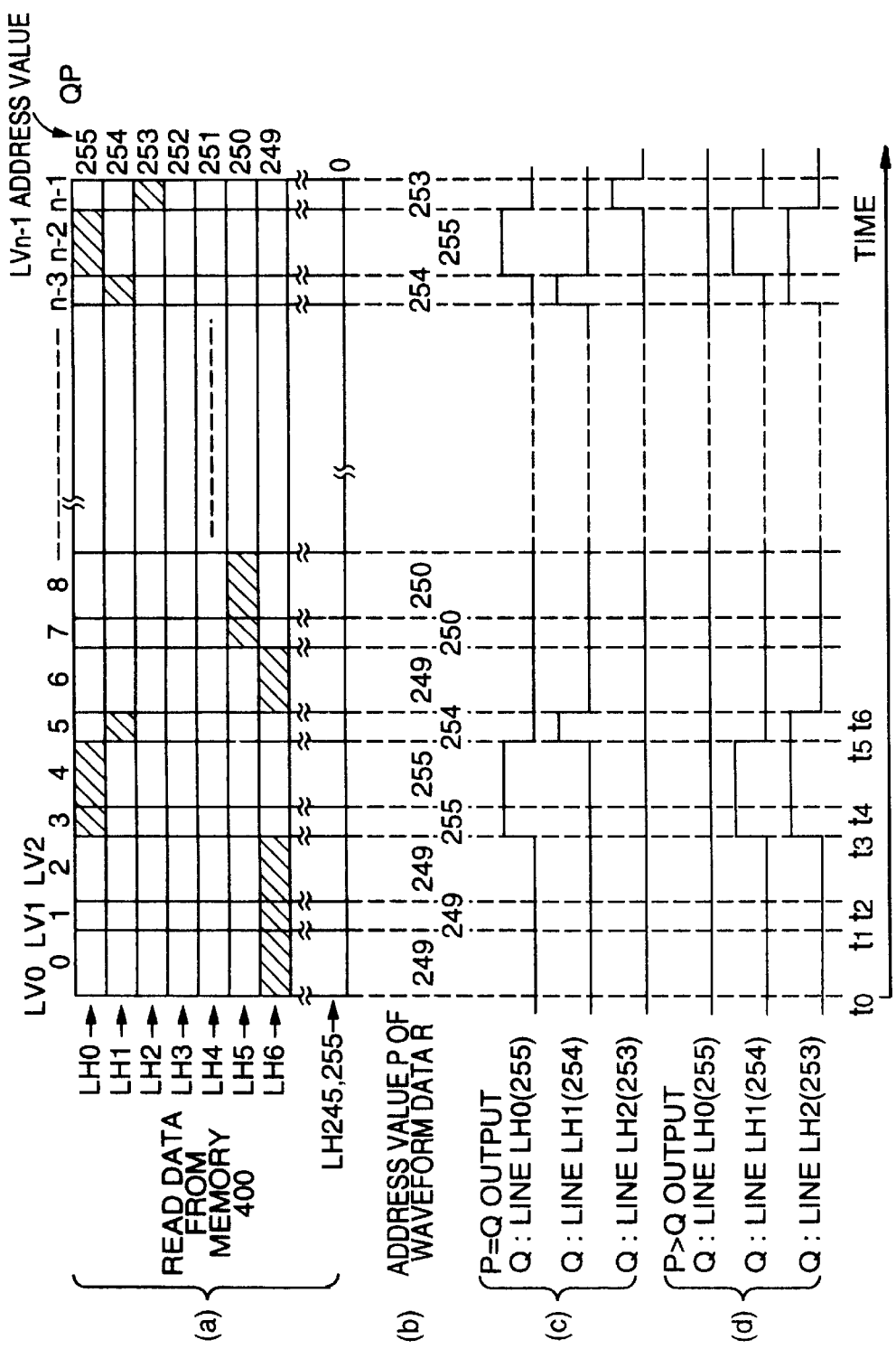
FIG. 40 is an operation explanatory diagram for showing a relationship between a memory operation and a timing in the oscilloscope of the embodiment shown in FIG. 34.

Referring now to FIG. 40, operation of the comparator 27 will be explained, FIG. 40(a) represents display waveform data "p" read from the display line memory 400, and a hatched portion denotes display data to be displayed. A first explanation is made of such a case when the output address Q from the line address generating circuit 72 is a value 255 indicative of the horizontal scanning line LHO. When the waveform data in the line LVO is read (time instant to), in this case of FIG. 40, since the waveform data "p" is present in the line LH6, a value of an address at which the data is present is 249. Data values of the waveform data "p" on the next lines LV1, LV2, LV3, LV4 are equal to 249, 249, 255, 255, respectively. The comparator 27 compares the address of the data with the address Q every waveform data "p" in the respective lines LV0, LV1, - - - -. When these addresses are coincident with each other, the comparator 27 sets a level of an output signal from a P=Q terminal to a high level. When P>Q, the comparator 27 sets a level of an output signal from a P>Q terminal to a high level, and sets it to low level in other cases. As a result, as shown in FIG. 40(c) and FIG. 40(d), the output signals from the P=Q terminal and the P>Q terminal of this comparator 27 are varied. Thus, when the output address Q indicates the value (255) of the horizontal scanning line LHO, if the comparing operations about all of the lines LV0 to LVn-1 have been accomplished, then the subsequently outputted output address Q indicates a value (254) of the next horizontal scanning line LH1. Also in this case, the comparing operation is carried out in a similar manner.

The output signals derived from the P=Q terminal and the P>Q terminal of the comparator 27 are supplied to the interpolation circuit 128.

The above-described operations are to read out the display data of the display line memory 400 in the raster scanning manner.

Operations of the embodiment shown in FIG. 34 will now be explained more in detail.

As indicated in FIG. 34, the interpolation circuit 128 includes, for example, D type flip-flops 130, 132; an OR gate 134; and an exclusive OR gate circuit 136. The clock signal STO issued from the clock signal generating circuit 151 is applied to latch inputs of the flip-flops 130 and 132. The output signals from the P=Q terminal and the P>Q terminal of the comparator 27 are supplied to data inputs D of the respective flip-flops 130 and 132.

The 3-phase timing generating circuit 122 is arranged by, for example, D type flip-flops 140, 142 having data inputs D into which the output from the OR gate 134 is inputted; AND gates 144, 146 for entering therein the Q output and the Q-bar output of this flip-flop 140; an OR gate 148 for entering therein the outputs from this AND gates 144, 146; AND gates 150, 152 for inputting therein the Q output and the Q-bar output of the flip-flop 142; another OR gate 154 for entering therein the outputs from the AND gates 150, 152; and an inverter 156. An inversion display control signal 158 derived from the microcomputer 8 is entered into the other inputs of the respective AND gates 144, 150, whereas this display control signal 158 is supplied via the inverter 156 to the other inputs of the respective AND gates 146, 152. When this inversion display control signal 158 has a low level, for example, the normal display is made (in this case, background is displayed in black, and waveform is displayed as a bright point). When this inversion display control signal 158 has a high level, the inversion display is made (in this case, background is displayed in white and waveform is displayed as dark color point, e.g., dark red point in this embodiment).

Figure 41:
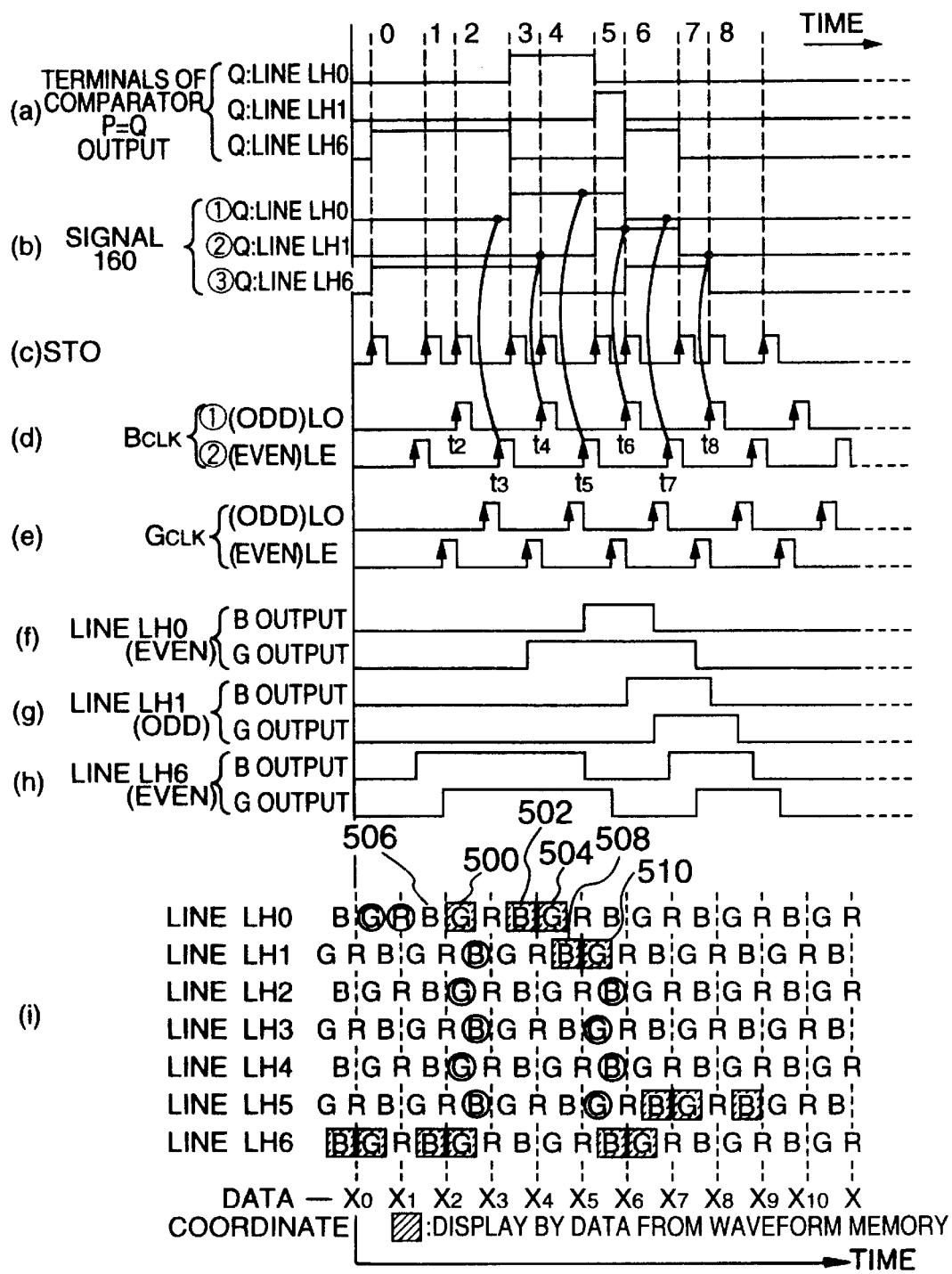
FIG. 41 is an operation explanatory diagram for showing a relationship between an LCD display and a timing in the oscilloscope of the embodiment shown in FIG. 34.
Figure 42:
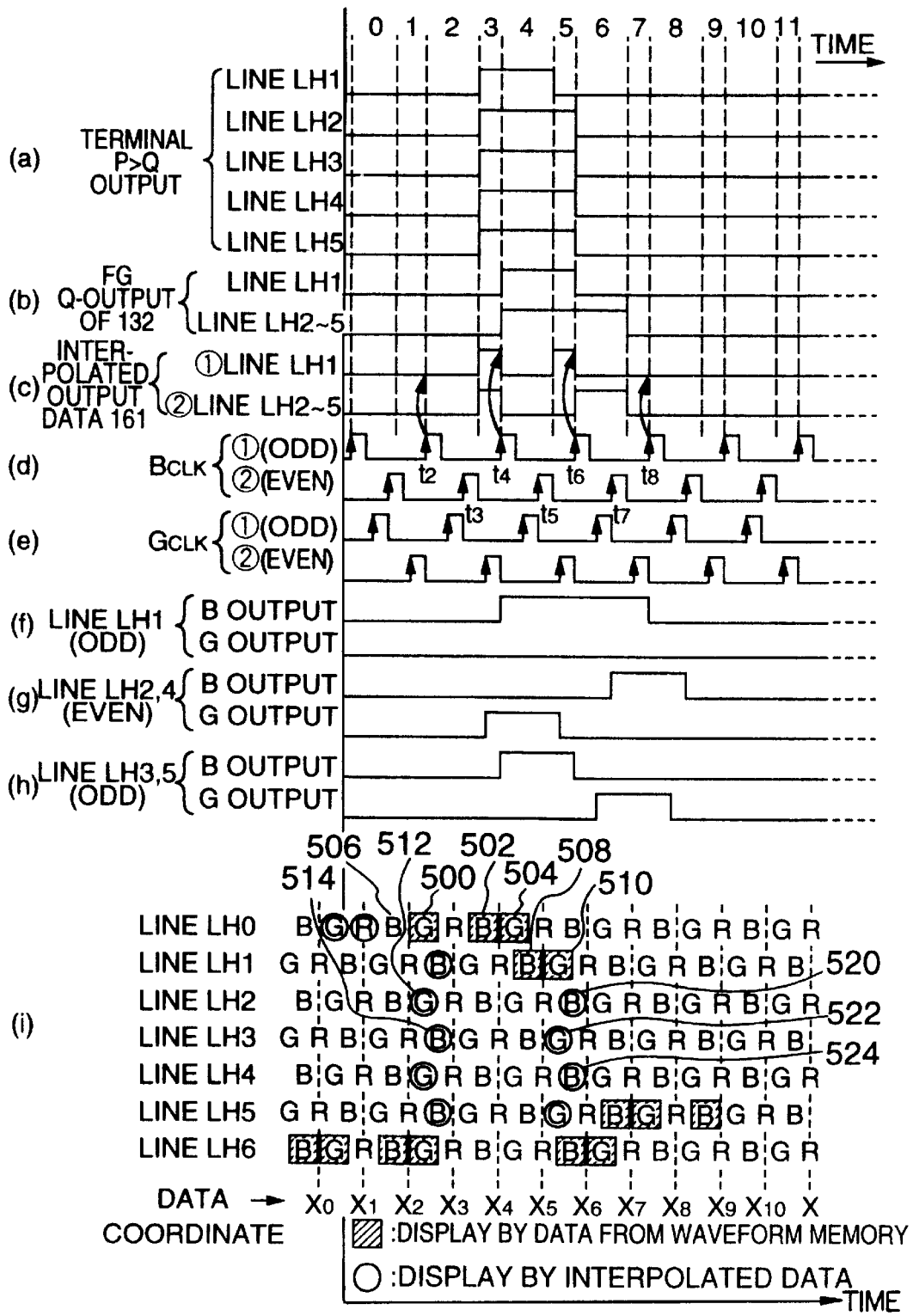
FIG. 42 is an operation explanatory diagram for showing a relationship between an LCD operation and a timing in the oscilloscope of the embodiment shown in FIG. 34.

Referring now to FIG. 41 and FIG. 42, operations of the interpolation circuit 128 and the 3-phase timing generating circuit 122. In the interpolation circuit 128, such a signal 160 for indicating that the output from the P=Q terminal of the comparator 27 and the output from the Q output terminal of the flip-flop 130 are OR-gated by the OR gate 134 will represent the display waveform data read from the display line memory 400. On the other hand, an output signal from the exclusive OR gate circuit 136 indicates interpolated data.

The 3-phase timing generating circuit 122 outputs display point data (display point data: data indicative of point to be displayed as waveform) B, G, (24B, 24G) based on the waveform data read from the display line memory 400, and also display data B, G (24B, 24G) based upon the interpolated data in response to these signals 160 and 161.

First, a description will now be made of the generation/display operations for the display data B, G, (24B, 24G) based upon the display waveform data read from the display line memory 400 with reference to FIG. 41. (a) of FIG. 41 shows the display data of the lines LH0, LH1, LH6 derived from the output terminal P=Q of the comparator 27; (b) of FIG. 41 represents the signal 160 of the lines LH0, LH1, LH6; and (c) of FIG. 41 indicates the signal STO from the decoder/selector 120. Also, (d) of FIG. 41 shows the clock signals $B_{clk}$ for the odd line and the even line derived from the decoder/selector 120; (e) of FIG. 41 denotes the clock signals $G_{clk}$ for the odd line and the even line; (f) of FIG. 41 represents the output display data B, G (24B, 24G) for the odd line LH0; (g) of FIG. 41 represents the output display data B, G, (24B, 24G) for the even line LH1; and (h) of FIG. 41 represents the output display data B, G (24B, 24G) for the even line LH16. (i) of FIG. 41 denotes a display screen of the LCD display unit 60. It should be noted than the output timings of the display data B, G shown in (f) of FIG. 41 to (h) of FIG. 41 are made in correspondence with the emission timings of the display data of the display screen shown in (i) of FIG. 41. This may be similarly applied to FIG. 42.

The display of, for example, the blue display data of the even line LH0 will now be explained. In this case, the signal 160 derived from the interpolation circuit 128, which is processed in the flip-flop 140 of the 3-phase timing generating circuit 122, corresponds to such data as shown by reference numeral ① of (b) of FIG. 41. The clock signal $B_{clk}$ for determining the display timing of this data corresponds to a clock signal indicated by reference numeral ② of (d) of FIG. 41.

First, the signal 160 is latched in the rising of this clock signal at a time instant t3. However, since this signal was at the low level so far, the output display data (f) line LH0-B is also at a low level. Next, at the rising edge of this clock signal in a time instant t5, since the signal 160 is at a high level, the output display data (f) LH0-B is also at a high level. Next, in the rising edge of the clock signal of this $B_{clk}$ ② of (d) at a time instant t7, since the signal 160 (① of (b)) becomes a low level, the output display (f) line LH0 data B also becomes a low level. As a consequence, the display data (B) of the line LH0 becomes a high level during a time duration between t5 and t7. Accordingly a pixel B of BG pixels 502 corresponding to the coordinate X4 is emitted in the LCD display unit 60.

Similarly, the blue display data in the even line (for example LH1) is produced based upon the data (indicated by ② of (b) of FIG. 41) inputted to the flip-flop 140 of the 3-phase timing generating circuit 122, and also the clock signal $B_{clk}$ indicated by ① of (d) of FIG. 41.

In a similar manner, the green display data is generated by the signal 160 inputted into the flip-flop 142 of the 3-phase timing generating circuit 122 and the clock signal $G_{clk}$.

In this manner, as indicated by an inclined line and surrounded by a rectangular shape of (i) of FIG. 41, the blue and green pixels (B, G) 500, 504, 508, 510 and the line are emitted. In this manner, as shown by the oblique line in this drawing, the pixels are emitted in response to the display data B, G (24G, 24B) based upon the display waveform data read from the display line memory 400. It should be understood that the display data B and G surrounded by a circle of (i) of FIG. 41 represent a display pixel based on the interpolated data.

Subsequently, an explanation will now be made of the generation/display operation of the display data B, G (24B, 24G) based on the interpolated data with reference to FIG. 42.

(a) of FIG. 42 shows the display data of the lines LH1 to LH5 derived from the output terminal P>Q of the comparator 27. It should be noted that since no interpolation is carried out in the uppermost line LH0 and the lowermost line LH255, no interpolated data of these lines are outputted from the output terminal P>Q. (b) of FIG. 42 shows the Q outputs of the flip-flop 132 of the interpolation circuit 128 with respect to the lines LH1 to LH5. (c) of FIG. 42 represents an interpolated data signal 161 with respect to the line LH1 through the line LH5. (d) of FIG. 41 indicates the clock signals $B_{clk}$ for the odd line and the even line derived from the decoder/selector 120 of the clock signal generating circuit 151. Similarly, (e) of FIG. 42 shows the clock signal $G_{clk}$ for the odd line and the even line. (f) of FIG. 42 indicates interpolated display data B, G, (24B, 24G from 3-phase timing generating circuit 122 of FIG. 34) for the odd line LH1. (g) of FIG. 42 shows interpolated display data B, G (similarly, 24B, 24G of FIG. 15) for the even lines LH2 and LH4. (h) of FIG. 42 denotes interpolated display data B, G (similarly, 24B, 24G of FIG. 15) for the odd lines LH3 and LH5. (i) of FIG. 42 denotes a display screen of the LCD display unit 60.

For instance, the blue interpolated display data of the odd line LH1 will now be described. In this case, the signal 161 processed by the flip-flop 132 of the 3-phase timing generating circuit 122 corresponds to such data as shown by reference numeral ① of (c) of FIG. 42, and also the clock signal $B_{clk}$ from the clock signal generating circuit 151 corresponds to a clock signal indicated by reference numeral ① of (d) of FIG. 42. At a rising edge of this clock signal in a time instant t2, the signal 161 is latched. Since the signal 161 is at a low level, the interpolated display data B of the line LH1 in (f) of FIG. 42 is also at a low level. Next, at a rising edge of this clock signal in a time instant t4, as the signal 161 is at a high level, the interpolated display data B becomes also a high level. Next, also at a rising edge of this clock signal at a time instant t6, since the signal 161 is at a high level, the interpolated display data B remains at the high level. Subsequently, at a rising edge of this clock signal at a time instant t8, since the signal 161 becomes a low level, the interpolated display data B also becomes a low level. As a consequence, the interpolated display data B of the line LH1 becomes a high level from the time instant t4 to the time instant t8. Accordingly, the B pixels 506, 508 corresponding to the coordinate X3 is emitted in the LCD display unit 60.

Similarly, as indicated by a circle in (i) of FIG. 42, the blue and green pixels (B, G) 508, 512, 514, 520, 522, 524 and so on are emitted. In this way, as represented by a circle, the pixels are emitted by the display data B, G (24B, 24G) based on the interpolated display waveform data.

As apparent from FIG. 41 and (i) of FIG. 42, one pair of blue and green pixels 500 and 502 constitute one display unit of the coordinate X3 along the horizontal scanning direction, and one pair of pixels 502 and 504 constitute a display unit of the coordinate X4.

On the other hand, in the vertical scanning direction, since a single waveform line displayed by the interpolated data along the vertical scanning direction is displayed by a single pixel in the respective lines LH1 to LH5 (for example, 512, 514), the waveform data an be represented by a sharp and narrow line.

Figure 43:
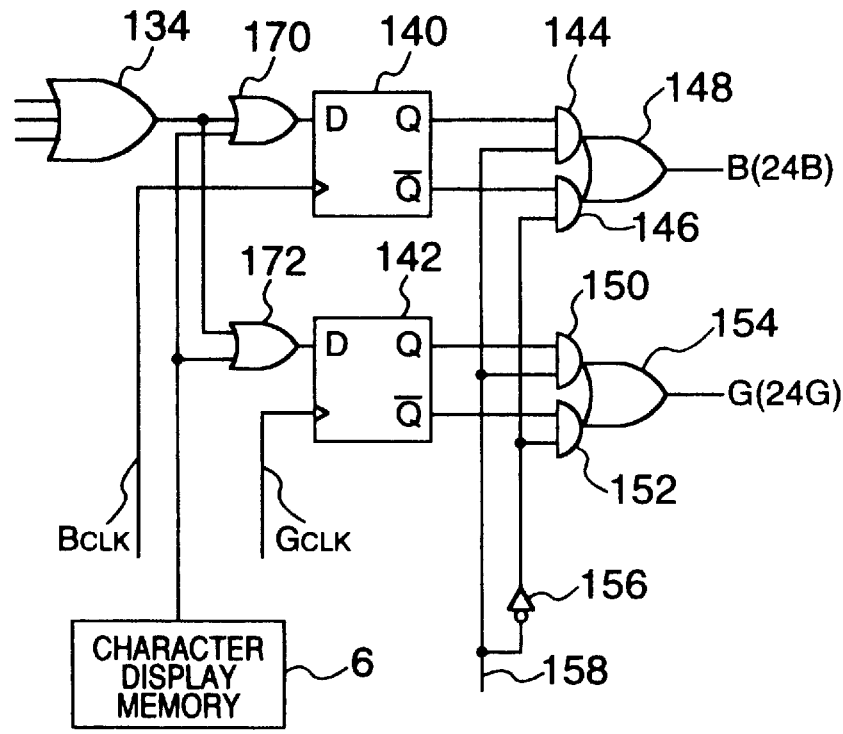
FIG. 43 is a circuit diagram for showing another example of a 3-phase timing circuit employed in the embodiment of FIG. 34.

In another embodiment shown in FIG. 34, when the character data is displayed in addition to the waveform data derived from the interpolation circuit 128, as indicated in FIG. 43, a three-phase timing generating circuit 122 is arranged. That is, OR gates 170 and 172 are provided on the data input D sides of the respective D type flip-flops 140 and 142. Both the display data outputted from the OR gate 134 and the character data outputted from the character display memory 6 are inputted to the inputs of the respective OR gates 170 and 172. The outputs from the respective OR gates 170 and 172 are entered into the data inputs D of the corresponding flip-flops 140 and 142.

In the above-described embodiment, the blue pixel and the green pixel are emitted to display the data in yellow. Also, other color displays may be easily realized by combining other two color pixels with employment of the clock signal $R_{clk}$ and the like.

Next, data displaying methods when various digital oscilloscopes to which this embodiment is applied are operated will now be explained.

Figure 44:
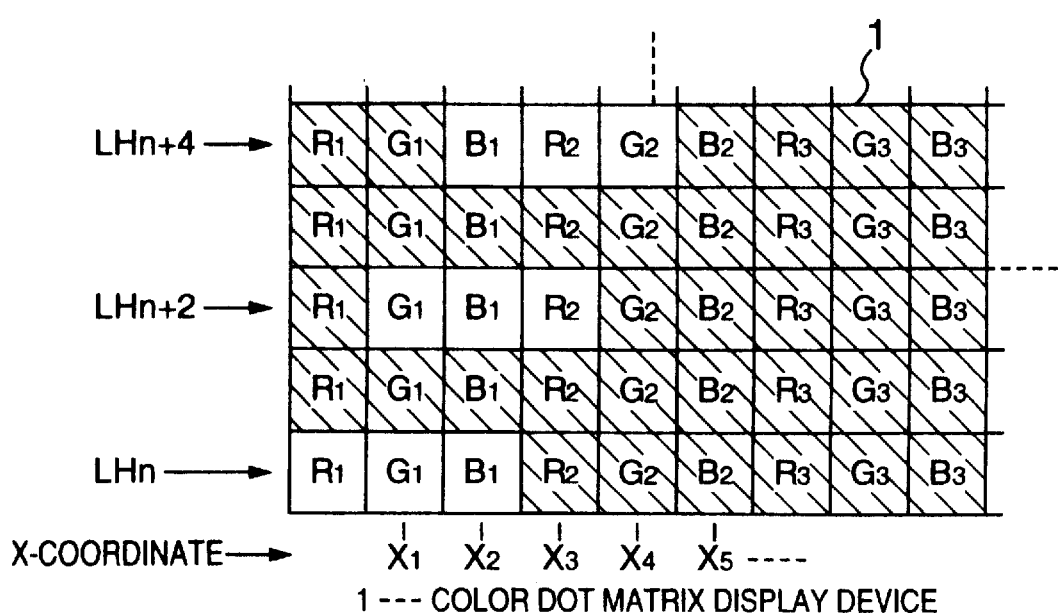
FIG. 44 is an explanatory diagram for explaining an enlarged screen of a color LCD display unit employed in the embodiment of the present invention.

In an example shown in FIG. 44, assuming now that a first pixel group of the line (LH) in the respective horizontal scanning directions is defined as R1, G1, B1, and a second pixel group thereof is R2, G2, B2, when the pixel groups are emitted every 1 horizontal scanning line, for example, the dots R1, G1, B1 of the first pixel group of the line LHn are emitted by the applied first data. Then, the dots G1, B1, R2 belonging to the first pixel group of the line LHn+2 and to a portion of the second pixel group are emitted by the second data, and the dots B1, R2, G2 belonging to the first pixel group of the line LHn+4 and to a portion of the second pixel group thereof are emitted by the third data. In other words, since there are coordinate axes corresponding to the respective dots R, G, B, the R, G, B pixel groups emitted by the applied data are emitted as a partially overlapped group.

Since the emissions of the dots R, G, B of one group are performed in unit of resolution (resolution indicated by coordinates X1, X2, X3, X4, X5, - - -, of FIG. 44), the horizontal display resolution achieved by this display method is increased three times higher than the horizontal display resolution achieved by the display method of the technique explained in FIG. 48.

For instance, when the waveform shown in FIG. 44 is displayed in accordance with the technique shown in FIG. 48, although the pixels R, G1 B in the line LHn of FIG. 44 are displayed, the pixels in the line LHn+2 and the line LHn+4 are not displayed, so that the displayed waveform could not be observed as a continuous line.

Next, another example shown in FIG. 45 will now be explained in which the R, G, B pixels of the color LCD display unit are arranged in the delta form, and the pixels are arranged in the order of G, R, B, G, R, B, - - -, in the line LHN and the line LH (n+even number), and also in the order of B, G, R, B, G, R, - - -, in the line LH (n+odd number).

Figure 45:
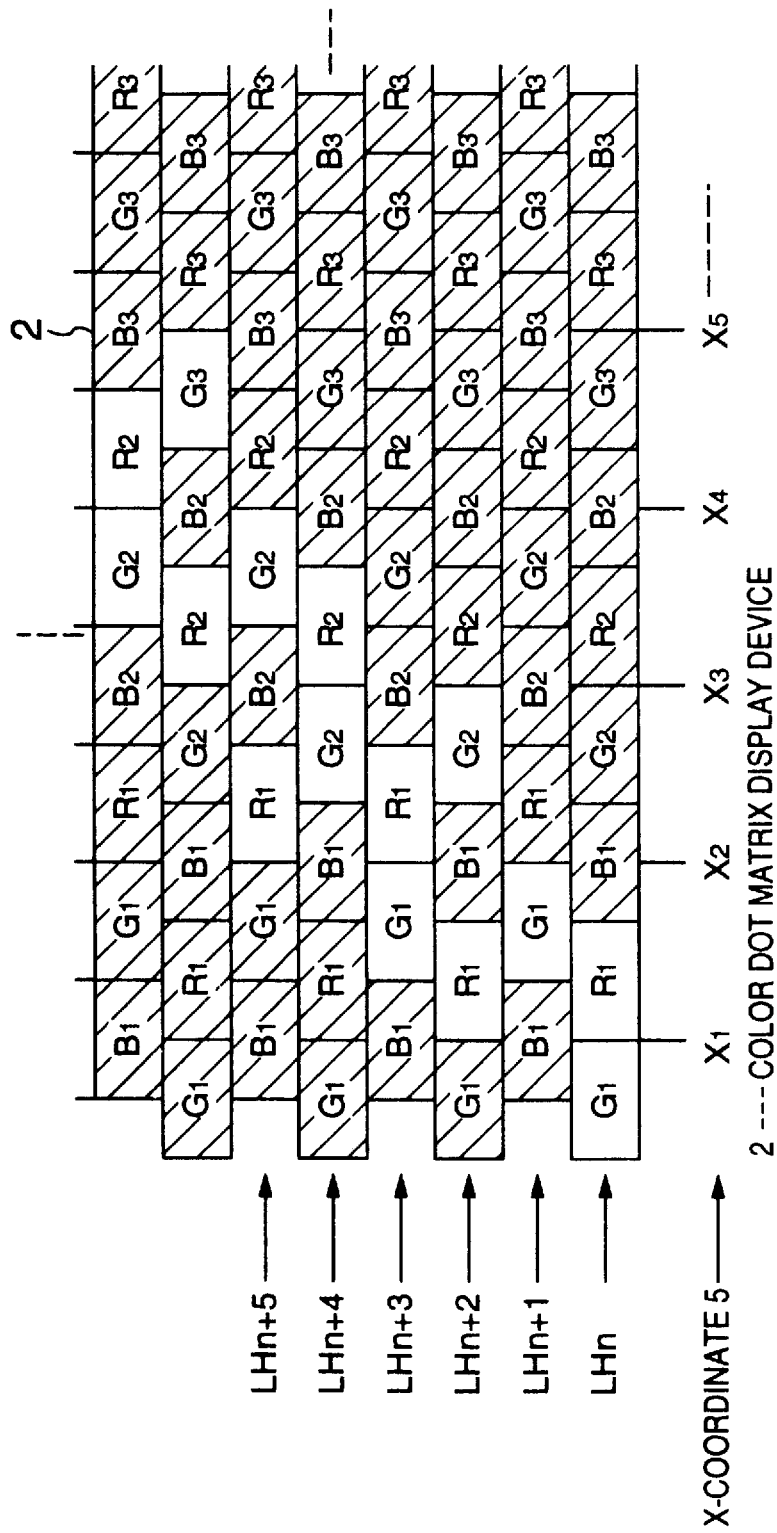
FIG. 45 is an explanatory diagram for explaining an enlarged screen of a color LCD display unit employed in the embodiment of the present invention.

As illustrated in FIG. 45, assuming now that a first pixel group of the respective lines LHn and LH (n+even number) is defined as G1, R1, B1, and a second pixel group thereof is defined as G2, R2, B2, whereas a first pixel group of the line LH (n+odd number) is defined as B1, G1, R1, and a second pixel group thereof is defined as B2, G2, R2. For instance, a description will now be made of such a case that the pixels G and R are emitted to become yellow light. In this case, the pixels R1, G1, of the first pixels group i the line LHn are emitted by the applied first data. Then, the pixels R1, G2 belonging to the first pixel group of the line LHm+2 and to a portion of the second pixel group are emitted by the second data, and the pixels R2, G2 belonging to the second pixel group of the line LHn+4 are emitted by the third data. Also, in the line LHn+1, the pixel G1 of the first pixel group (unfortunately, pixel R0 (not shown) to emit "R" is lost since it is positioned at the end portion of the screen) is emitted by the first data; the pixels R1, G1 of the first pixel group in the line LHn+3 are emitted by the second data; and then the pixels R1, G2 belonging to the first pixel group in the line LHn+5 and belonging to a portion of the second pixel group are emitted by the third data.

Since the emissions of the pixels R, G, of one group are performed in unit of resolution (resolution indicated by coordinates X1, X2, X3, X4, X5, - - -, of FIG. 45), the vertical display resolution achieved by this display method is increased two times higher than the vertical display resolution achieved by the display method of the technique explained in FIG. 49.

Figure 46:
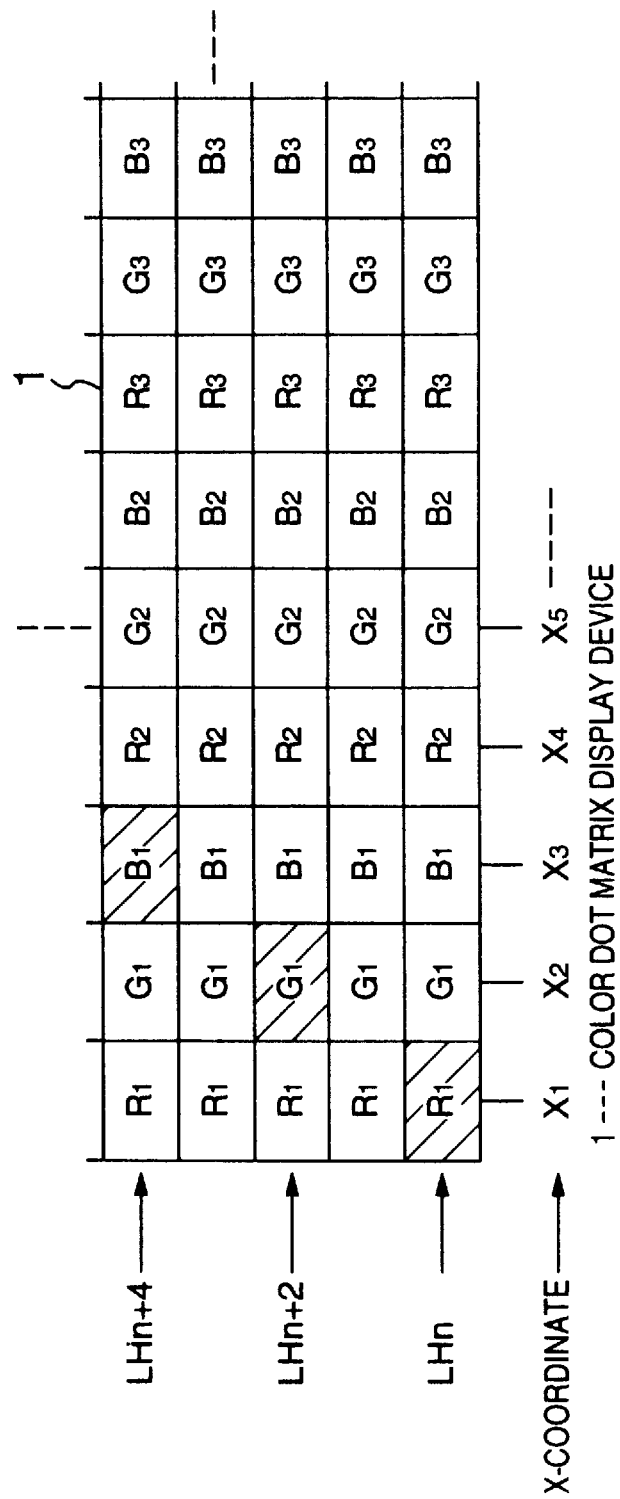
FIG. 46 is an explanatory diagram for explaining an enlarged screen of a color LCD display unit employed in the embodiment of the present invention.

Furthermore, another display example will now be explained with reference to FIG. 46. In FIG. 46, a portion of the pixels in the color LCD display unit 60 is indicated in an enlarged form. It should be noted that the display data are produced in conformity to the coordinate points (X1, X2, - - -) of the X coordinate in FIG. 46.

As shown in FIG. 46, similar to FIG. 44, in the case that a plurality of R, G, B pixel arrays of the color LCD display unit are arranged in the order of R, G, B, R, G, B, - - -, along the horizontal direction, a first pixel group of the respective lines is defined as R1, G1, B1 whereas a second pixel group thereof is defined as R2, G2, B2. In this case, any one of the pixels R1, G1, B1 belonging to the first pixel groups in the line LHn, for instance, the red pixel R1 is not emitted by the first applied data. Then, any one of the pixels R1, G1, B1 of the first pixel group in the line LHn+2, for instance, the green pixel G1 is not emitted by the second data. Also, any one of the pixels R1, G1, B1 of the first pixel group in the line LHn+4, for instance, the blue pixel B1 is not emitted by the third data. Thus, the data is displayed in block (inversion display) by emitting all of other pixels.

Since no emissions of one pixel of one group are used as a unit of representation (representation unit indicated by coordinates X1, X2, X3, X4, X5, - - -, of FIG. 46), the horizontal display resolution achieved by this display method is increased three times higher than the horizontal display resolution achieved by the display method of the technique explained in FIG. 48.

In accordance with this embodiment, the video picture, the oscilloscopic image, and also the video waveform can be displayed in the different colors in the respective display channels by way the sharp/narrow lines, so that such a compact oscilloscope in light weight capable of easily observing the displayed waveforms can be provided.

As previously explained, oscilloscopes, video monitors, vector scopes, and waveform monitors are necessarily required in adjustments as well as maintenance of video appliances. Since the oscilloscope of the present invention can own these functions, the portable oscilloscope can be obtained. Also, since a single LCD is commonly used in the digital oscilloscope, this oscilloscope can be manufactured in low cost. Further, in the optimum embodiment, since an A/V-purpose LCD may be employed, the resultant digital oscilloscope can be made in further low cost.

While the oscilloscope of the present invention is operated as the oscilloscope, vector scope, or waveform monitor, even when such a color dot matrix display device with fewer pixels (in particular, A/V-purpose LCD) is employed, the respective pixels are displayed in unit of at least one pixel (one dot among R, G, B dots) under control of the data. As a consequence, the horizontal display resolution can be increased, and therefore the display grades of these waveforms can be improved. Similarly, since the display control can be done in dot unit, as previously explained in the respective embodiments, even if an LCD for a relationaly low-cost TV receiver is employed, this LCD can be utilized as the display device for the oscilloscope, the vector scope, and the waveform monitor, which can display the waveform with high resolution. Accordingly, it is possible to provide such a color oscilloscope having the video monitoring function in very low cost.

Furthermore, according the present invention, the pixel (display unit) can be displayed in small in the digital oscilloscope. As a result, a more compact color dot matrix flat display device may be employed, as compared with a CRT used as the display device. As a consequence, according to the present invention, for example, a compact/portable oscilloscope having a video input and operable by a battery can be realized which may function as the oscilloscope, the vector scope, and the video signal waveform display (waveform monitor) with employment of a more compact/light-weight color dot matrix flat display device.

In accordance with the present invention, for instance, when the oscilloscope is combined with a compact video camera, signal waveforms of underground cables may be monitored while observing a picture of this compact video camera and operating a display switching device, if needed, even at such a place as underground cables where no person can enter.

When the oscilloscope according to the present invention is combined with a CATV tuner, while a CATV signal is monitored as a picture monitor, this CATV signal may be observed by this oscilloscope.

In particular, furthermore, when the video waveform monitor and the vector scope are operated, since the waveform can be displayed in the gradation manner approximated to the analog display by employing the overwriting display, the waveform monitoring operation can be smoothly performed. As this gradation display may be utilized as the oscilloscopic display, such a natural waveform can be observed in the analog oscilloscope.

When a video appliance is installed and checked for maintenance services, such measuring appliances as a waveform monitor, a vector scope, a picture monitor, and an oscilloscope are necessarily required. In practical cases, these measuring appliances are independently required. However, since it is very troublesome to bring these measuring appliances to the place where the video appliance is installed or checked, it has been desired that these measuring appliances are unitedly formed and portable. The oscilloscope according to the present invention is able to obviate such a problem and realize such a desire.

What is claimed is:

1. A digital oscilloscope having a video signal input, comprising:

a first input terminal, to which a signal to be observed is supplied;

an oscilloscope unit coupled to said first input terminal, for processing said signal to be observed supplied from said first input terminal to output a waveform as an oscilloscope;

a second input terminal, to which a video signal is supplied;

a picture monitor unit coupled to said second input terminal, for processing said video signal supplied from said second input terminal to output a picture monitor signal;

a display switching unit coupled to said oscilloscope unit and said picture monitor unit, for selecting one of the output signals derived from said oscilloscope unit and from said picture monitor unit; and a display device coupled to said display switching unit, for displaying either one of said output signals from said oscilloscope unit and said picture monitor unit.

2. A digital oscilloscope having a video signal input as claimed in claim 1 wherein:

said display device is a color dot matrix flat display device including a display unit having a large number of dots arranged in a matrix form for a color display.

3. A digital oscilloscope having a video signal input as claimed in claim 2 wherein:

said oscilloscope unit includes:

a memory for storing therein display data based upon said signal to be observed supplied from said first input terminal; and display data output means having sync signal generating means for outputting a sync signal, and an output unit for reading the display data from said memory in synchronism with said sync signal to thereby output said display data as said oscilloscope signal to said display switching unit;

said color dot matrix flat display device includes said display unit; a dot scanning control unit for sequentially supplying the signal from said display switching unit to the dots of said display unit so as to display the display data; and a scanning clock signal generator for generating a scanning clock signal used to scan said display unit;

said scanning clock signal generator generates said scanning clock signal in synchronism with said sync signal derived from said sync signal generating means; and said dot scanning control unit sequentially supplies the signal derived from said display switching unit in synchronism with said scanning clock signal to the dots of said display unit so as to display the display data on said display unit.

4. A digital oscilloscope having a video signal input as claimed in claim 2 wherein:

said oscilloscope unit includes:

an analog processing circuit for converting the signal under monitor into a predetermined level;

an A/D converting circuit for converting the signal under monitor whose level has been converted into said predetermined level by said analog processing circuit into digital data by way of a sampling operation;

an acquisition memory for storing therein the digital data converted by said A/D converting circuit by way of a sampling operation;

a sampling control circuit for controlling the sampling operations of said acquisition memory and said A/D converting circuit;

a microcomputer for converting said digital data stored in the acquisition memory into display data;

a display memory for storing therein said display data converted by said microcomputer; and a display control unit for separating said display data of the display memory into R, G, B signals and a sync signal and for supplying said R, G, B signals and said sync signal as said oscilloscope signal to said display switching unit;

said color dot matrix flat display device includes said display unit; a dot scanning control unit for sequentially supplying the signal from said display switching unit to the dots of said display unit so as to display the display data; and a scanning clock signal generator for generating a scanning clock signal used to scan said display unit;

said scanning clock signal generator generates said scanning clock signal in synchronism with said sync signal derived from said sync signal generating means; and said dot scanning control unit sequentially supplies the signal derived from said display switching unit in synchronism with said scanning clock signal to the dots of said display unit so as to display the display data on said display unit.

5. A digital oscilloscope having a video signal input, comprising:

a first input terminal, to which a monitored signal is applied;

an oscilloscope unit coupled to said first input terminal, including an analog processing circuit for converting said monitored signal derived from said first input terminal into a predetermined level, and an output unit for processing the signal derived from said analog processing circuit to output a waveform as an oscilloscope;

a second input terminal, to which a video signal is applied;

a switch for selecting one of said signals derived from said analog processing circuit and said video signal derived from said second input terminal;

a picture monitor unit coupled to said switch, for processing the signal derived from said switch to output a picture monitor signal;

a display switching unit for selecting one of the output signals derived from said oscilloscope unit and derived from said picture monitor unit; and a display device for displaying either one of said outputs derived from said oscilloscope unit and said picture monitor unit.

6. A digital oscilloscope having a video signal input as claimed in claim 5 wherein:

said display device is a color dot matrix flat display device including a display unit having a large number of dots arranged in a matrix form for a color display.

7. A digital oscilloscope having a video signal input as claimed in claim 6 wherein:

said output unit of said oscilloscope includes:

a memory for storing therein display data based upon the signal derived from said analog processing unit; and display data output means having sync signal generating means for outputting a sync signal, and an output unit for reading the display data from said memory in synchronism with said sync signal to thereby output said display data as said oscilloscope signal to said display switching unit;

said color dot matrix flat display device includes said display unit; a dot scanning control unit for sequentially supplying the signal from said display switching unit to the dots of said display unit so as to display the display data; and a scanning clock signal generator for generating a scanning clock signal used to scan said display unit;

said scanning clock signal generator generates said scanning clock signal in synchronism with said sync signal derived from said sync signal generating means; and said dot scanning control unit sequentially supplies the signal derived from said display switching unit in synchronism with said scanning clock signal to the dots of said display unit so as to display the display data on said display unit.

8. A digital oscilloscope having a video signal input, comprising:

a first input terminal for the oscilloscope, for entering therein a signal under monitor;

an analog processing circuit for converting said signal under monitor derived from said first input terminal into a predetermined level;

a second input terminal for entering therein a video signal;

a first switch for selecting one of said signal derived from said analog processing circuit and said video signal derived from said second input terminal;

a picture monitor circuit for inputting therein the signal selected by said first switch so as to produce R, G, B signals, a sync signal, and a sub-carrier signal, which are outputted as s picture monitor signal;

a waveform monitor circuit for inputting therein the signal selected by said first switch to produce a video chroma signal;

a vector scope circuit for generating X-Y vector data based upon the sub-carrier signal from said picture monitor circuit and the video chroma signal from said waveform monitor circuit;

a second switch for selecting any one of said signal under monitor whose signal level has been converted into said analog processing circuit, said X-Y vector data generated from said vector scope circuit, and said video chroma signal generated from said waveform monitor circuit, and for outputting said selected signal;

an oscilloscope unit for processing the signal selected from said second switch to thereby output an oscilloscope signal;

a display switching unit for selecting one of the oscilloscope signal derived from said oscilloscope unit and the picture monitor signal derived from said picture monitor unit; and a display device for displaying thereon either said oscilloscope signal or said picture monitor signal derived from said display selecting unit.

9. A digital oscilloscope having a video signal input as claimed in claim 8 wherein:

said display device is a color dot matrix flat display device including a display unit having a large number of dots arranged in a matrix form for a color display.

10. A digital oscilloscope having a video signal input as claimed in claim 9 wherein:

said oscilloscope unit includes:

a memory for storing therein the signal selected from said second switch; and display data output means having sync signal generating means for outputting a sync signal, and an output unit for reading to display data from said memory in synchronism with said sync signal to thereby output said display data as said oscilloscope signal to said display switching unit;

said color dot matrix flat display device includes said display unit; a dot scanning control unit for sequentially supplying the signal from said display switching unit to the dots of said display unit so as to display the display data; and a scanning clock signal generator for generating a scanning clock signal used to scan said display unit;

said scanning clock signal generator generates said scanning clock signal in synchronism with said sync signal derived from said sync signal generating means; and said dot scanning control unit sequentially supplies the signal derived from said display switching unit in synchronism with said scanning clock signal to the dots of said display unit so as to display the display data on said display unit.

11. A digital oscilloscope having a video signal input as claimed in claim 8 wherein:

said oscilloscope unit includes:

a gradation processing unit for gradation-processing said video chroma signal and said X-Y vector data selected from said second switch.

12. A digital oscilloscope having a video signal input as claimed in claim 8 wherein:

said waveform monitor circuit includes at least one of:

a low-pass filter and a band-pass filter for inputting therein said signals selected from second switch, respectively; and a switch for selecting any one of output signals derived from said low-pass filter and said band-pass filter to thereby output said selected output signal as said video chroma signal.

13. A digital oscilloscope having a video signal input, comprising:

a first input terminal for the oscilloscope, for entering therein a signal under monitor;

an analog processing circuit for converting said signal under monitor derived from said first input terminal into a predetermined level;

a second input terminal for entering therein a video signal;

a first switch for selecting one of said signal derived from said analog processing circuit and said video signal derived from said second input terminal;

a picture monitor circuit for inputting therein the signal selected by said first switch so as to produce R, G, B signals, a sync signal, and a sub-carrier signal, which are outputted as a picture monitor signal;

a waveform monitor circuit for inputting therein the signal selected by said first switch to produce a video chroma signal;

a vector scope circuit for generating X-Y vector data based upon the sub-carrier signal from said picture monitor circuit and the video chroma signal from said waveform monitor circuit;

a second switch for selecting any one of said signal under monitor whose signal level has been converted into said analog processing circuit, said X-Y vector data generated from said vector scope circuit, and said video chroma signal generated from said waveform monitor circuit, and for outputting said selected signal;

an analog-to-digital converting circuit for sampling the signal selected by said second switch to convert the sampled signal into digital data;

an acquisition memory for sampling the digital data derived from said analog-to-digital converting circuit so as to store therein the sampled digital data;

a sampling control circuit for controlling the sampling operations of said analog-to-digital converting circuit and said acquisition memory;

a micro computer for converting the data stored in said acquisition memory into display data;

a display memory for storing therein the display data derived from said microcomputer;

a display control unit for separating said display data read from said display memory into R, G, B signals and a sync signal to thereby output these R, G, B, and sync signals;

a display switching unit for selecting one of said R, G, B signals and also said sync signal from said display control unit, and said R, G, B signals and also said sync signal from said picture monitor circuit; and a color dot matrix display device for displaying thereon the signals selected from said display switching unit.

14. A digital oscilloscope having a video signal input as claimed in claim 13 wherein:

said color dot matrix flat display device includes:
  said display unit;
  a dot scanning control unit for sequentially supplying the signal derived from said display switching unit to the dots of said display unit in dot unit so as to display said supplied signal; and
  a scanning clock signal generator for generating a scanning clock signal used to scan said display unit;
  said scanning clock signal generator generates said scanning clock signal in synchronism with said sync signal derived from said sync signal generating means; and
  said dot scanning control unit sequentially supplies the signals derived from said display switching unit in synchronism with said scanning clock signal to the dots of said display unit so as to display the contents of said signals from the display switching unit on said display unit.

15. A digital oscilloscope having a video signal input, comprising;

a first input terminal, to which a signal to be observed is supplied;

an oscilloscope unit coupled to said first input terminal, said oscilloscope unit including a converting means for converting said signal to be observed to digital data, an acquisition memory for storing said digital data and a display memory, to which data corresponding to the output from said acquisition memory is written to display;

a second input terminal, to which a video signal is supplied;

a video signal input block coupled to said second input terminal, said video signal input block including a video chroma signal processing circuit and a sync reproducing circuit, for extracting color components;

a display switching unit coupled to said oscilloscope unit and said video signal input block, for selecting one of the output signals derived from said oscilloscope unit and from said video signal input block; and a display device coupled to said display switching unit, for displaying either one of said output signals from said oscilloscope unit and said video signal input block.

* * * * *